(12) United States Patent
Monzyk et al.

(10) Patent No.: US 8,449,756 B2
(45) Date of Patent: May 28, 2013

(54) METHOD FOR PRODUCING FERRATE (V) AND/OR (VI)

(75) Inventors: Bruce F. Monzyk, Town Creek, AL (US); James K. Rose, Millersport, OH (US); Eric C. Burckle, Dublin, OH (US); Andrew D. Smeltz, West Lafayette, IN (US); Dennis G. Rider, Baltimore, OH (US); Chad M. Cucksey, Worthington, OH (US); Timothy O. Clark, Lancaster, OH (US)

(73) Assignee: Battelle Memorial Institute, Columbus, OH (US)

( * ) Notice: Subject to any disclaimer, the term of this patent is extended or adjusted under 35 U.S.C. 154(b) by 1377 days.

(21) Appl. No.: 10/597,106

(22) PCT Filed: Jan. 18, 2005

(86) PCT No.: PCT/US2005/001402
§ 371 (c)(1), (2), (4) Date: Nov. 6, 2008

(87) PCT Pub. No.: WO2005/069892
PCT Pub. Date: Aug. 4, 2005

(65) Prior Publication Data
US 2009/0205973 A1      Aug. 20, 2009

Related U.S. Application Data

(60) Provisional application No. 60/537,115, filed on Jan. 16, 2004.

(51) Int. Cl.
*C25B 1/00* (2006.01)

(52) U.S. Cl.
USPC .......................................... 205/543; 205/548

(58) Field of Classification Search
USPC ................................................. 205/543, 548
See application file for complete search history.

(56) References Cited

U.S. PATENT DOCUMENTS

| 3,372,125 A | 3/1968 | Hill |
| 3,904,421 A | 9/1975 | Shimizu et al. |

(Continued)

FOREIGN PATENT DOCUMENTS

| CN | 1524595 | 9/2004 |
| DE | 553004 | 5/1943 |

(Continued)

OTHER PUBLICATIONS

Bouzek et al., Influence of Electrolyte Hydrodynamics on Current Yield in Ferrate (VI) Production by Anodic Iron Dissolution, Collect. Czech. Chem. Commun. (vol. 65) 2000 (no month) pp. 133-140.*

(Continued)

*Primary Examiner* — Arun S Phasge
(74) *Attorney, Agent, or Firm* — Yimei C. Hammond; Kremblas & Foster

(57) ABSTRACT

An undivided electrochemical cell. The electrochemical cell includes a housing defining an undivided chamber, the housing having one electrolyte inlet and at least two electrolyte outlets; an anode in the chamber; a cathode in the chamber; and an electrolyte in the chamber, wherein the anode and the cathode are not gas diffusion electrodes. The invention also involves a method of operating an electrochemical cell, and methods for making ferrate(VI).

30 Claims, 31 Drawing Sheets

U.S. PATENT DOCUMENTS

| | | | |
|---|---|---|---|
| 4,156,613 A | 5/1979 | Hund | |
| 4,225,352 A | 9/1980 | Makino et al. | |
| 4,243,494 A | 1/1981 | Riggs, Jr. et al. | |
| 4,256,551 A | 3/1981 | Cliff et al. | |
| 4,606,843 A | 8/1986 | Kaczur | |
| 4,705,726 A | 11/1987 | Shindou et al. | |
| 5,284,642 A | 2/1994 | Evrard et al. | |
| 5,416,150 A | 5/1995 | Boeck | |
| 5,607,504 A | 3/1997 | Schmid et al. | |
| 6,080,288 A | 6/2000 | Schwartz et al. | |
| 6,267,896 B1 | 7/2001 | Patterson et al. | |
| 6,471,788 B1 | 10/2002 | Minevski et al. | |
| 6,566,574 B1 | 5/2003 | Tadros et al. | |
| 6,576,346 B1 | 6/2003 | Ravenscroft et al. | |
| 6,723,890 B2 | 4/2004 | Tucker et al. | |
| 6,790,429 B2 * | 9/2004 | Ciampi | 423/594.1 |
| 6,837,984 B2 | 1/2005 | Wang et al. | |
| 6,899,769 B2 | 5/2005 | Ravenscroft et al. | |
| 6,899,956 B2 | 5/2005 | Block et al. | |
| 6,946,078 B2 * | 9/2005 | Minevski et al. | 210/695 |
| 7,045,024 B2 | 5/2006 | Minevski et al. | |
| 7,045,051 B2 | 5/2006 | Minevski et al. | |
| 7,291,217 B2 | 11/2007 | Phelps et al. | |
| 7,347,893 B2 | 3/2008 | Low | |
| 7,387,671 B2 | 6/2008 | Meisen et al. | |
| 7,387,672 B2 | 6/2008 | Friedrich | |
| 7,410,536 B2 | 8/2008 | Friedrich et al. | |
| 7,422,793 B2 | 9/2008 | Phelps et al. | |
| 2002/0098989 A1 | 7/2002 | Heimann et al. | |
| 2003/0042134 A1* | 3/2003 | Tremblay et al. | 204/228.1 |
| 2003/0055245 A1 | 3/2003 | Tseng et al. | |
| 2003/0146169 A1 | 8/2003 | Ciampi et al. | |
| 2003/0159942 A1 | 8/2003 | Minevski et al. | |
| 2004/0104377 A1 | 6/2004 | Phelps et al. | |
| 2004/0216637 A1 | 11/2004 | Buchheit et al. | |
| 2005/0022810 A1 | 2/2005 | Moore et al. | |
| 2005/0049157 A1 | 3/2005 | MacDonald et al. | |
| 2005/0053543 A1 | 3/2005 | Kneip et al. | |
| 2005/0123743 A1 | 6/2005 | Martinazzo | |
| 2005/0152828 A1 | 7/2005 | Aga et al. | |
| 2006/0134339 A1 | 6/2006 | Wang et al. | |
| 2006/0162613 A1 | 7/2006 | Rosenhahn et al. | |
| 2008/0305341 A1 | 12/2008 | Plieth et al. | |
| 2009/0216060 A1 | 8/2009 | Monzyk et al. | |
| 2011/0017209 A1 | 1/2011 | Monzyk et al. | |

FOREIGN PATENT DOCUMENTS

| | | |
|---|---|---|
| EP | 166825 | 1/2002 |
| FR | 2805162 | 8/2001 |
| JP | 59139314 | 8/1984 |
| JP | 61053398 | 3/1986 |
| JP | 62007596 | 1/1987 |
| JP | 62091225 | 4/1987 |
| JP | 62292492 | 12/1987 |
| WO | 0121856 | 3/2001 |
| WO | 0182896 | 11/2001 |
| WO | 2006015756 | 2/2006 |
| WO | 2007075153 | 7/2007 |
| WO | 2008112657 | 9/2008 |
| WO | 2009142823 | 11/2009 |
| WO | 2010045657 | 4/2010 |

OTHER PUBLICATIONS

Bouzek, K., et al. "Influence of Anode Material on Current Yields During Ferrate(VI) Production by Anodic Iron Dissolution Part I: Current Efficiency During Anodic Dissolution of Grey Cast Iron to Ferrate(VI) in Concentrated Alkali Hydroxide Solutions". Journal of Applied Electrochemistry, vol. 26, 1996, pp. 919-923.

Written Opinion of the International Searching Authority for International Application Publication No. WO2005/069892 (Application No. PCT/US2005/001402), published on Aug. 4, 2005.

Audette, R.J., Quail, J.W.: "Potassium, Rubidium, Cesium, and Barium Ferrates(VI). Preparations, Infrared Spectra, and Magnetic Susceptibilities". Inorganic Chemistry, [Online], vol. 11, No. 8, Aug. 1972, XP002569971 DOI: 10.1021/ic50114a034 [retrieved on Feb. 23, 2010].

Bouzek, K., Lipovska, M., Schmidt, M., Rousar, I., Wragg, A.A.: "Electrochemical Production of Ferrate(VI) Using Sinusoidal Alternating Current Superimposed on Direct Current: Grey and White Cast Iron Electrodes". Electrochimica Acta, vol. 44 (1998) pp. 547-557.

Bouzek, K., Rousar, I.: "The Study of Electrochemical Preparation of Ferrate(VI) Using Alternating Current Superimposed on the Direct Current Frequency Dependence of Current Yields". Electrochimica Acta, vol. 38, No. 13, 1993, pp. 1717-1720.

Bouzek, K., Flower, L., Rousar, I., Wragg, A.A.: "Electrochemical Production of Ferrate(VI) Using Sinusoidal Alternating Current Superimposed on Direct Current. Pure Iron Electrode". Journal of Applied Electrochemistry, vol. 29, 1999, pp. 569-576.

Dean, John A. "Lange's Handbook of Chemistry". 15th edition, 1999, McGraw-Hill, New York, 8.104-8.111.

Delaude et al.: "A Novel Oxidizing Reagent Based on Potassium Ferrate(VI)". Journal of Organic Chemistry, vol. 61, 1996, pp. 6360-6370.

Grube, Von G., Gmelin, H.: "Effects of Superimposed Alternating Current on Anode Ferrate Formation". Zeitschrift fur Electrochemie, vol. 26, 1920, pp. 153-161.

He, W., Wang, J., Yang, C., and Zhang, J.: "The Rapid Electrochemical Preparation of Dissolved Ferrate(VI): Effects of Various Operating Parameters". Electrochimica Acta, vol. 51, 2006, pp. 1067-1973.

Hirota, N.: "Anticorrosion Paints". May 12, 1984, XP002569967, database accession No. 1972:476784.

Hives, J., Benova, M., Bouzek, K., Sitek, J., Sharma, V.K.: "The Cyclic Voltammetric Study of Ferrate(VI) Formation in a Molten Na/K hydroxide Mixture". Electrochimica Acta, vol. 54, 2008, pp. 203-208.

Kim, K.S., Chang, Y., Bae, S.K. and Hahn, C.S.: "Selective Oxidation of Allylic and Benzylic Alcohols Using Potassium Ferrate under Phase-Transfer Catalysis Condition". Synthesis, vol. 10, Oct. 1984, pp. 866-868. XP002438865.

Licht, Stuart, Naschitz, Vera, Wang, Baohui: "Rapid Chemical Synthesis of the Barium Ferrate Super-Iron Fe (VI) Compound, BaFeO4". Journal of Power Sources [Online] vol. 109, Jun. 15, 2002, pp. 67-70, XP002569968 DOI: doi:10.1016/S0378-7753 (02)00041-1 [retrieved on Feb. 23, 2010].

Macova, Z., Bouzek, K., Hives, J., Sharma, V.K., Terryn, R.J., Baum, J.C.: "Research Progress in the Electrochemical Synthesis of Ferrate(VI)". Electrochimica Acta, vol. 54, 2009, pp. 2673-2683.

Sharma, Virender K., "Potassium Ferrate(VI): An Environmentally Friendly Oxidant". Advances in Environmental Research 6 (2002) 143-156.

Yang, W., Zhou, Y., Wang, H. and Bi, D.: "Studies on Influence of Various Experimental Conditions on Electrochemical Generation of Ferrate(VI) in NaOH-KOH mixed Electrolyte". Russian Journal of Electrochemistry, vol. 45, No. 7, 2009, pp. 795-799.

First Report mailed May 29, 2009, from Australian Intellectual Property Office, in an Australian patent No. 2005206927.

Notice of Allowance mailed Jun. 4, 2010, from Australian Intellectual Property Office, in an Australian patent No. 2005206927.

The First Office Action from The State Intellectual Property Office of the People's Republic of China mailed on Mar. 10, 2010, in the Chinese patent application No. 20058002471.5.

The Second Office Action from The State Intellectual Property Office of the People's Republic of China mailed on Nov. 4, 2010, in the Chinese patent application No. 200580002471.5.

First Office action mailed on Sep. 10, 2010, in a co-pending US patent application publication No. 20090216060 published on Aug. 27, 2009.

Second Office action mailed on Jan. 12, 2011, in a co-pending US patent application publication No. 20090216060 published on Aug. 27, 2009.

Communication from the European Patent Office mailed on Apr. 11, 2008, in a co-pending European Patent Application No. 05858701.5-1218.

Communication from the European Patent Office mailed on Jun. 18, 2010, in a co-pending European Patent Application No. 05858701.5-1218.

Issuance Notice mailed on Nov. 16, 2010, in a co-pending European Patent Application No. 05858701.5-1218.

Written Opinion of the International Searching Authority for International Application Publication No. WO2007/075153 (Application No. PCT/US2005/04714), published on Jul. 5, 2007.
International Search Report for International Application Publication No. WO2007/075153 (Application No. PCT/US2005/04714), published on Jul. 5, 2007.
Written Opinion of the International Searching Authority for International Application Publication No. WO2008/112657 (Application No. PCT/US2008/056446), published on Sep. 18, 2008.
Written Opinion of the International Searching Authority for International Application Publication No. WO2010/045657 (Application No. PCT/US2009/061204), published on Apr. 22, 2010.
Written Opinion of the International Searching Authority for International Application Publication No. WO2009/142823 (Application No. PCT/US2009/038472), published on Nov. 26, 2009.

* cited by examiner

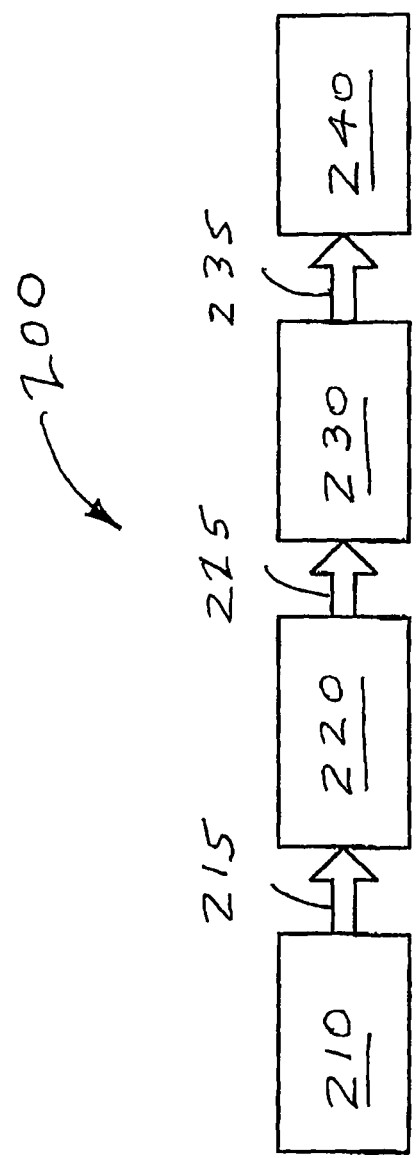

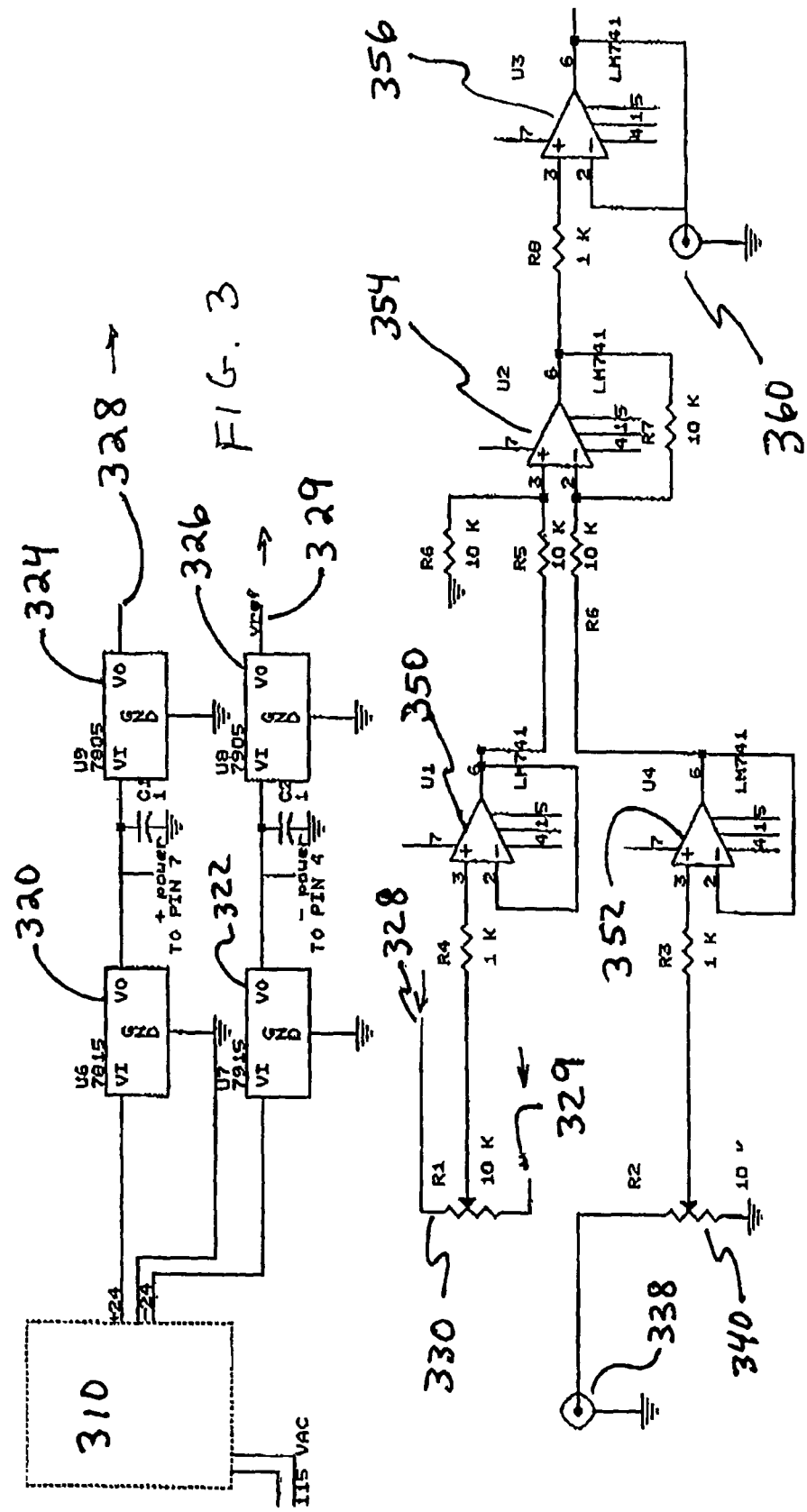

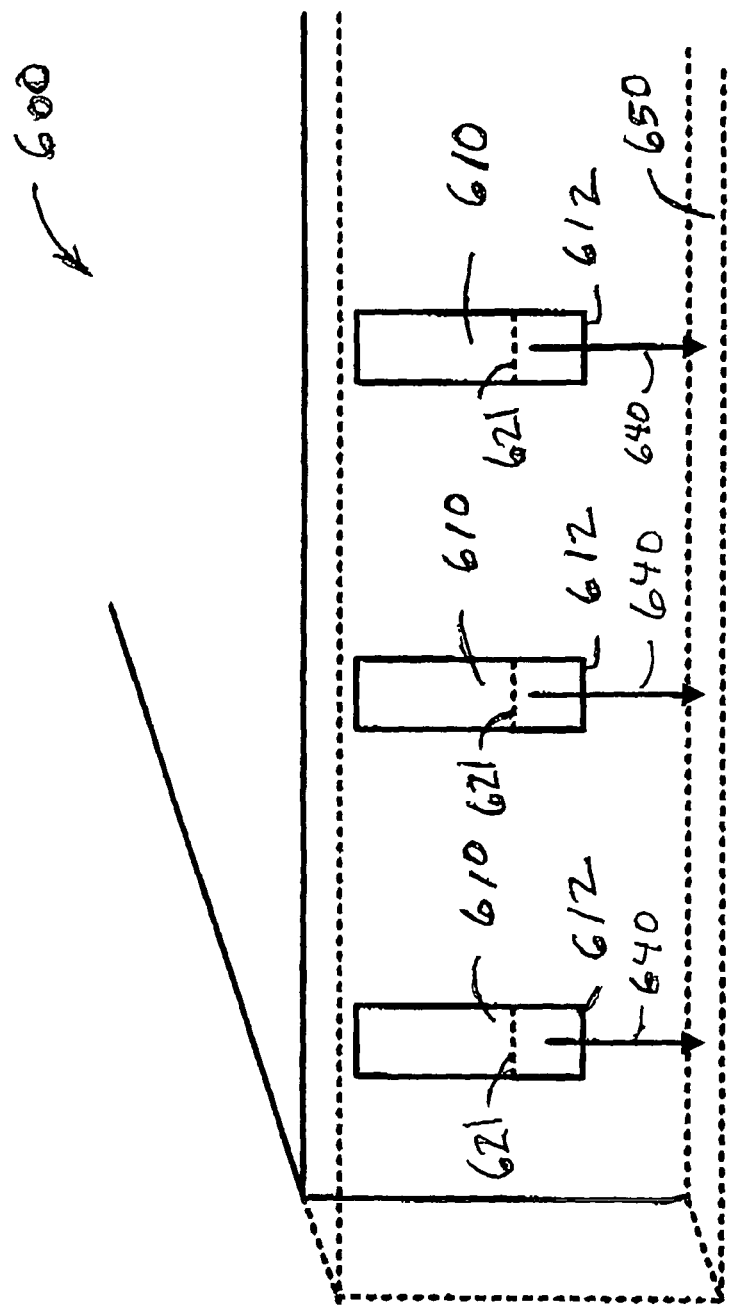

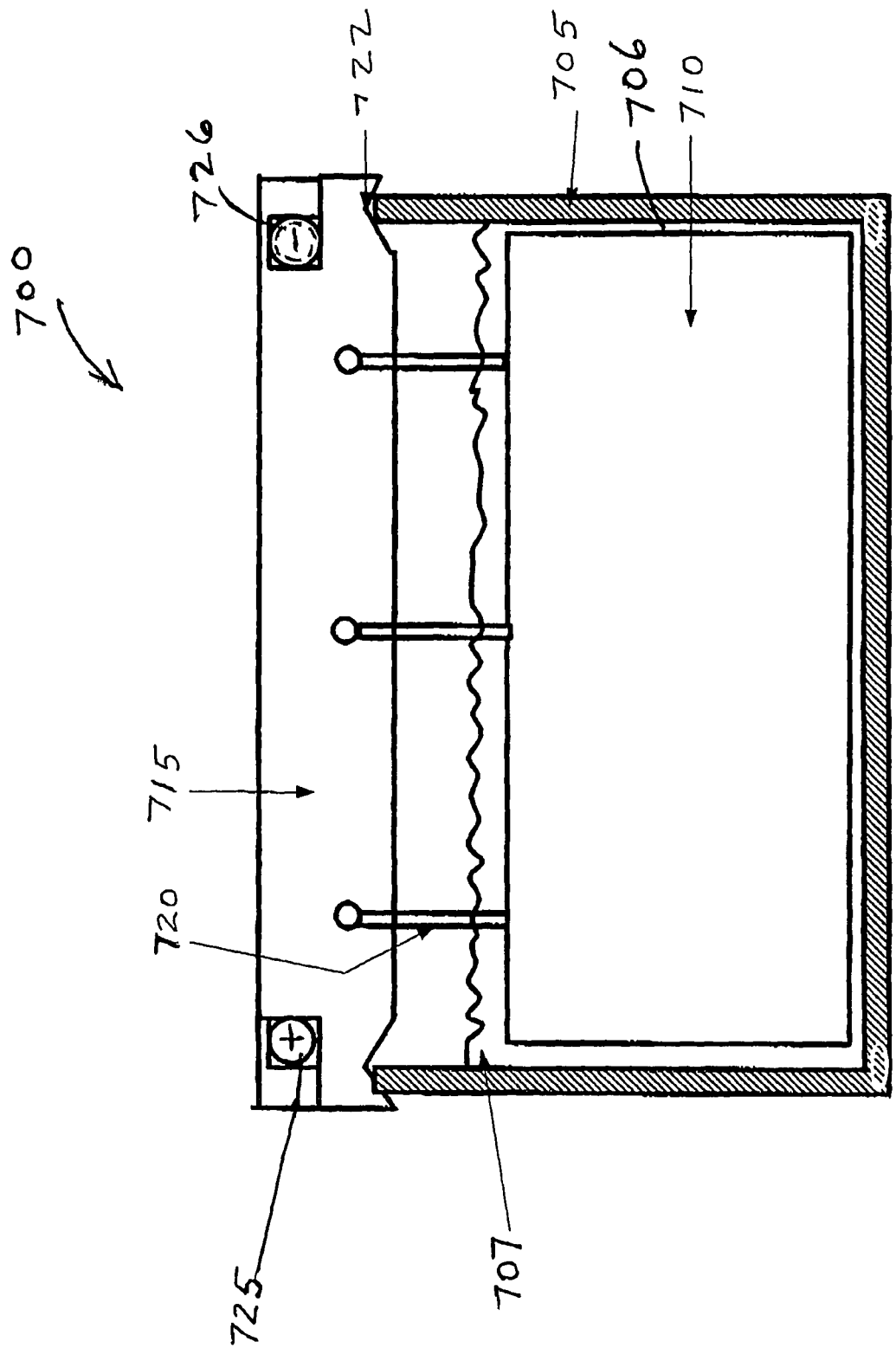

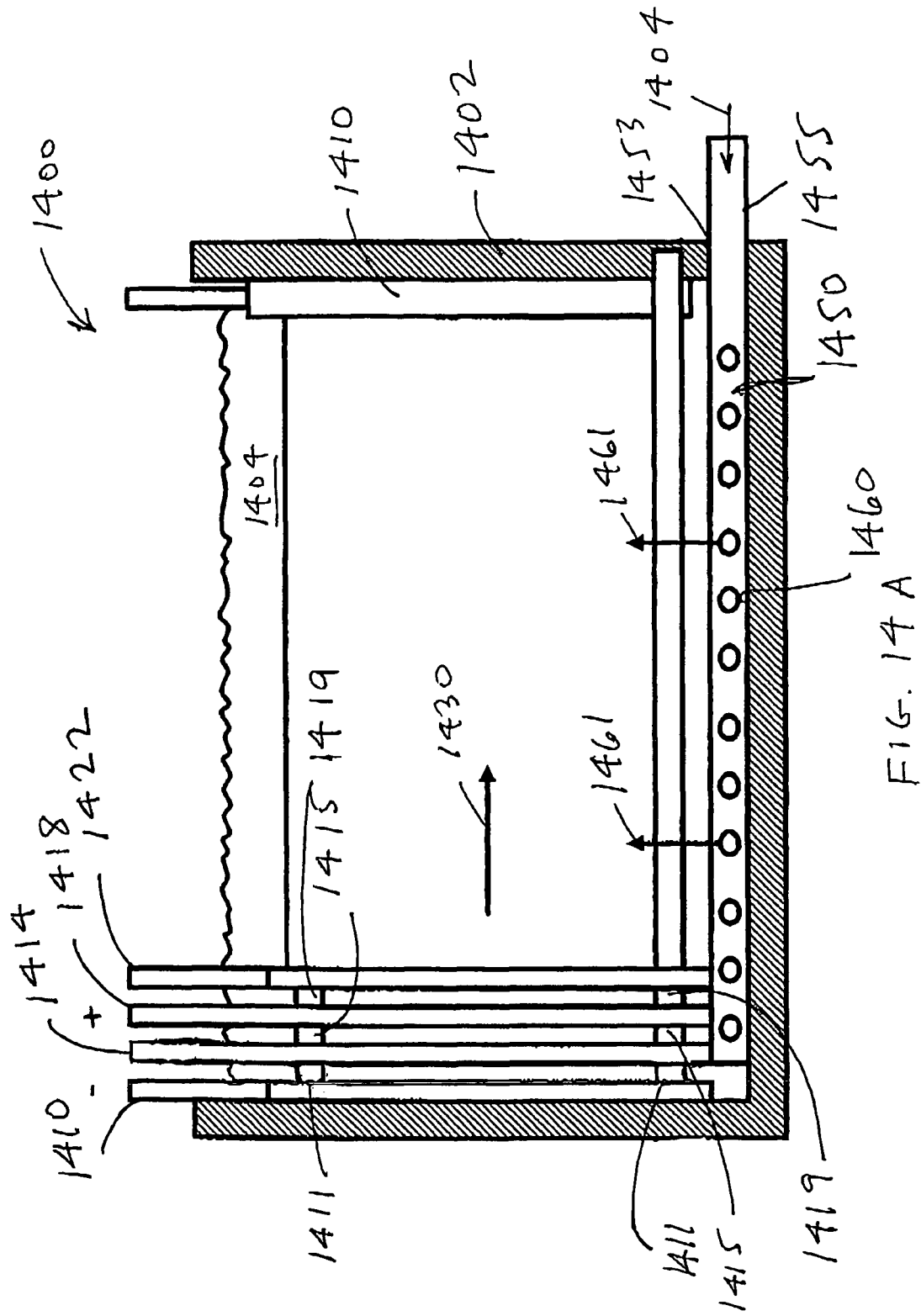

METHOD FOR PRODUCING FERRATE (V) AND/OR (VI)

The present invention relates generally to electrochemical cells and more particularly to undivided electrochemical cells, methods of operating undivided electrochemical cells, and methods for making ferrate(VI) and for making certain ferrate(VI) products.

Ferrate(VI) is a strong oxidizer and produces a water impurity coagulant and precipitant in water. These properties make ferrate(VI) useful for water decontamination and purification such as industrial waste waters, farming process waters, sewage treatment plants, and in the production of potable water supplies. It is also useful as battery materials, in chemicals production, for metal surface corrosion control, surface decontamination and cleaning and many other industrial applications.

The two basic methods of making ferrate(VI) in aqueous solution are chemical and electrochemical. To date, only chlorination chemical methods have shown utility in preparing isolated useful solid forms of ferrate(VI), producing only a few grams at a time. Chemical methods involve contacting a ferric iron compound with an oxidizing material, usually hypochlorite, in an aqueous alkaline environment (wet route), or at high temperature (dry route). However, the use of hypochlorites is undesirable because of difficulty in operation, nonscaleability of the process, contamination of the product, large waste streams, production of chlorine gas byproducts and expensive raw materials.

Electrochemical methods for producing reactive products or separations have typically utilized divided cells. In divided cells, an ion-transfer polymer's or ceramic frit membrane separates the liquids in the cell into anode and cathode chambers. For ferrate(VI) solution preparation, there is a sacrificial anode made of an iron containing material. The cathode can be made of various materials including iron, carbon, nickel, carbon steel, stainless steel, nickel plated iron, or combinations thereof. Concentrated aqueous sodium hydroxide is normally introduced into the bottom of the anode chamber and removed from the top. Similarly, sodium hydroxide is introduced into the bottom of the cathode chamber and removed from the top. Electrical current, or just "current" is applied across the cell causing the anode to oxidize to water soluble ferrate(VI), which is carried off with the anolyte.

Prior work on electrochemical cells suggested that undivided cells were undesirable for making ferrate(VI) because the electrolytic efficiency dropped off rapidly with operation time, the ferrate(VI) is decomposed (chemically reduced) at the cathode, the ferrate so produced, decomposed quickly and only dilute ferrate solutions could be prepared. A recent published application, US 2003/0159942 A1 (Minevski), describes a single chamber electrochemical cell that is said to be useful for the production of ferrate salts for short periods. The cell has one electrolyte inlet and one electrolyte outlet on opposite ends of the chamber. The electrolyte is an aqueous hydroxide solution comprising one or more alkali metal hydroxides, one or more alkaline earth metal hydroxides, or combinations. The hydroxide concentration is between about 1 molar and about 30 molar. The molar ratio of KOH to NaOH is up to about 5, and is preferably between about 1 and about 3. The cell can include an optional porous frit between the anode and cathode. However, porous frits are brittle and subject to dissolving in caustic, cracking, pluggage with iron oxide solids, and are thick which raises operational voltages, thereby increasing heat, power consumption, slowing production rates, and increasing cost.

Minevski describes a process that includes continuous filtration using methods including magnetic means. It describes the "ferrate" as being attracted to a magnetic surface, i.e., a ferromagnetic material. However, ferrate(VI) is a paramagnetic material (containing unpaired electrons) but not a ferromagnetic material. Paramagnetic materials are not sufficiently attracted to magnetic surfaces to allow simple magnetic separations. Ferromagnetic particles (aligned magnetic moments) are required for such separation and they exhibit an external ordered magnetic field that is attracted to or repulsed by external magnetics depending on relative direction of magnetic field alignment. Ferrate(VI) does not have ferromagnetic particles and is not attracted to magnetic surfaces. However, ferrate(VI) can contain loose ferromagnetic impurities (such as magnetite $Fe_3O_4$) which are magnetic but are not strong oxidants or sufficiently water soluble, and are therefore of no value to the uses of ferrate(VI). Hrostowski et al., "The Magnetic Susceptibility of Potassium Ferrate," Journal of Chemical Physics, Vol. 18, No. 1, 105-107, 1950; Shinjo et al., Internal Magnetic Field at Fe in Hexavalent States, J. Phys. Soc. Japan 26 (1969) 1547; Oosterhuis et al., "Paramagnetic Hyperfine Interactions in an $e_s^2$ Configuration of Fe," Journal of Chemical Physics, Vol. 57, No. 10, 4304-4307, 1972; and Hoy et al., "Critical Slowing Down of Spin Fluctuations in $K_2FeO_4$," Journal of Magnetism and Magnetic Materials 15-18 (1980) 627-628, are incorporated herein by reference for the description of the paramagnetic character of ferrate(VI) and the existence of ferromagnetic impurities in ferrate(VI). Note that these magnetic impurities are as particles that are physically separate from the ferrate (VI) crystals, and these do not agglomerate together and hence do not offer a means to recover both ferrate(VI) and the magnetic particles together magnetically. Minevski's description of magnetic separation suggests that its process primarily produced magnetic iron compounds, such as magnetites rather than ferrate(VI) compounds. The authors of the invention described herein for ferrate(VI) compounds are also aware of the conditions for operating the electrochemical cell to produce magnetic iron oxide products of the type described by Minevski, and these inventors also have invented means to avoid such unwanted byproducts, and these means are described herein.

The prior art teaches that while electrochemical processes may be useful for laboratory scale production of ferrate(VI), they are unsuitable for commercial scale production for several reasons: 1). First, they can only be run for short periods of time (a few hours) before the cell must be shut down and cleaned 2) During ferrate(VI) production, some Fe(VI) degrades to Fe(III), which is insoluble in hydroxide solutions. 3) The Fe(III) precipitates out of solution, coating the cell walls and, in divided cells, plugs the pores of the membrane as well. 4) This fouling results in decreased current efficiency and ferrate production. In such instances, the ferrate production will decrease until it is less than ferrate decomposition. Moreover, the use of membranes in divided cells increases the cost dramatically for materials, labor, and more than triples the required electrical power.

As a result of these problems, there is currently no regular commercial supply of even small laboratory quantities of compounds of ferrate(VI) using any synthetic or production process method.

Therefore, there is a need for a commercially feasible method and apparatus for making ferrate(VI), and for an electrochemical cell which is simple, inexpensive, forms insignificant amount of by-products, and is easy to operate, even at a large scale of production.

The present invention meets this need by providing an undivided electrochemical cell which is designed and operated in a manner which avoids by-products, is highly energy efficient, scaleable, and operates continuously. The undivided electrochemical cell includes a housing defining an undivided chamber, the housing having one electrolyte inlet and at least one outlet, one located to gather electrolyte from the cathode side and one which gathers electrolyte from the anode side; an anode in the chamber; a cathode in the chamber; and an electrolyte in the chamber, wherein the anode and the cathode are not gas diffusion electrodes. The invention includes one, or preferably a "stack", of such cells.

The electrochemical cell of the invention preferentially includes a fluid controller in fluid communication with the electrolyte outlets. Suitable fluid controllers include, but are not limited to flow restrictions, valves, bends in fluid flow direction, weirs having different heights, or constrictions in one or more of the exit lines.

The electrochemical cell of the invention most preferably includes a screen between the anode and the cathode. It cannot include a membrane. Membranes are cell inserts which physically separates the fluid around the cathode from the fluid around the anode, and adds significantly to the voltage drop across the cell when compared with the same cell dimensions and design without the membrane, for example by several tenths of a volt, and even several volts, where the electrochemictry only requires at most a few (<4) volts. On the other hand, screens provide an undivided cell in that they allow intermixing of anolyte and catholyte and do not show this costly voltage drop. Screens also allow the gassing and fluid mixing hydrodynamics to be different on each side of the screen.

Another aspect of the invention is a method of operating an undivided electrochemical cell. The method includes providing a housing defining an undivided chamber, the housing having at least one electrolyte inlet, and preferably at least two outlets, an anode in the chamber, and a cathode in the chamber; introducing an electrolyte into the chamber through the electrolyte inlet; and controlling an amount of electrolyte and/or gas flowing out of the outlets so that substantially more electrolyte flows past one electrode than the other. Preferably, the chamber also contains the above-mentioned screen. Most preferred is that the chamber also contains the screen and exit fluid controller.

Another aspect of the invention is a method for making ferrate(VI). The method includes providing an undivided electrochemical cell comprising an iron-containing anode, or an inert anode with an iron containing electrolyte particulate slurry, a cathode, and an electrolyte solution, the electrolyte solution comprising an aqueous solution of NaOH, or a mixture of KOH and NaOH, wherein a molar concentration of NaOH is greater than about 5 and a molar ratio of KOH to NaOH of less than 0.4, preferably less than 0.25, and most preferably less than 0.12; and applying a voltage between the anode and the cathode to form the ferrate(VI) solutions and compounds.

Still another aspect of this invention is a method for making ferrate(VI) which includes providing an electrochemical cell comprising an iron-containing anode, a cathode, and an electrolyte solution, the electrolyte solution comprising at least one hydroxide; and applying a variable direct current voltage between the anode and the cathode to form the ferrate(VI), the variable direct current voltage varying between a maximum voltage (Vmax) and a minimum voltage (Vmin), the minimum voltage being greater than 0, and the maximum voltage being in the range 0.7-4.0 volts, with current densities varying between Vmax and Vmin in the range of 0.1-200 mA/cm$^2$.

Another aspect of the invention is a method for making ferrate(VI) which includes providing a housing defining an undivided chamber, the housing having an electrolyte inlet, at least one electrolyte outlets, an iron-containing anode in the chamber, and a cathode in the chamber; introducing an electrolyte solution into the chamber through the electrolyte inlet, the electrolyte solution comprising at least NaOH, wherein a molar concentration of NaOH is greater than about 5; flowing electrolyte out the of outlet; applying a variable DC voltage between the anode and the cathode of sufficient amplitude to form the ferrate(VI), the variable direct current voltage varying between a maximum voltage and a minimum voltage, the minimum applied voltage, being 0 or greater. Typically the method may include the step of applying the variable DC voltage obtain a voltage level where ferrate active film removal exceeds or equals net active film formation rate for a selected time period, said time period selected to substantially prevent excessive film growth. In other aspect of the invention the minimum applied voltage is greater than 0.

In another aspect of the invention there is disclosed an apparatus for an undivided electrochemical cell made up of a housing defining an undivided chamber, the housing having one electrolyte inlet and at least two outlets; an anode in the chamber; a cathode in the chamber; and an electrolyte in the chamber, wherein the anode and the cathode are not gas diffusion electrodes.

Still another aspect of this invention is the provision of a new, electrochemically active oxide of iron.

FIG. 1A is a representative waveform for ferrate(VI) production. Applied waveform is a square wave at about 1 Hz with Vmax seet at 320 msec. and Vmin adjusted to 80 msec. using power control circuit of FIG. 2. At these cell conditions, Vmax is 2.32 V and Vmin is 1.2 V. Illustrates relationship between power signal control parameters and electrochemical reactions.

FIG. 2 is a schematic diagram of a controller, actually used in the examples herein, for controlling a power supply for providing appropriate varying DC for the invention.

FIG. 3 is a schematic diagram of a proposed version of a controller for controlling a power supply for providing appropriate varying DC according to the invention.

FIGS. 6A and 6B are perspective views of electrolyte overflows using weirs for an anode/spacer/cathode assembly.

FIG. 7 is a cutaway view of one embodiment of an electrochemical cell according to the invention showing a typical face of a hanging anode/cathode.

FIG. 14A is a side view of the tank showing a typical electrode stack for one embodiment.

Figure 18:
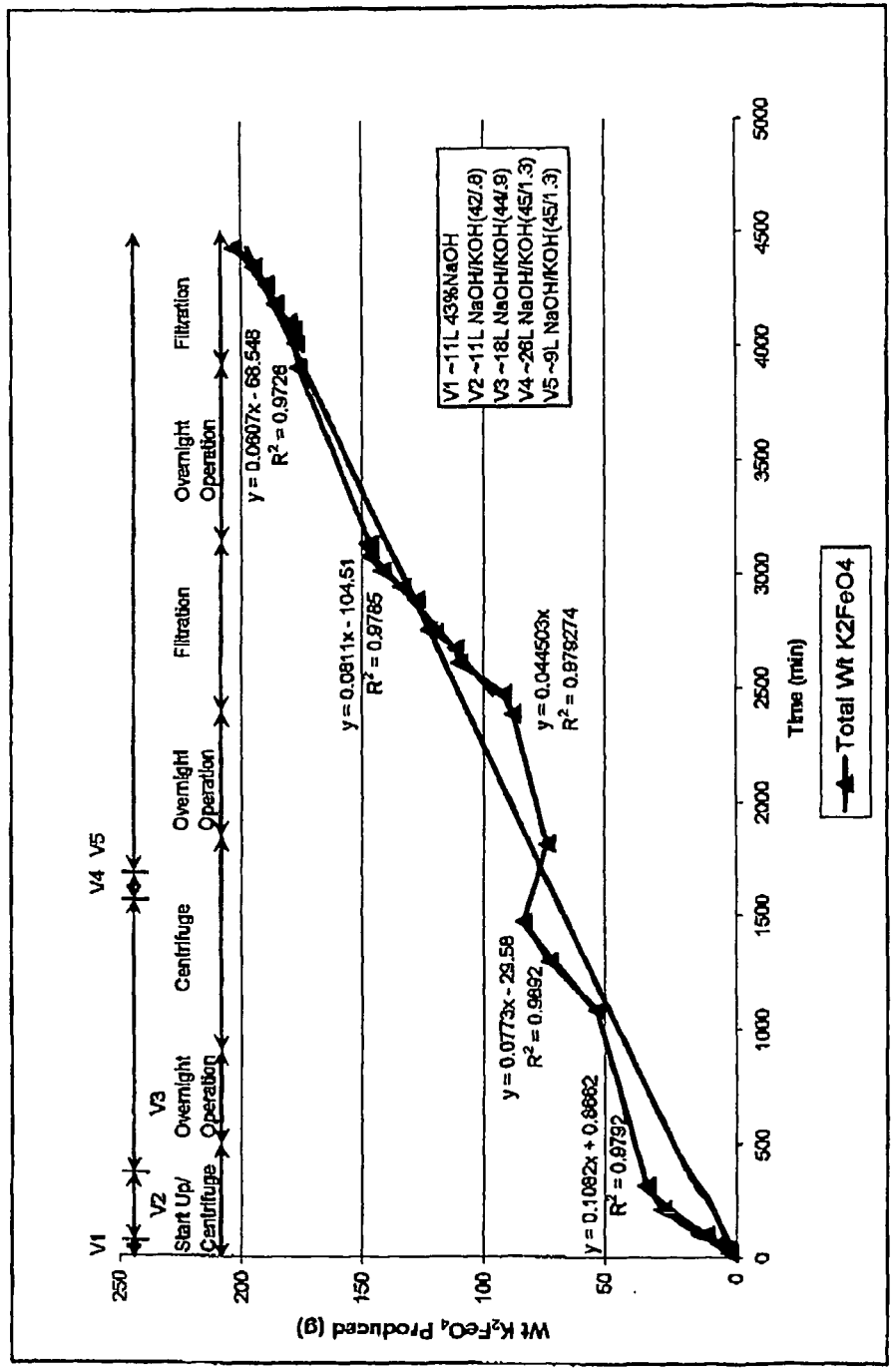

FIG. 18 is a graph showing the results from the production of ferrate(VI). The weight of the potassium ferrate produced is shown on the left vertical scale in grams; the time interval in minutes is shown on the horizontal scale. Ferrate (VI) was harvested at four intervals shown on the graph starting at about) minutes, 1100 minutes, 2300 minutes and 3900 minutes. The graph shows that harvesting greatly increased the rate of production of potassium ferrate. That is each time the product was removed by filtration or centrifugation, the production rate (increased slope of line) increased over that of the average slope that is depicted by the long straight line.

Figure 19:
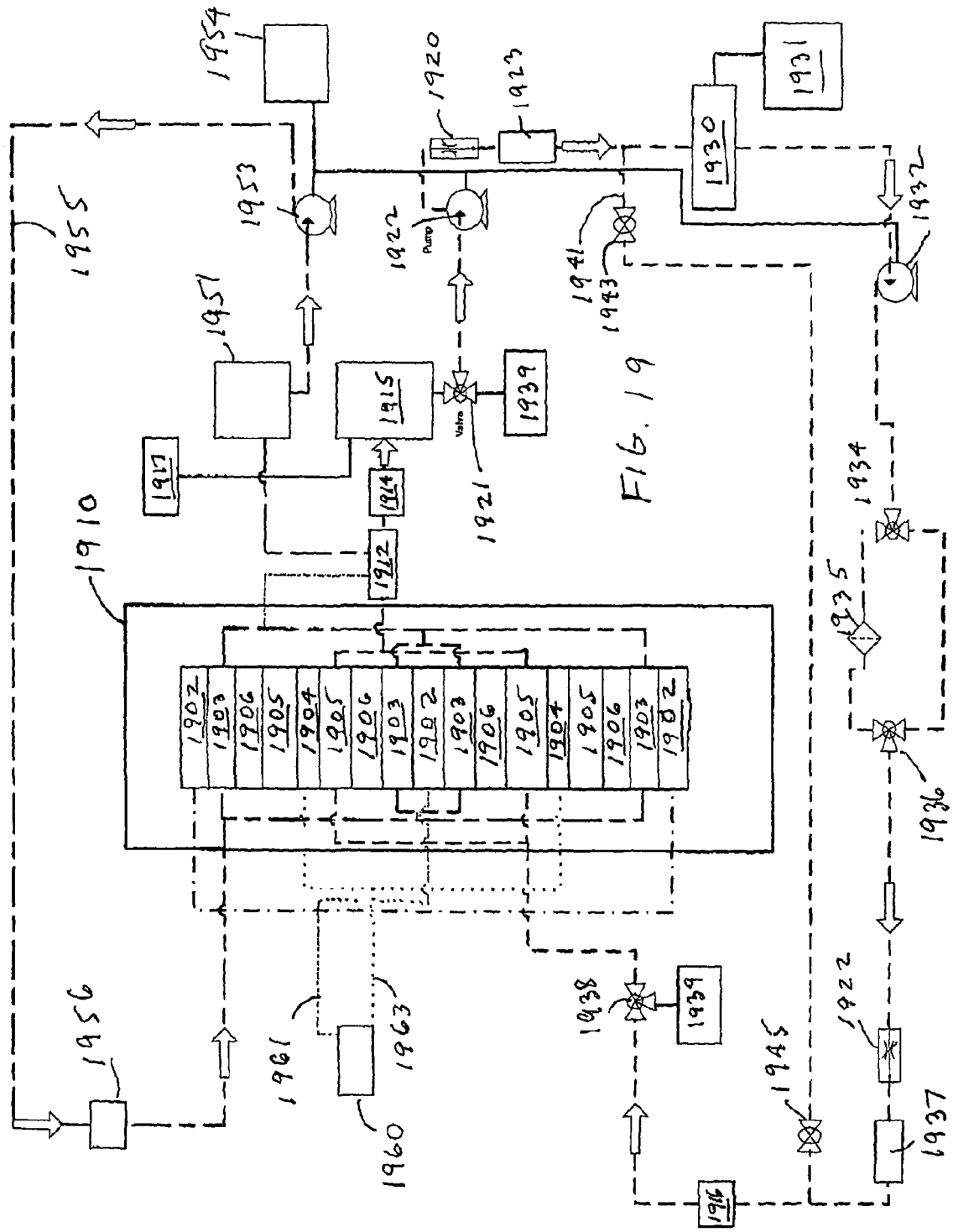

FIG. 19 is a schematic drawing of one typical embodiment of the invention having three cathodes and two anodes.

Figure 20:
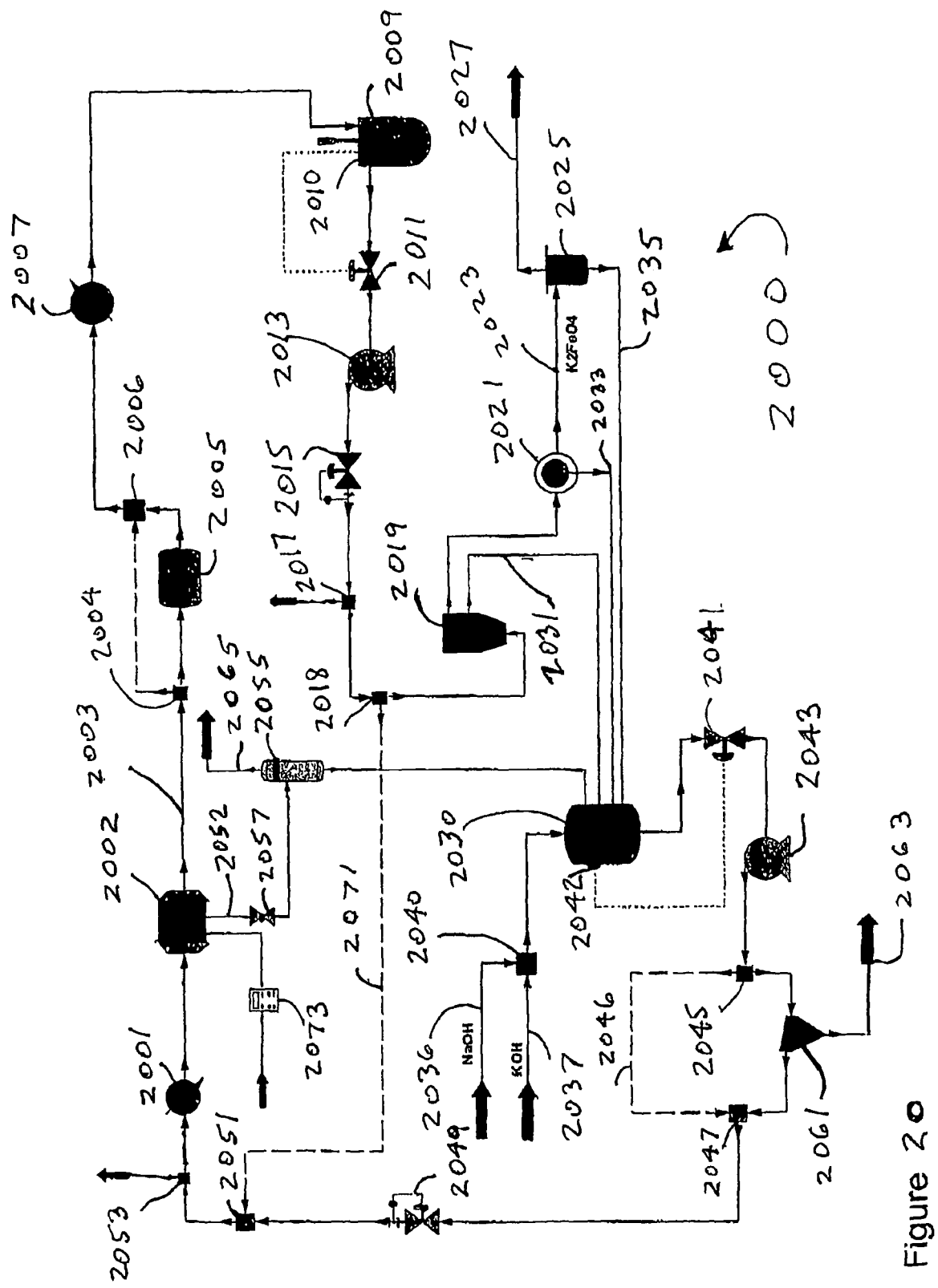

FIG. 20 is a schematic diagram of one embodiment of an overall apparatus for production of ferrates.

Figure 21:
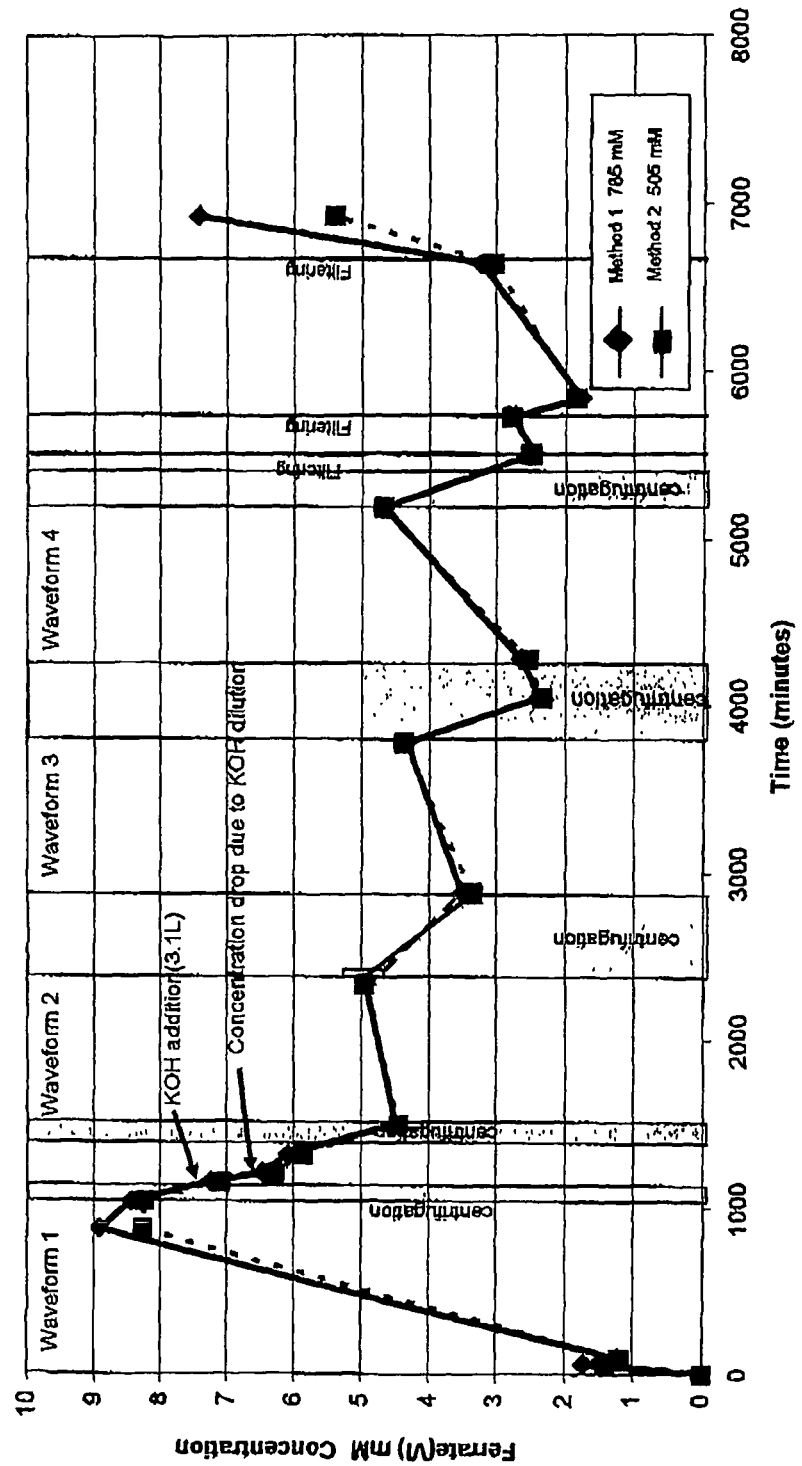

FIG. 21 is a graph depicting ferrate (VI) concentration, and the production rate of ferrate(VI) versus time.

Figure 22:
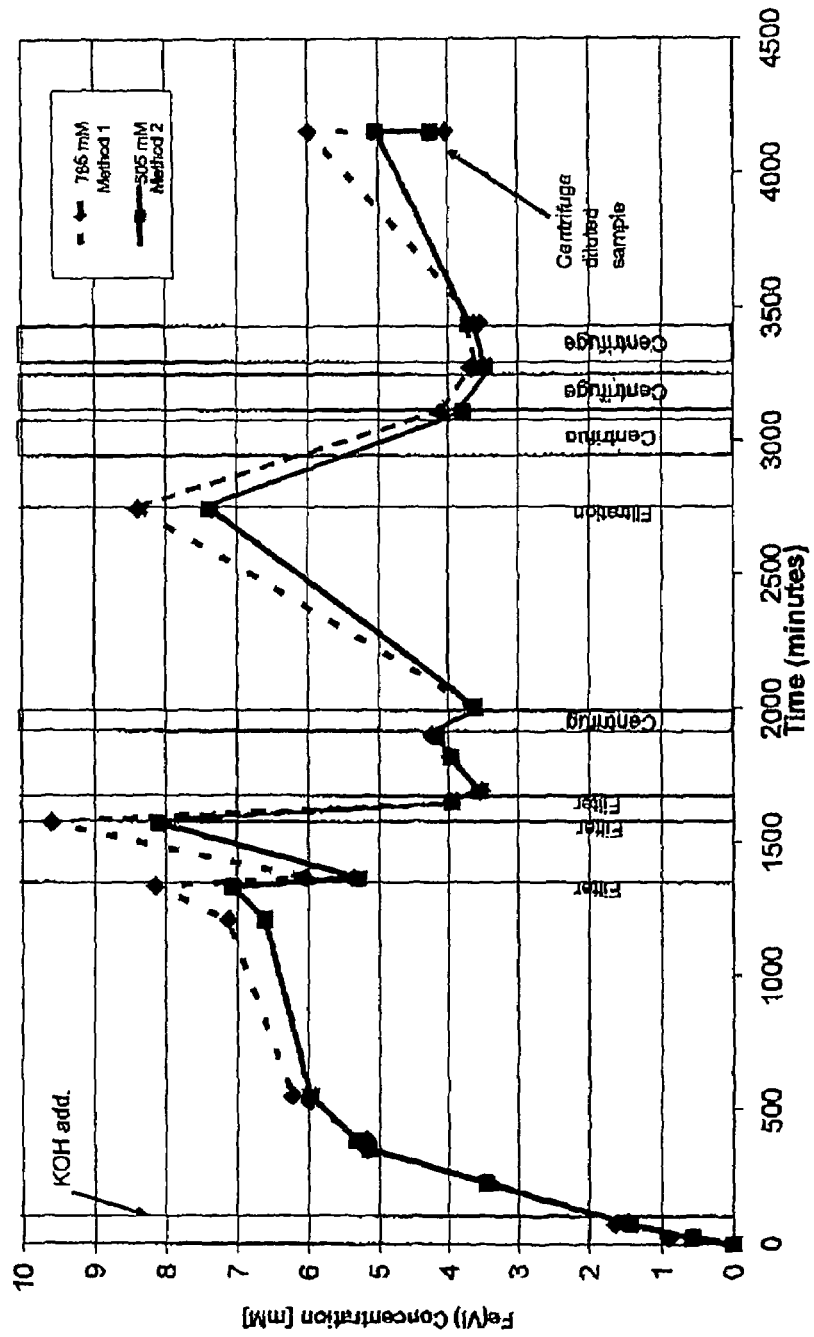

FIG. 22 is a graph depicting ferrate(VI) concentration, and the production rate of ferrate(VI) versus time.

Figure 23:
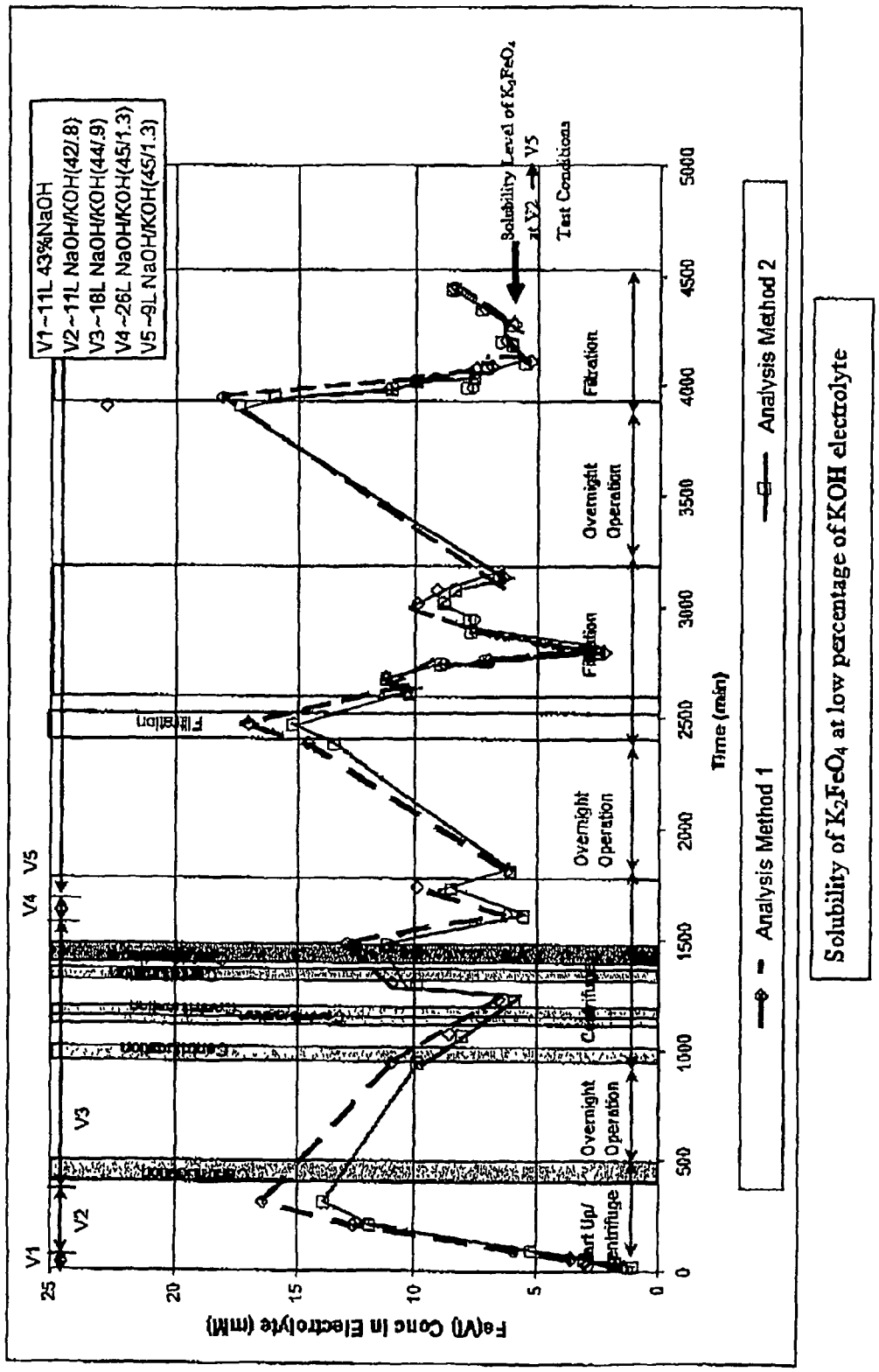

FIG. 23 is a graph depicting the ferrate(VI) concentration, versus time for a continuous production run.

Figure 24:
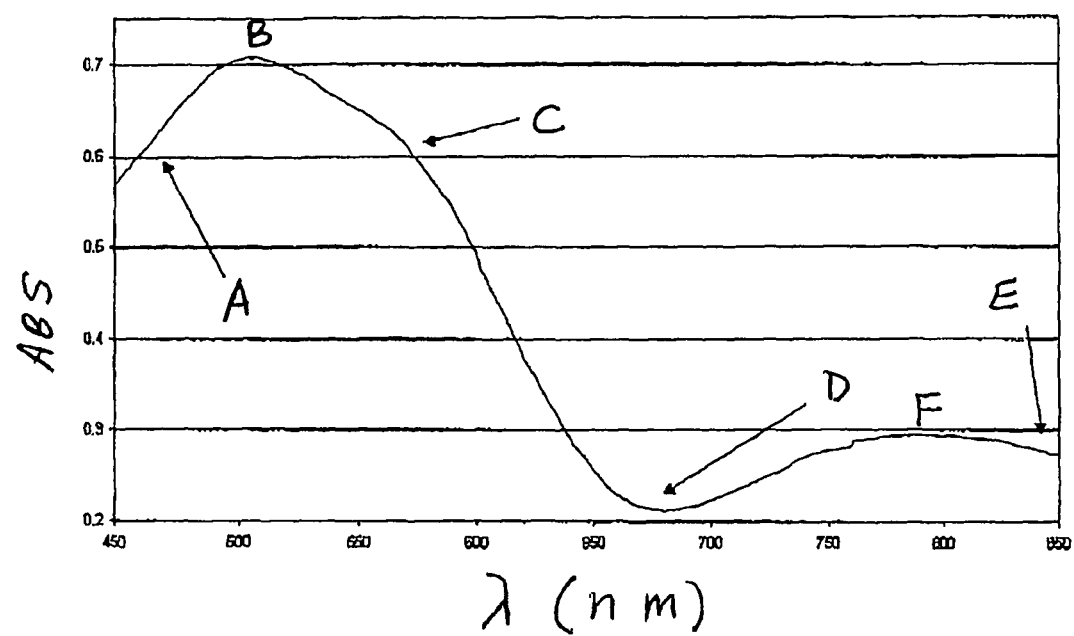

FIG. 24 is a graph of ferrate(VI) visible absorption spectrum. The Y axis is Absorbance in absorbance units and the X axis is Wavelength in nanometers.

Figure 25:
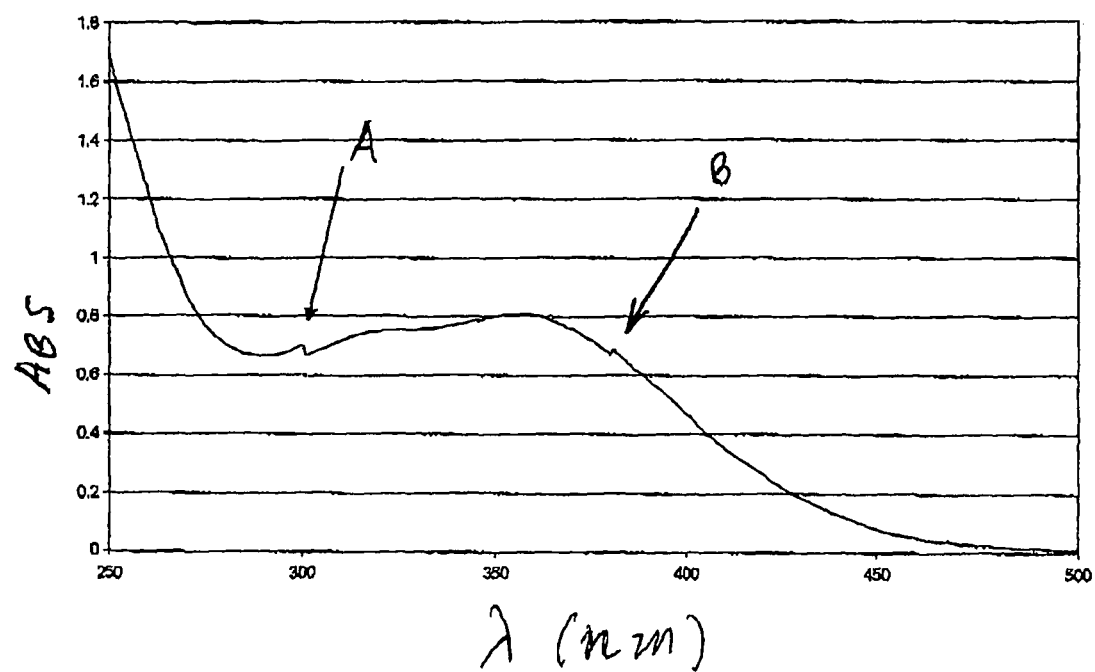

FIG. 25 is a graph of total iron UV/visible absorption spectrum. The Y axis is Absorbance in absorbance units. And the X axis is Wavelength in nanometers.

Figure 26:
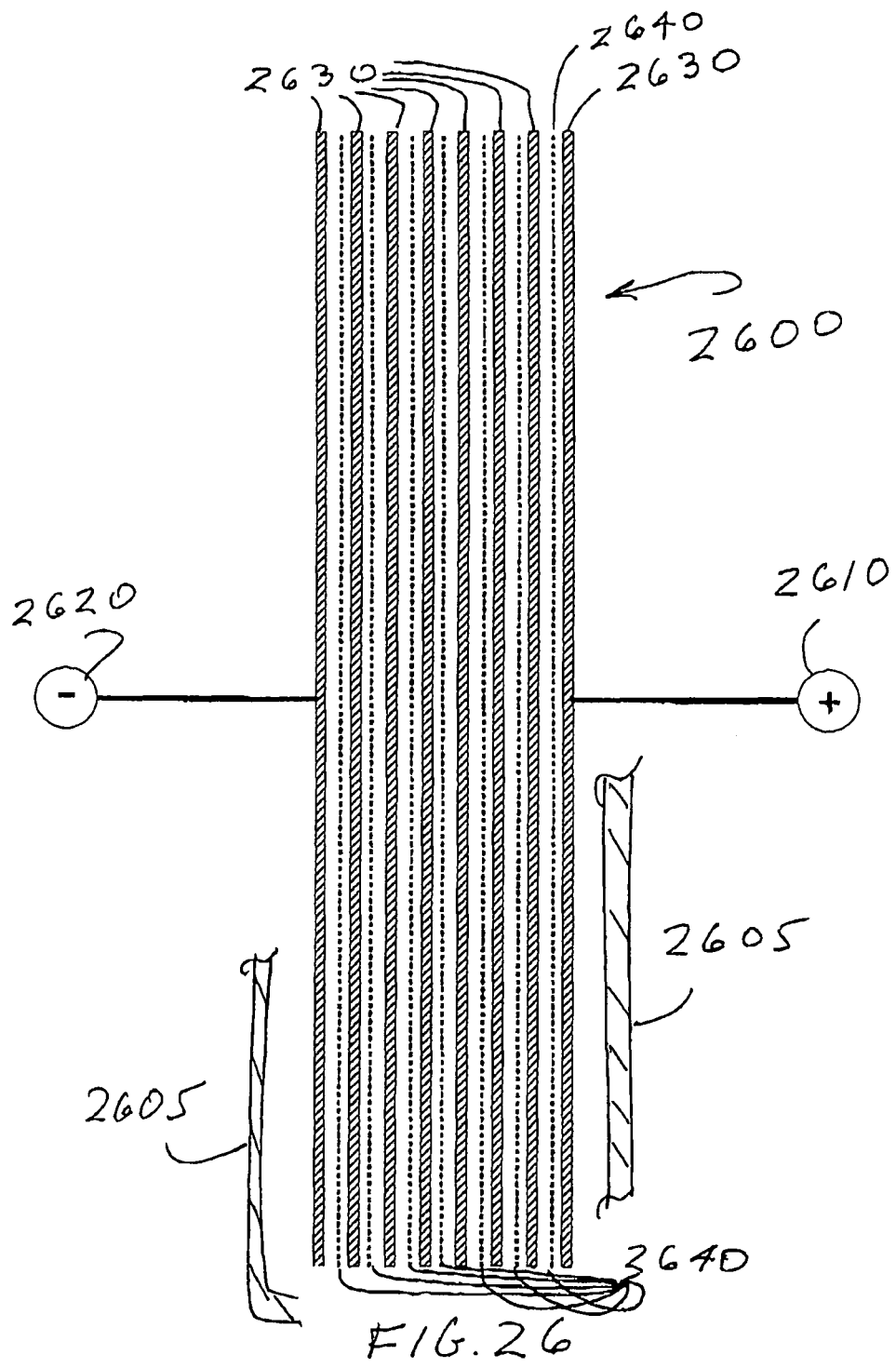

FIG. 26 shows a typical embodiment for a bipolar electrochemical cell arrangement.

Broadly, the invention provides for apparatus for producing oxometal ions e.g., ferrate(VI)) using an undivided electrochemical cell. Typically, the electrochemical cell includes a housing defining an undivided chamber, the housing having at least one electrolyte inlet and at least one outlet for gas and/or electrolyte, or one gas and one liquid electrolyte outlets; an anode in the chamber; a cathode in the chamber; and an electrolyte in the chamber, wherein the anode and the cathode are not gas diffusion electrodes. There is a power supply for generating a variable direct current and voltage for application across the anode and cathode. The direct current voltage is typically applied so as to have a peak voltage, Vmax, and a minimum voltage, Vmin. Vmin is above 0 volts, and is that voltage required to substantially avoid passivation of the anode surface (as described in the detailed description section).

Active Ferrate(VI)—Producing Oxide Film:

While not wishing to be bound by theory, it is believed that the following anode surface iron oxide reaction mechanism applies to understanding the invention of achieving continuous and efficient electrochemical production of ferrate(VI) compounds. Under conditions of the invention, an iron anode typically forms a uniformly red-orange colored, smooth textured, non-flaking, non-crumbly, thin, "active" iron oxide surface layer as an intermediate in the formation of ferrate (VI). Formation and control of this active, unpassivated oxide surface layer is unexpected and is believed to be formed by the reaction of Fe(0) to form certain $Fe_xO_y$ "oxides of iron". Passivating oxide films of iron typically have formulas such as $FeOOH$, $Fe_2O_3$, $Fe(OH)_3$, and $Fe_3O_4$. Color of such oxides varies with particle and grain size, and/or degree of hydration and wetness. The red-orange oxide film, indicative of an active ferrate(VI) producing surface, appears to be a single or combination of these oxides, or an entirely different formula. The red-orange film is reactive as it only persists for a few hours once isolated in room air, whereupon it changes to more conventional yellow-orange, black, and brown colors. Such surface colors are also associated with iron anodes which do not produce ferrate(VI). An appropriate reactive composition for the red-orange oxide film of the invention might reasonably contain a blend of hydrated Fe(III) and Fe(IV) oxides. It is believed that the active film is not Fe(III) oxides alone, especially $Fe_2O_3$, as such oxides are kinetically very inert and so slow to react (passivating), and not expected to make an effective reactive intermediate for efficient ferrate(VI) preparation. In fact, the red-orange active oxide film may be primarily Fe(IV)-based [e.g. hydrated $Fe^{VI}O(OH)_2$, or the equivalent], thereby by-passing well-known and sluggish reacting Fe(III)-oxide films (see below for more detailed description).

Passivating Iron Oxide Film Barrier To Ferrate(Vi) Production: Application of a filtered, very low ripple, (non variable) DC voltage to an iron anode-based electrochemical cell with strong caustic soda electrolyte produces dilute ferrate(VI) coloration of the electrolyte in the first minutes, and then ceases ferrate(VI) production. In this event, a orange-brown, yellow and sometimes black splotchy colored anode surface is produced. The iron oxide formed in this case does not form ferrate(VI) and thickens with time. This iron oxide may be referred to as a passivating layer, and appears to be composed of the Fe(III) oxides of the type or similar to $FeOOH$, $Fe_2O_3$, $Fe(OH)_3$, and $Fe_3O_4$). Sufficiently thick iron oxide passivating layers can form in a few minutes and then always result in no, or just a low concentration of, ferrate(VI) production not useful for even lab-scale preparations. This passive layer appears to interfere with the desired ferrate(VI) reaction allowing these other oxides to form, which are unreactive, and hence become the final iron product. By increasing the voltage required to operate the cell only results in undesirable side reactions to occur, such as further buildup of passive oxide layer thickness or oxygen gas generation, and then ferrate(VI) production ceases to occur. Accordingly, such conventionally powered cells result in exorbitant production delays, and increases ferrate(VI) production inefficiencies enormously due to the need for many more cells to be operating, the large amount of labor required for refurbishing pacified cells, and the lower average efficiency of conversion to Fe(VI) product.

Electrochemical Equations Leading to Ferrate(VI) Formation from Iron Metal Anode:

While not wishing to be bound by theory, it is believed that the following electrochemical reaction mechanism applies to understanding the invention of achieving continuous and efficient electrochemical production of ferrate(VI) solutions and compounds. The electrochemical and other related ferrate (VI) formation chemical reactions are typified and described by the following. In a first reaction, associated with holding the electrochemical cell, or just "cell" voltage, Vcell, at a high value, Vmax, iron anodes, Fe(0) is converted to several higher oxidation species, including ferrate(VI), Fe(VI), by electrolytic one and two "electron transfer" reactions depicted as:

|  | Fe(0) | $\rightarrow$ fast | Fe(II) | $\rightarrow$ fast | Fe(III) | $\rightarrow$ fast | Fe(IV) | $\rightarrow$ slow | Fe(V) | $\rightarrow$ fast | Fe(VI) |
|---|---|---|---|---|---|---|---|---|---|---|---|
| Reaction No.: |  | R1 |  | R2 |  | R3 |  | R4 |  | R5 |  |
| No. of electrons transferred: |  | 2 |  | 1 |  | 1 |  | 1 |  | 1 | TOTAL: 6 |
| No. of "4s + 3d" electrons for the electronic configuration: | 8 |  | 6 |  | 4 |  | 3 |  | 2 |  |  |

Vcell is the measured voltage across a single electrochemical cell of the invention, at a particular point in time, and influenced by the applied voltage, the electrochemical potential of the cell, and any internal voltage drops. For example, at high applied voltages, Vcell is Vmax at low applied voltages like 0.0, then Vcell varies from Vmax Vmin (curves C and D of FIG. 1A).

Fe(I) is not shown as it is believed not to exist to a significant degree based on conventional iron chemistry in aqueous, oxidizing environments. In addition, Fe(IV) may be produced in a fast reaction from Fe(II) [thereby bypassing possibly slow reacting Fe(III) species], by a two-electron transfer, (see below). From conventional coordination chemistry theory, the molecular geometries of these iron chemical species are expected to be as follows: Fe(0) metallic crystal; Fe(II), Fe(III) and Fe(IV) all six coordinate (octahedral, geometry or Oh); Fe(V) and Fe(VI) four coordinate (tetrahedral geometry Td). By definition, all of these reactions are electrochemical, i.e. electrolytic, oxidation/reduction or "redox", and disproportionation in nature (see below for further illustration and description of these chemical reactions and how they apply to ferrate(VI) formation). The overall driving force for the conversion of iron metal to ferrate(VI) ions is the cell voltage applied externally across the anode and cathode, forming the final product ion, designated Fe(VI), $FeO_4^=$, or ferrate(VI). Based on ligand field theory, such reactions (R1 to R5) would be expected to occur at different rates as the electronic structures of the ions involved differ substantially from each other, and also since each reaction would vary with cell operating conditions; especially the hydroxide concentration, the total iron concentration, the residence time at the anode surface, the temperature (which affects both chemical reaction rates and diffusion rates in the fairly viscous medium), voltage (Vmin and Vmax), variable DC voltage and current frequency, electrolyte flow rate, thickness of anode diffusion boundry layers internal-cell mixing, and nature of counter ion(s) present.

It is believed the ferrate(VI) production electrochemistry of the invention proceeds as, or is similar to, that described as follows. The fast reactions, R1, R2, and R3 proceed rapidly at voltages near Vmax via one and two electron transfers, to produce an red-orange oxide film buildup on the anode surface composed of Fe(III) and Fe(IV), a mixture of the two, and perhaps mostly Fe(IV), as insoluble oxides. The conversion of this insoluble film, containing Fe(III) and Fe(IV) oxides, into Fe(V) and Fe(VI) soluble oxoionic species is also believed to occur continuously but at a slower rate than red-orange oxide film build-up. This slower rate is believed to be due to the molecular geometry change that is required to convert from octahedral complexes to tetrahedral complexes. To prevent the oxide film from thickening too much, and thereby eventually forming a passivating oxide film of e.g. kinetically and thermodynamically inert, insoluble, Fe(III) oxides, soluble Fe species must be allowed to form at a rate similar to Fe(0) dissolution so that the net effect is to maintain a thin, active iron oxide film. This balance in chemical reaction rates is accomplished in the invention in two steps; first by adjusting the cell voltage, Vcell, to a value lower than Vmax which is selected low enough to slow Fe(0) dissolution to a much slower rate, for example <5%, and preferably <2% of the dissolution rate of Fe(0) at Vmax (as measured by current density and current efficiency with respect to anode weight loss rate), but which is selected still too positive to allow large amounts of Fe(I) to form via reaction R1, as Fe(II) would react quickly with Fe(IV), Fe(V) and Fe(VI) species to form a passivating layer consisting of Fe(III) oxides, ferric colloids in the electrolyte, and the like. Hence, Vmin is controlled positive enough to continue conversion of any Fe(II) into Fe(III) and Fe(IV) oxide, but not the oxidation of Fe(0) to Fe(II) at a significant rate. Hence, when Vcell=Vmin, the cell current, Icell, is very nearly zero, i.e. preferable <5% of Icell at Vmax, and preferably <2% of Icell at Vmax, and most preferably <1% of Icell at Vmax.

The beneficial chemical reactions which occur during the Vmin portion of the power supply cycle, believed to involve disproportionation redox reactions, are key to the continuous production of ferrate(VI) as these reactions allow continuous ferrate(VI) production cell operation by thinning the iron oxide film which thickens during the Vmax phase of the power signal. This discovery extends the limit of cell operation of the prior art from at most a few hours, to at least several weeks. Although these disproportionation reactions also occur during the Vmax portion of the power cycle, they are believed to be in addition to Fe(V) and Fe(VI) direct production at the anode. At Vmin, the disproportionate chemical reactions convert the insoluble active red-orange iron oxide film into soluble oxo iron species, and thereby thin the oxide layer. This disproportionation reaction is believed to be one or both of the following chemical reactions. As one disproportionation reaction, it is believed that two ions of Fe(IV), present in the active but insoluble oxide film, react with each other by inter-metal ion electron transfer to disproportionate into one Fe(V), a soluble oxoanion, and Fe(III), an insoluble oxide, thereby reducing the amount of iron ions in the film by a large amount, theoretically 50% if the film is mostly Fe(IV) based. As a second disproportionation reaction, it is believed that two Fe(V) ions, either present from the reactions at Vmax, or from the Fe(IV) disproportionation reaction just mentioned, disproportionate into one Fe(VI) ion, which, being water soluble, diffuses into solution as final product, and into one Fe(IV) species which stays within the solid oxide film to react further in the first disproportionation reaction, thereby reducing the extent of film thinning somewhat by the first disproportionation (theoretically by 25% on a contained iron ion weight basis). However, this Fe(IV) so formed, then feeds into the first disproportionation reaction mentioned, thereby forming more Fe(V) and Fe(III) species, which then forms more Fe(VI) ions, as described, which diffuse out of the oxide film into the electrolyte as product, again reducing the oxide film thickness further. This cyclic nature of disproportionation redox reactions, occurs due to the presence of two such reactions in the same system.

Impact of Above Described Ferrate(VI) Electrochemistry on Viable Production of Ferrate(VI) Compounds at the Industrial Scale:

Fe(III) oxide films are not highly electrically conducting and are very insoluble in water or alkaline solutions used in the electrochemical generation of ferrate. Hence, as is demonstrated in the prior art, conventional electrochemcial conditions result in short-lived cells, which is believed to be due to the accumulation of a non reactive iron-based oxide film ("passivating layer") on the anode which interferes with electrical current and mass flow to and from the surface of the anode. This passive film, which develops quickly, in a few minutes to 2-3 hours, slows the formation rate, and even stops the formation of ferrate(VI). Therefore prior art methods require that production be stopped after only minutes or just a few, normally about three hours, to remove the highly discolored (black, brown, orange and yellow, with minimal red coloration) film mechanically by wire brushing, using sulfuric acid or hydrochloric acid pickling, or by reverse cell polarity to discharge the oxide film solid using hydrogen gassing from beneath the oxide surface (electro-cleaning). Sand blasting was found ineffective in cleaning such surfaces adequately. These refurbishing operations generate waste solids, waste contaminated pickling acid, waste electrolyte, and/or consume electricity. No practical process for ferrate(VI) preparation can be written or produced using the methods of the prior art.

The present invention provides a practical and economical method suitable for large-scale, continuous, low-cost ferrate (VI) production. This new and useful capability, described in detail below, is a process with several critical features that can be combined and operated in a number of ways. The chemistry basis and means of control for the systematic prevention of the buildup of a passivating film on the anode allows the continuous production of ferrate(VI) by the cell, and so avoids the wastes of electricity, raw materials, labor, the loss of iron to non-ferrate(VI) byproducts, and the loss of production time, and nonscaleability associated with technology of the prior art. A second critical feature is the design of a membraneless cell or undivided cell, which reduces power consumption by at least two thirds, and greatly extends cell operation life by more than 10 fold by avoiding issues regarding pluggage of the membrane by Fe(III) oxide solids. A third critical feature is the continuous formation of ferrate(VI) crystalline product that can be removed from the electrolyte by continuous, nonmagnetic, solids/liquid separation operations, which thereby also allows continuous operation and critical recycle of the highly concentrated electrolyte. These critical ferrate(VI) production factors will be described more fully below. These factors allow the industrial viability of the ferrate(VI) chemical manufacturing process of the invention in quantities intended to service all scales of needs for ferrate (VI), including laboratory quantities, specialty chemicals uses, and large-scale commodity production markets, such as water purification, where millions of pounds/year production rates are needed for each ferrate(VI) manufacturing plant. By operating a process where the process components of the invention are incorporated, and more or less continuously operated, provides the continuous or semi-continuous ferrate (VI) production process of the invention. This invention permits efficient large-scale continuous production of ferrate (VI) products, as well as a means to obtain sufficiently high electrical current efficiency needed for industrially viable, large-scale ferrate(VI) production Summary of Key Process Parameters for Ferrate(Vi) Production Using the Invention:

As per the invention, continuous ferrate(VI) production at scaleable, low-cost conditions is made possible through the use of certain process unit operations and process control conditions. The first of these are limitation of the anode surface oxide film thickness and accumulation rate to that required for high current efficiency and continuous operation using a certain variable direct voltage, vDC, resulting in variable direct current, vDI. The second of these key operating factors is continuous or semi-continuous harvesting of solid product, e.g. crystals ferrate(VI) with counter ion cations of sodium, potassium, lithium, strontium, alkali metal ions, alkaline earth metal ion, zinc, calcium, magnesium, aluminum, barium, cesium, and the like including blends thereof. In contrast, prior art methods have used alternating currents (AC) and direct currents (DC), and AC superimposed onto DC, that do not provide for appropriate reduction of the oxide film that readily forms on the iron anode and passivates it, resulting in very short (minutes to a few (<4) hours cell life. Continuous harvesting of ferrate(VI) product enables the electrolyte to be recirculated through the production cell(s) with little or no ferrate(VI) ion content, which thereby prevents ferrate(VI) electrochemical reduction at the cathode, and hence allows the use of a membrane-free cell design. Removing the membrane reduces the power consumption substantially, over 60%, reduces the cost of cell fabrication materials by >50%, and decreases the frequency of cell shut-down for cleaning maintenance from hours to months, which then almost entirely eliminates total wastes amounts from cell cleaning. Means for achieving continuous harvesting was not obvious as the ferrate(VI) is produced as a highly water soluble ion at the anode, and, should a precipitating agent be added, then precipitation would normally occur where the ferrate(VI) ion concentration is greatest, at the anode. However, precipitation at the anode fouls the anode and eventually fills the anodic compartment of the cell with solids that then requires the cell to be shut down for maintenance. Hence, as part of this invention, the conditions required for ferrate(VI) solid products to form via a controlled crystallization rate is provided, such that the ferrate(VI) solid product forms from the surface of the anode and after the electrolyte exits the cell, and before the electrolyte is re-circulated back to the cell while maintaining low electrolyte volume to anode surface area ratios. Key to this discovery is that large electrolyte holdup times external to the cell are undesirable as substantial product decomposition then occurs. Hence the product crystallization conditions need to provide sufficiently fast crystallization so that the electrolyte can be recirculated back to the cell quickly, to finish oxidation of highly reactive iron intermediates [believed to be Fe(V) species], yet a high yield of ferrate(VI) recovery is needed to prevent circulation of ferrate(VI) past the cathode and causing it to be reduced to magnetic by-product crystals, similar, or identical to, magnetite, $Fe_3O_4$. It was determined that a novel blend of potassium ions, sodium ions and hydroxide ions provide this needed balance of stable product crystallization without fouling the anode or leaving too high a residual of ferrate(VI). Note that the prior art (minevski) teaches away from the KOH:NaOH use ratio range of this invention as being useful. This electrolyte blend, in combination with the variable DC power signal, the temperature control profile, and electrolyte internal cell flow characteristics are key to high production rates of ferrate (VI) as measured by electrical current efficiencies, percent conversion of iron anode into ferrate(VI) product and actual weight of ferrate(VI) per unit area of anode.

Variable Dc (Vdc) Power Signal Description For The Invention, And Determination Of Acceptable Vmax And Vmin Settings For A Particular Cell Design: As used herein, DC, stands for direct current and has the meaning usually associated therewith in the art. For vDC, the voltage will typically swing between minimum (Vmin) and maximum (Vmax) values with the absolute values dependent on cell design and operating settings, especially the temperature, anode-to-cathode gap, the concentration of caustic, the caustic cation used (normally potassium ion, sodium ion, lithium ion, and the like and/or blends thereof, see above) precise morphological structure of the iron anode, the cathode material, and the cathodic reaction normally exhibits hydrogen gas formation from water, and so on.

$$[2H_2O + 2e^- \rightarrow H_2(g) + 2OH^-] \quad (1)$$

However, for the invention, once set for a particular cell design, power signal frequency, and operating conditions, the vDC voltage does not swing substantially below Vmin or above Vmax.

Vmin is controlled just low enough to slow or stop the dissolution of iron metal anode, to suppress the formation of Fe(III)/Fe(IV) oxide layer thickness, but high enough to maintain oxidizing conditions at the anode surface to prevent side reactions taking place, especially the reactions between the product, ferrate(VI) ions with reduced forms of iron, i.e. metallic iron and/or divalent Fe, Fe(II) which would quickly result in formation of a passivity layer of Fe(III) oxide on the surface of the anode. Therefore, Vmin is controlled low enough to prevent the oxidation of more Fe(0) from the anodes surface, and this is indicated by the overall cell current, Icell, dropping to, or near to, zero, or about 1% of the value of Icell at Vamx, or at most about 5% of this value. Vmin set in this manner prevents significant additional thickening of the oxide film during the Vmin cycle of the power signal. Therefore, Vmin is the voltage across the anode and cathode above which the conversion of Fe(0) to Fe (III) and Fe(VI) oxides is thermodynamically favored, but is very slow kinetically, so that oxide film formation is substantially depressed. As current density, this setting of Vmin corresponds to about 0.01 to 1.0 $mA/cm^2$. In chemical reaction form, Vmin is the cell voltage needed to substantially prevent the following spontaneous redox reactions from occurring:

$$Fe(VI) + Fe(0) \rightarrow 2Fe(III) \quad (2)$$
passivating film and/or

$$Fe(VI) + 3Fe(II) \rightarrow 4Fe(III) \quad (3)$$

These reactions are prevented by passivating film having just barely sufficient voltage present such that if any reactions involving Fe(0) or Fe(II) occur, that they are oxidizing reactions, so that only Fe(III) or higher oxidation states of Fe can be formed from Fe(0) and Fe(I). However, as the voltage is just barely sufficient to drive these reactions, very little reaction occurs in the frequency cycle of Vmin as is measured by the current density at this time (see above). During this time chemical reactions other than electrolytic reactions can occur (see below), allowing the oxide film to thin as desirable ferrate product is formed.

At the Vmin conditions described above, important spontaneous (thermodynamically allowed) intra-film electrochemical conversions continue, especially disproportionation reactions. It is believed that the invention uses such chemical reactions to maintain a thin, non-passivating, red-orange, active, iron oxide film on the surface of the anode.

Vmax: Vmax, as used herein, is the voltage across each anode and cathode of the invention that is at or above the voltage and current density where the iron anode dissolves electrolytically at a fast rate, and where the lower oxidation states of iron, Fe(O) through Pe(V), are converted to Fe(VI) quickly. Vmax is determined and set for the cells of the invention as that voltage determined for the particular cell design and set of operating conditions, manifested as a "flattening out" of a vDC or AC electrical power supply signal wave, e.g., a sine wave, saw-toothed wave, or other voltage vs time wave pattern, placed across the cell at otherwise operating conditions. In actual practice of maximizing ferrate(VI) production by the invention, a square wave power supply signal is preferred since it maximizes the time spent at Vmax, where most of the ferrate(VI) production is occurring and minimizes it elsewhere. However, a simple rectified AC single at the frequency of the utiLity supply, without filtration, is a preferred source of vDC due to its ready availability, low cost, and simplicity of use.

An intermediate simplicity and cost power signal of vDC to generate Vmax and Vmin settings to practice this invention can also be prepared by superimposing a high current DC (offset) voltage (from a DC power source of any kind) onto a high current AC wave provided, most preferably in a ratio where the resultant vDC voltage never drops to below zero in the voltage vs time plot. As is well known in the art, such voltage with frequency profile plots are readily measured, characterized, adjusted and monitored using an oscilloscope. The oscilloscope trace then is also useful in screening candidate power supplies and power voltage wave signals for those that meet the criteria of this invention, for determining, setting and measuring Vmax and Vmin values, and for determining the optimal vDC frequency.

Electrochemistry Of Ferrate(Vi) Production In Relation To Variable Dc Power Signal: Referring to oscilloscope tracings in FIGS. 1A and 1B, the present invention uses a power supply to an electrolytic cell consisting of a variable voltage wave of any type (G) of direct current (DC), symbolized as vDC in this application, that varies at a certain controlled regular or irregular frequency between a maximum voltage, Vmax (B), at which the iron anode dissolves and ferrate(VI) is produced along with intermediate oxidation states of iron, and a minimum voltage, Vmin (F), set at zero or, preferably, above zero but at a voltage where Vmin is $\leq$ Vmax, and preferably at a value of Vmin in which iron anode dissolution is essentially stopped, or slowed substantially, relative to its dissolution rate at Vmax, and where the oxide film, formed on the anode during the period the cell voltage (Vcell (G)) is at Vmax, is allowed to thin down by disproportionation. Ferrate (VI) production is observed to occur mostly during the time periods when Vcell=Vmax (B) by direct electrolytic oxidation of Fe(0) to Fe(VI), where it is believed the Fe oxidations states of Fe(II), Fe(III), Fe(IV) and Fe(V) are involved (Reactions R1 through R5). An insoluble solid oxide film also forms during this time that is believed to be mostly comprised of insoluble oxides of Fe(III) and Fe(IV) (see below). If Vcell (G) is maintained constant, for example at about Vmax (B), then this oxide film will thicken to the point of causing anode passivation whereat ferrate(VI) production is substantially reduced and can cease formation altogether. Such low levels of ferrate(VI) production are nonviable for industrial-scale production of even specialty quantities of ferrate(VI) salts, much less commodity quantities. However, in the current invention, it was found that, by frequently adjusting Vcell (G) to Vmin (F), e.g. by using vDC at about 0.001 to 240 Hz, and preferably 0.01-120 Hz, and most preferably 0.1-60 Hz, then disproportionation (self electron exchange) chemical reaction (s) occur alone, and/or in combination with other electrochemcial reactions, thereby forming water soluble oxoanions of Fe(VI) and Fe(V), (i.e. $FeO_4^{2-}$ and $FeO_4^{3-}$ respectively), which diffuse away causing the iron oxide film on the anode to thin down preventing it from reaching passivating thickness, which would cause stoppage of ferrate(VI) production. It is believed that the electrochemical reactions which occur during the Vmin period ($t_2$ and $t_3$ of FIG. 1A) thins the oxide film on the anode by forming these water soluble Fe(V) and Fe(VI) ferrates which then can diffuse away from the anode and into the electrolyte, where the ferrate(VI) can be induced to crystallize into a solid that can be harvested. While Vcell=Vmin, dissolving significantly more iron metal from the anode is prevented, which thereby avoids formation of more iron oxide film, which would give rise to eventual passivation thickness. Therefore the secondary ferrate production chemistry (disproportionation) results in maintaining a thin and conductive "active" oxide film, and hence offering the continuous production of ferrate(VI) capability, representing the breakthrough that is a significant part of the invention (along with continuous product harvesting process technique).

While not wishing to be held to the specific colors of oxide surface films on steels as being significant, experimentally it was invariably observed that the desirable non-flaking film appears as a uniform red-orange color, and not black, brown, yellow or rust orange in color, nor are there heavy deposits of precipitate solids present on this desirable red-orange film. Therefore, it appears that this red-orange coloration of the anode indicates a viable surface for ferrate (VI) production.

Therefore, it is believed that the chemical reactions which occur during the Vmin portion of the power cycle ($t_2$ and $t_3$) do not require electrolytic reactions at the anode as the observed cell current during this part of the cycle is minor, i.e. <5%, and normally, <2%, and often <1%, of the total current flow at Vmax. Therefore, it is presently concluded that the anode oxide film reactions during the period of transition from Vmax to Vmin (curves C and D of FIG. 1A) involves iron molecular species produced during the electrolytic oxidation of the anode while the cell was at Vmax (FIG. 1A, curve B).

Figure 1A:
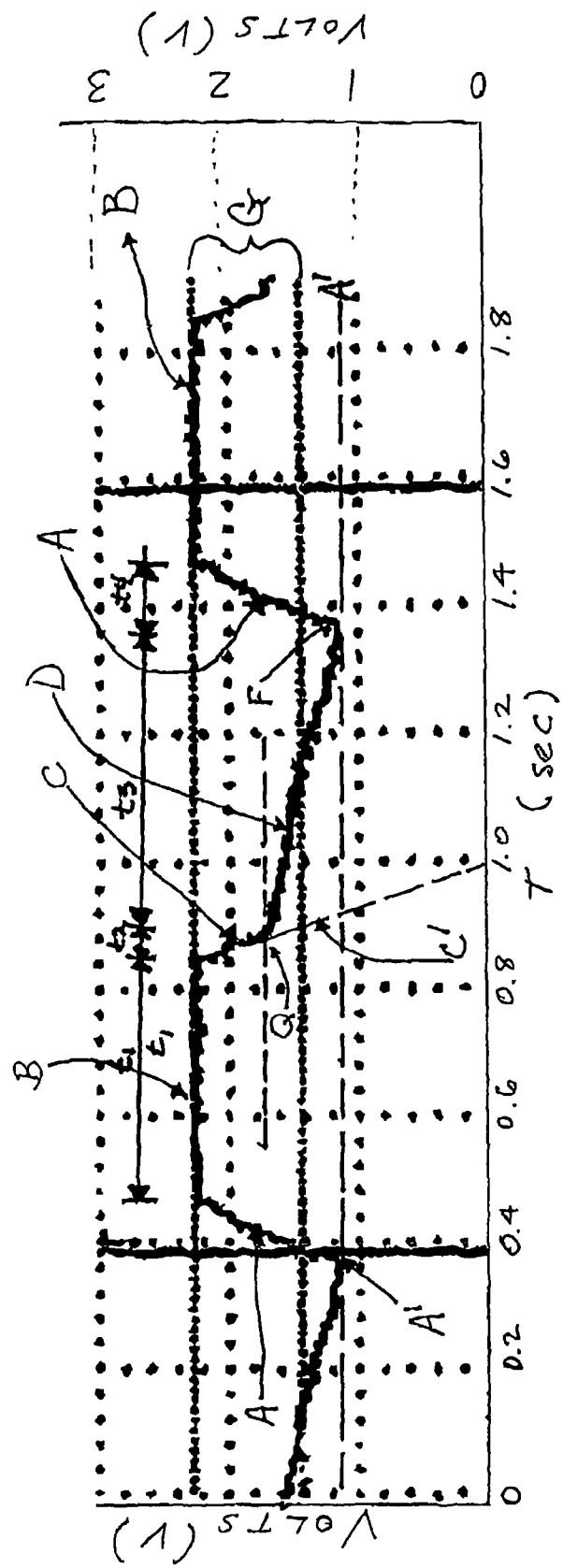
FIG. 1B is an oscilloscope meter display of waveforms according to the present invention.

As FIG. 1A, regions (A) and (B) indicate, if one attempts to provide a DC voltage higher than Vmax, i.e., that at which ferrate(VI) production occurs, the observed and measured voltage will be appear to be "cut off", i.e., held at an essentially constant or a "buffered" value (B). Ferrate(VI) product has been found to be produced at a rate directly proportional to the total flow of electrical DC current being delivered by the power supply. As an example, region (A) of FIG. 1A above voltage level Q is believed to drive increased iron anode dissolution to form both active iron oxide film and soluble ferrate(VI). This increasing reaction rate with increased total cell current, Icell, at a constant voltage effectively increases the current density (and hence the apparent conductivity at the anode surface), thereby, stabilizing the voltage which appears as a flat-topped wave (B) in the oscilloscope trace.

Figure 1B:
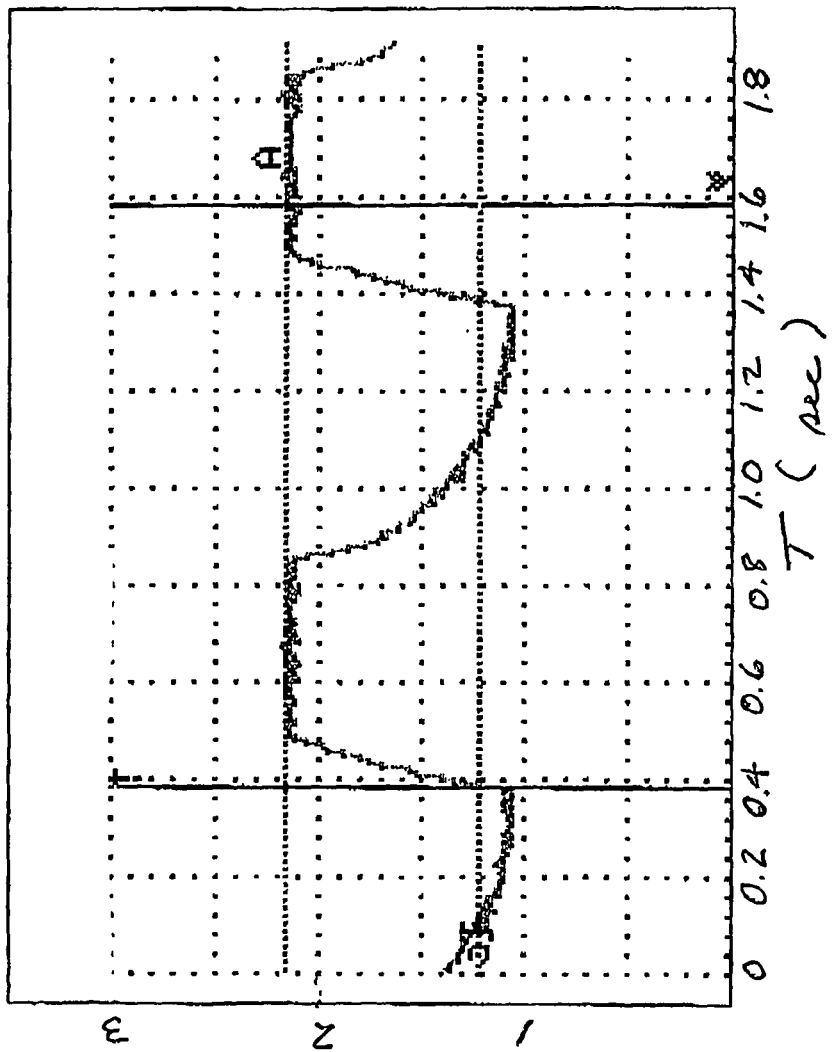

Specifically, referring to FIG. 1A, in a preferred case, the applied voltage, Vcell (G), is increased in roughly square wave form (A), and becomes constant as the voltage increases to Vcell=Vmax, (B). During this voltage sweep ferrate(VI) production commences at voltage level Q, and is believed to be fastest when Vmax is reached. The Vmax voltage is maintained for a selected time ($t_1$), set by the wave form frequency, and then dropped to Vmin (Curve C and D of FIG. 1A) over periods $t_2$ and $t_3$, which essentially results in a zero electrolytic current, i.e., <5% and normally <1% of the total current flow at Vmax. Note however, that it has been discovered that the voltage does not drop off in the form of the wave that is applied (Curve C, C' and A'). This is true regardless of the shape of the applied signal, which can be a square wave, sine wave, rectified AC, or saw-toothed wave, combinations thereof, and the like. Rather the drop off is delayed as shown by the Curve D after time $t_2$, essentially an exponential decay in Vcell with time $t_3$ (Curve D, starting with point Q and ending at point F). This observation is interpreted as indicating that electrochemical (not electrolytic) reactions continue when the applied DC voltage is reduced by the power supply (Curve C) at the selected frequency and waveform as vDC. Thus, instead of following the applied voltage (Curve C plus C'), instead the measured voltage drops exponentially to one level (Curve C) during period $t_2$, then asymptotically to the still lower voltage (Curve D) during period $t_3$ to Vmin point (F) and then remains essentially constant at A' (observed but not shown in FIG. 1A). The voltage then increases again as shown by curve A' during the next voltage pulse giving the voltage sweep A then B. Note that no, or at most a small amount, of ferrate(VI) is made if nonvariable (filtered) DC is employed at Vmax value B for $t_1$. It is important that the voltage be allowed to fall lower than point Q in order to achieve thinning of the iron oxide film to prevent passivation, which also produces more ferrate(VI) (see below for proposed mechanism). Note that at certain cell operating conditions, e.g. FIG. 1B, Curves C and D can blend together somewhat. FIG. 1B illustrates a square wave type used fir an electrochemical cell where the change at the Q point is not so apparent (see FIG. 1A). However, an approximate decrease in voltage to a value of 1.08V from Vmax of 2.3 over about 500 is still very pronounced, and found to be markedly different than the cell-free reference case where a 1 ohm resistor is used in place of the cell. Vmin is still determined and set in the same manner as for FIG. 1A. The appearance of critical Curve D can normally be adequately deconvoluted from Curve C' by collecting a reference oscilloscope trace in which a resistor, e.g. of approximately one ohm or less, and rated to carry the expected current of the power supply, and then comparing this trace to the Curves obtained with the cell in line in place of the resistor.

To determine Vmin, using the power supply of the invention, FIG. 2, Vcell (G) can be reduced from Vmax such that current flow is less than about 10% of the current at Vmax, preferably <5%, and most preferably <about 1%, of the cell current (Icell) measured at Vmax. Typically, the maximum length of time that the voltage is at Vmax $t_1$ is about 1 minute and the minimum time is about 0.001 seconds. Generally, the frequency (peak to peak) of the direct current pulses, A, is between about 0.001 Hz and 1,000 Hz. A typical wave has a frequency of about 0.1 Hz to about 480 Hz, more typically about 0.1 Hz to about 240 Hz, and even more typically about 0.1 to about 120 Hz. The allowed time at Vmin (F) is held as short as possible, typically about 0.01 to 0.2 seconds. Frequency of the power signal is set such that the exponential drop in Vcell from Vmax (Curve C plus D, $t_2$ plus $t_3$) is just completed or is nearly complete, i.e. complete being the point where the voltage reading no longer changes over a period of tenths of seconds to seconds (e.g. set to where at least 80 and preferably more than 90% of the change to Vmin has occurred, or most preferably precisely at the time where the minimum Vcell voltage is equal to Vmin but not longer Point F). The period of time at Vmax ($t_1$), $t_4$, and less than Vmax ($t_2$ and $t_3$) do not need to be equal, and in fact should be optimized separately such to maximize ferrate(VI) production rate. In selecting the period for Vcell<Vmax, $t_2$ is kept as short as possible, about <80 msec, and the time allowed for equilibration D, $t_3$ is adjusted just sufficiently long to provide the maximum ferrate (VI) production efficiency overall and especially at Vmax (since time $t_3$ controls buildup thickness of the active iron oxide layer on the anode during the Vmax portion of the power curve). This control of active iron oxide layer buildup means that the thickness of the oxide layer is reduced during the time $t_3$ whereas it thickens during time $t_1$.

During the Vcell drop-off period between Vmax and Vmin ($t_2$ and $t_3$), it is believed that iron anode dissolution rate is reduced or ceases; however, the spontaneous disproportionation chemical reaction(s) involving Fe(V), and perhaps Fe(IV), to form ferrate(VI) product, $FeO_4^=$, and perhaps other such reactions, continues. This continued reaction, that produces soluble ferrate(VI), occurring without the additional dissolution of iron anode material at the high level of applied voltage (Vmax), causes a reduction in the thickness of the active Fe(III) and Fe(IV) oxide film on the anode preventing formation of a passivating film. After the film thickness has been reduced a selected amount, [which is set by the equilibration time $t_3$ selected to match the cell conditions in use, and is measured as the exponential drop in the observed cell voltage (Vcell) during period $t_3$, to a constant, or nearly constant cell voltage (Vmin, Point F), and whose duration is controlled by DC offset and vDC frequency settings], the voltage A is reapplied as per the set frequency of the power signal where it is ramped up to Vmax B, allowing the cycle of film growth and thinning to be repeated at the preset frequency. In this manner, continuous ferrate(VI) production is achieved and buildup of passivating iron(III) oxide film is avoided resulting in little net change in oxide film thickness over minutes, hours, days and weeks.

Role and Control of Reactive Intermediates in the Production of Ferrate(VI) Using the Invention:

Although not wishing to be limited in this invention by theory, it is useful to have a theoretical basis of understanding of chemical processes to understand the importance of certain parameters and process behaviors. In this vein, a theoretical basis is provided here for important roles for certain highly reactive chemical intermediates that affect ferrate(VI) production using the method of this invention. Such species, most likely consisting of insoluble Fe(IV) hydrated oxide and soluble Fe(V) oxoanionic species, are believed to be involved as highly reactive intermediates in the production of Fe(VI) product, though they are always present at very low levels at any particular time. Such reactive intermediate chemistry behavior is well known in the science of chemistry, being a factor in most chemical reactions. Fe(V) and Fe(IV) axe believed to be involved in the production of Fe(VI) product using the invention in a manner similar to the following proposed mechanism:

Proposed Electrochemical Oxidation and Dissolution Chemical Mechanism for The Production of Ferrate(Vi) Ion From Fe Metal:

While not wishing to be bound by theory, the following model is proposed for the electrochemical production of ferrate(VI) using the electrochemical cell described above and in the Examples in which cells of anode areas ranging from 5 $cm^2$ to 866 $cm^2$ are described. As is well known in the art, the total cell current, Icell, needs to be increased or decreased linearly with anode surface area, as the total cell size is changed up or down, respectively, to retain the desired current densities at the anodes. However, Vcell values are kept essentially constant with scale-up to maintain the same electrochemistry. This is true whether the anodes are single or of "stacked" cell design or whether they are dipole or monopole design. Two sets of chemical reactions are important and are shown below, those that occur during the Vmax portion of the power cycle, $t_1$, and those that occur during the Vcell<Vmax portion especially to $t_3$ and point F.

To help understand why variable DC voltage according to the present invention is effective, a chemical reaction sequence is set forth below. Two sets of reactions are important; the first set, electrochemical oxidation and dissolution, corresponds to the period when the voltage and current density are high ($t_1$, Vmax, Imax), and the second set, disproportionation and dissolution, corresponds to when the voltage and current density are at the minimum values (Vcell <Vmax, $t_2$, $t_3$, point F, Vmin, Imin).

Reaction Set 1:

Electrochemcial and Other Chemical Reactions that occur during the Vmax($t_1$) Portion of Cell Power Cycle (Conditions: Power signal: vDC conditions, undivided cell, Vmax approximately 2.14 volts, preferably 2.3 volts, anode area: 3-1000 $cm^2$, Icell 2-100 A, preferably 50-55 Amps, and anode area=866 $cm^2$ current density at the anode: in the range of 1-100 $mA/cm^2$ preferably 35 $mA/cm^2$ (where anode surface area or Icell are varied such to achieve these current densities), Tcell: 10-70° C., batch or continuous flow-through electrolyte. Electrolyte: 17-52% NaOH with or without added KOH or other hydroxide salts):

| Chemical "Half-Cell" Reaction (waters omitted for clarity)[d] | Estimated Relative Reaction Rate | Rx. # |
|---|---|---|
| $Fe^0 + 2OH^- \rightarrow \underline{Fe^{II}(OH)_2^o} + 2e^-$ | fast to very fast | (4)[a] |
| $\underline{Fe^{II}(OH)_2^o} + 2 \underline{OH^-} \rightarrow Fe^{II}(OH)_4^{2-}$ | very fast | (5) |
| $\underline{Fe^{II}(OH)_4^{2-}} \rightarrow Fe^{III}(OH)_3 + e^- + OH^-$ | fast | (6)[a] |
| $Fe^{III}(OH)_3 + OH^- \rightarrow \underline{Fe^{IV}(O)(OH)_2} + e^- + H_2O$ | slow to rapid[c] | (7)[a] |
| $Fe^{II}(OH)_4^{2-} \rightarrow \underline{Fe^{IV}(O)(OH)_2} + 2e^- + H_2O$ | fast | (8a)[a] |
| {and/or $Fe^{II}(OH)_2 + H_2O \rightarrow Fe^{IV}(O)\underline{(OH)_2} + 2e^-$ | fast | (8b)}[a] |
| $\underline{Fe^{IV}(O)(OH)_2} + 4OH^- \rightarrow Fe^VO_4^{3-} + e^- + 3H_2O$ | slow (RDS)[b] | (9)[a] |
| $Fe^VO_4 \rightarrow Fe^{VI}O_4^{2-} + e^-$ | fast | #(10)[a] |

[a]Rate determined by applied current density
[b]RDS = rate determining step due to geometry change
[c]This may be a slow reaction depending on degree of hydration, oxide film thickness, etc., of the anode surface iron oxide film (see text)
[d]Underscore indicates solid oxide film phase component on surface of anode Followed by, Reaction Set 2: Disproportionation and Dissolution of Active Red-Orange Iron Oxide Layer on the Anode That Occurs During Vmax and Vcell<Vmax to Vmin ($t_1$, $t_2$ to $t_3$) Portions of the Cell power Cycle.

[Conditions: Voltage of the vDC signal ranging from Vcell<Vmax to the Vmin condition: e.g., Vcell at about 0-2.1 volts, preferably 1.7 volts, with Icell=0.001-1.0 A, (i.e. very low current density but not zero). Other conditions are the same as Reaction Set 1.]

| Chemical Reaction (Showing only oxidation state changes) | Estimated Relative Reaction Rate | Rx. # |
|---|---|---|
| 2 Fe(IV) = Fe(III) + Fe(V) | slow to medium | (11) |
| 2 Fe(V) = Fe(IV) + Fe(VI) | slow to medium | (12) |

The chemical species are of the same representative formulas given in reactions (6) through (10).

In the above reactions, Sets 1 and 2: a) water molecules omitted for clarity, b) RDS is the slowest or "rate determining" step due to the change in molecular geometry from six coordinate (Oh) to four coordinate (Td), c) Conditions disfavoring reaction (6) and promoting reaction (8a and 8b) are believed to be desirable by avoiding the formation of possible slow reacting Fe(III) species which might slow the dissolution rate of the active film.

The above-proposed chemical mechanism is consistent with the operating cell data and observations of the invention for both batch and continuous cell operational modes. Reaction (8) is preferred over the combination of reactions (6) and (7) if reaction (7) is slow (which is highly probable if slowly reacting iron(III) oxides, vs. hydroxide, species are formed). That reaction (10) may be the main path for ferrate production is supported by invariant observations that exceeding a threshold minimum vDC voltage/current density appears to produce ferrate(VI) at a fast rate, and below this vDC voltage/current density, the rate of ferrate production does not appear to proceed rapidly, if at all. These conclusions apply to both batch and continuous cell configurations and, were used to establish the continuous production conditions described herein that have proven to be very robust, including demonstrations that the cell of the invention is not prone to passivation at these conditions, and readily recovers should process "upsets" occur, i.e. power failure, or electrolyte flow stoppage.

Reactions (11) and (12), correspond to thinning of the active iron oxide surface film, created while the cell is at the Vmax condition [reactions (4), (6), and (7)], because the Fe(V) and Fe(VI) products are water-soluble and diffuse away from the film. Therefore, this active film is proposed to consist of a combination of Fe(II), Fe(III), and Fe(IV) oxyhydroxides which form in reactions (4), (6), (7) and (8). Therefore, by allowing reactions (9) through (12) to occur, where only reactions (11) and (12) occur at Vmin<Vcell<Q, the forming of a thick, passivating oxide film, by reactions (7) and (8), is avoided. Significantly, at the cell condition of the invention, if such a passivating film is formed, then it is observed that the electrochemical power drives formation of a thicker oxide film rather than oxygen gas production, and the film loses its uniform red-orange color, developing instead blotched colors of rust, brown, black, and orange and yellow. This observation is interpreted as being due to the passivating film being poorly electrically conductive but of sufficient water porosity such that the iron metal dissolves to form more iron FeIII-based oxide beneath the passivating film Reactions 4, 5, and 6), thereby thickening this barrier film. That very little, if any oxygen is formed at the anode at the described cell design and operating conditions, is viewed as a significant beneficial characteristic of the cell of the invention as such gas production would represent a competitive consumption of electrical power to that used for ferrate (VI) product production. Without the tendency for oxygen gas production theoretical electrical current efficiencies can approach 100%. It also removes opportunities to form explosive gas mixtures. Current efficiencies of up to 60% have been observed in the operations of the cell of the invention (based on the amount of ferrate(VI) formed per electron applied to the cell). As is well known in the art, optimization of the cell designs and operational parameters described in the invention would be expected to increase the current efficiency values still further, and could be expected to reach 90%, and perhaps >95%. A current efficiency of only about 1.0-20% is needed for the invention to provide commercially viable specialty chemical ferrate(VI), and at least 20-30% to provide a large volume commodity chemical product. With the invention laboratory sample preparations are practical at current efficiencies of 0.1-10%.

Role of Hydroxide Ion:

The role of hydroxide ion or caustic is clearly seen in the above-described mechanism because the formation of oxides requires OHf ions, and the prevention of reactive protonated species (e.g., $HFeO_4^-$) avoid product decomposition, thereby stabilize the product and favors the formation of soluble oxoions over hydroxide compounds. The caustic increases the solubility, and hence the mobility and reactivity, of FeIII and FeIV ions, normally highly insoluble, through anionic complex formation reactions, i.e.,

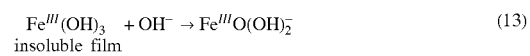
(13)

and

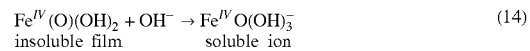
(14)

These formulas are illustrative only. Specific molecular formulas can vary by water content, deionization, and in other ways.

Depending on the temperature/time/concentration profiles, the Fe(III) species may be best represented as $Fe(OH)_3$ or as FeOOH. These are taken as chemically equivalent in the above mechanism discussion. Note also that $Fe^{III}$ oxidation state notation type is equivalent to Fe(III) notation type for all Fe species, as persons skilled in the art will know.

Importance and Rationalization of System Electrolyte Volume to Anode Surface Area Key Parameter for Enhancing Electrical Current Efficiency:

While not wishing to be bound by theory, it is believed that the presence of the soluble Fe(V) species explains why the anolyte volume to anode surface area ratio (Velecnolyte/Aanode, or just "V/A") is a relevant process control parameter, and certain aspects of product reactivity. This V/A ratio determines the time that the reactive species is allowed to exist outside the cell until it is re-introduced to the cell so that it can be further oxidized to Fe(VI) by Reaction (10). Based on this, a second cell can optionally be included in the anolyte exit electrolyte stream to complete the oxidation of to Fe(V) to Fe(VI) product [Reaction (10)] using a non-sacrificial anode such as Pt on Ti, carbon, a dimensionally stabilized anode (DSA), and the like. Addition of a small amount of strong chemical oxidant (e.g. persulfate, monopersulfate, oxone, hypochlorite, chlorine, and the like) is also effective in completing reaction 10 in the electrolyte emerging from the cell. The polishing cell is most preferred and chemical oxidant addition least preferred.

Therefore, on exiting the production cell, the electrolyte carrying soluble Fe(VI) and a small amount of Fe(V) may optionally be sent through a "finishing" or "polishing" cell to convert at least a part of this Fe(V) into Fe(VI) product. If this is not done, the water-soluble and reactive Fe(V) ("reactive intermediate") may react with hydroxide ion or water to produce colloidal Fe(III) particles, e.g.

$$Fe(V)+2OH^- \rightarrow Fe(III)+\tfrac{1}{2}O_2+H_2O. \tag{15}$$

or some other reaction. This Fe(III) oxide colloid can be filtered out of the electrolyte using a filter of about 10-micron porosity. However, it is preferred to avoid such Fe(III)-based by-product as any oxidation, i.e. Fe(V), loss represents a decrease in current efficiency. As an alternative to, or in addition to, the use of a finishing cell, small amounts of a strong chemical oxidant can be added, such as hypochlorite ion or monopersulfate ion, etc. For example 50 cc of aqueous 5% NaOCl is sufficient to treat 700 ml of anolyte. Note that, if chloride ion or hypochlorite ions are undesirable to have in the crystalline ferrate product, then the ferrate product can be cleaned of such impurities by one or more recrystallizations.

Another side reaction at the anode surface that is minimized by the invention is $$Fe(VI)+Fe(0)\rightarrow 2Fe(III) \text{ (e.g. as } Fe_2O_3\text{)} \tag{16}$$

because this Fe(III) product rapidly forms a film that passivates the anode. Hence, it is undesirable to stop the variable DC power to the cell at any time after ferrate(VI) production is in progress. Such Fe(III) oxides are not reactive (as noted above) but can be removed or converted to ferrate(VI) producing the red-orange active film using the variable DC power supply conditions disclosed by this invention. Hence recovering ferrate(VI) production without having to dismantle and clean the cell and electrodes of passivating film is a significant benefit of the invention.

Effect of Temperature:

For the invention, temperature control optionally can be used to increase electrical current efficiency for ferrate(VI) production by using it to limit Fe(VI), and perhaps Fe(V), losses by side reactions, speed the ferrate production reaction rate, and increase diffusion rates. The latter reduces both total cell voltage (and hence it decreases power consumption), and increases diffusion of Fe(VI) product ions from the anode surface. By increasing Fe(VI) product diffusion rates, the Fe(VI) concentration, $[FeO_4^=]$, next to the anode, the location where $[FeO_4^=]$ is always the greatest (its point of production), is kept at a minimum. Keeping $[FeO_4^=]$ at a minimum is beneficial as it increases electrical current efficiency by minimizing Fe(VI) losses due to decomposition by self reaction, which is known to be second order in $[FeO_4^=]$, i.e.

$$2FeO_4^= + 3H_2O \rightarrow 2FeOOH + \tfrac{3}{2}O_2(g) + 4OH^- \tag{17}$$

Since reaction rates, such as this reaction, increase with increasing temperature, there will be an optimum temperature affect. Thus, an increase in temperature avoids side reactions with the anode electrode by providing increasing electrical current and efficiency, ferrate(VI) ion diffusion rates from the anode surface, and avoids deposition of byproducts, such as FeOOH. Effective temperatures for cell operation are about 10° C. to about 80° C. More preferred are temperatures of about 25° C. to about 50° C., while most preferred are temperatures of about 40° C. to about 45° C. On the other hand, decreasing temperature of the anolyte upon exiting the cell is believed to be beneficial for increasing cell electrical current efficiency by decreasing the rates of all Fe(V) and Fe(VI) decomposition reaction pathways, and also the solubility of the recovered product salt, e.g. $Na_2FeO_4$, $K_2FeO_4$, $SrFeO_4$, $BaFeO_4$, $ZnFeO_4$, $MgFeO_4$, $CaFeO_4$, and/or $Li_2FeO_4$, and/or mixtures, blends, double salts, and hydrates thereof, and the like.

Total Cell Voltage (Vmax):

For the membrane-less cell of the invention, the range of acceptable Vmax voltages are 1.7-4.0V, preferred is 2.0 to 2.5V, and most preferred is 2.5-2.9V. It is believed that the lowest value for Vmax is largely limited by the reaction chemistry for the entire cell (both anodic and cathodic reactions), and the voltage predicted by the Nernst equation, corrected for internal cell resistances. Although desirably low, this voltage range was found to be sufficient to drive the ferrate(VI) production desired reaction, to give high current efficiencies, and provide a low hazard process.

FIG. 2 illustrates on embodiment of a typical apparatus, 200, for supplying a variable D.C. voltage to an electrolyte cell according to the invention. Frequency generation, 210, provides a selected waveshape, e.g. sine wave, square wave, saw-tooth wave, or a custom generated waveshape to control circuit, 220, via signal, line 215. Control circuit, 220, adds offset voltages (DC) and provides the necessary signals via signal line, 225, to high amperage DC power supply, 230. Typical control signals provided by control circuit, 220 included waveshape, vDC offset voltage, frequency control, and voltage levels. The DC power supply generates the selected DC potential that is placed across the ferrate production cell 240 via line, 235. DC power supply 230 is selected to provide the current and voltage required by the cell, 240, typically 1-500 A (more precisely 1-200 mA/cm² of anode), and 0-5 volt cell. Bipolar cell arrangements will require higher voltage, that is approximately Vmax times the number of individual cells.

A lower Vmax was determined to be effective (Vmax=1.7V) by dropping the total current to ⅓ of the power supply maximum for the cell (about 15 A) with an anode surface area of 866 cm² (17.3 mA/cm²) described below. This change resulted in elevated current efficiency for the 8 hours of the test. One tenth of this current (about 1.7 mA/cm²), was also found to be effective in generating ferrate(VI) according to the cell of the invention for a period of more than two weeks in which very little if any by-products were observed. Low voltages are desirable from an economic standpoint because power costs are proportional to voltage [P(watts)=I·V]. It is well known in the art that using a lower voltage will result in a significant reduction in energy costs. This is a major benefit of the invention as the many industrial applications for ferrate (VI) require commodity chemical pricing. The production rate increases in proportion to overall cell current, I cell, and does so in a linear (straight line) fashion if current efficiency is constant, or is curved if current efficiency changes as the current density increased or decreased. Hence, an optimal current density is to be used to balance these two effects in order to provide the greatest current efficiency and production rate for ferrate(VI) manufacture in those cased requiring the lowest product manufacturing cost. For the cell of the invention, the functional current density range is 1-200 mA/cm², preferably 2-80 mA/cm², and most preferably 20-60 mA/cm².

Using the 866 cm² anode example (see below), the DC current sweep for the vDC was typically from 1 to 53 A (the maximum output current allowed by the power supply). During one test, the maximum current was decreased to 17 A. This decrease in current resulted in a proportionally lower production rate of ferrate(VI). However, since the amount of current passed to the cell was lower, the resulting current efficiency remained the same.

Variations in the frequency were also tested using a power circuit of the type shown in FIG. 3. FIG. 3 illustrates one typical control circuit 220 that is useful with the invention. However, it is noted that the control circuit may be any off shelf unit that provides the control signals selected for the power supply 230. Power supply 310 typically connected to 115 AC has three outlets, one for +24 DC, a second for ground (OVDC), and a third for −24 vDC. Voltage control unit 320 (type 7815) provides a positive voltage for pins #7 for operational amplifiers 350, 352, 354 and 356 (all type LM741). Voltage control unit 2022 (type 7915) provides a negative voltage for pins #4 on operational amplifiers 350, 352, 354, 356. Voltage control unit 324, 326 (type 7805 and 7905) provide a positive/negative voltage reference (respectively) to the voltage offset control 330. Offset control 330 provides the voltage offset for controlling the minimum voltage applied to the ferrate production cell. Input from the frequency generator for frequency, waveshape, and the like is received at generator input 338. Amplitude of this input signal is controlled by amplitude control 340. The control signal for the power supply 230 is provided at output 360. Various resistors (R1—R8) and capacitors (C1-C2) were used with their values indicated in FIG. 3. Control circuit 220 was that actually used for tests herein.

Figure 4:
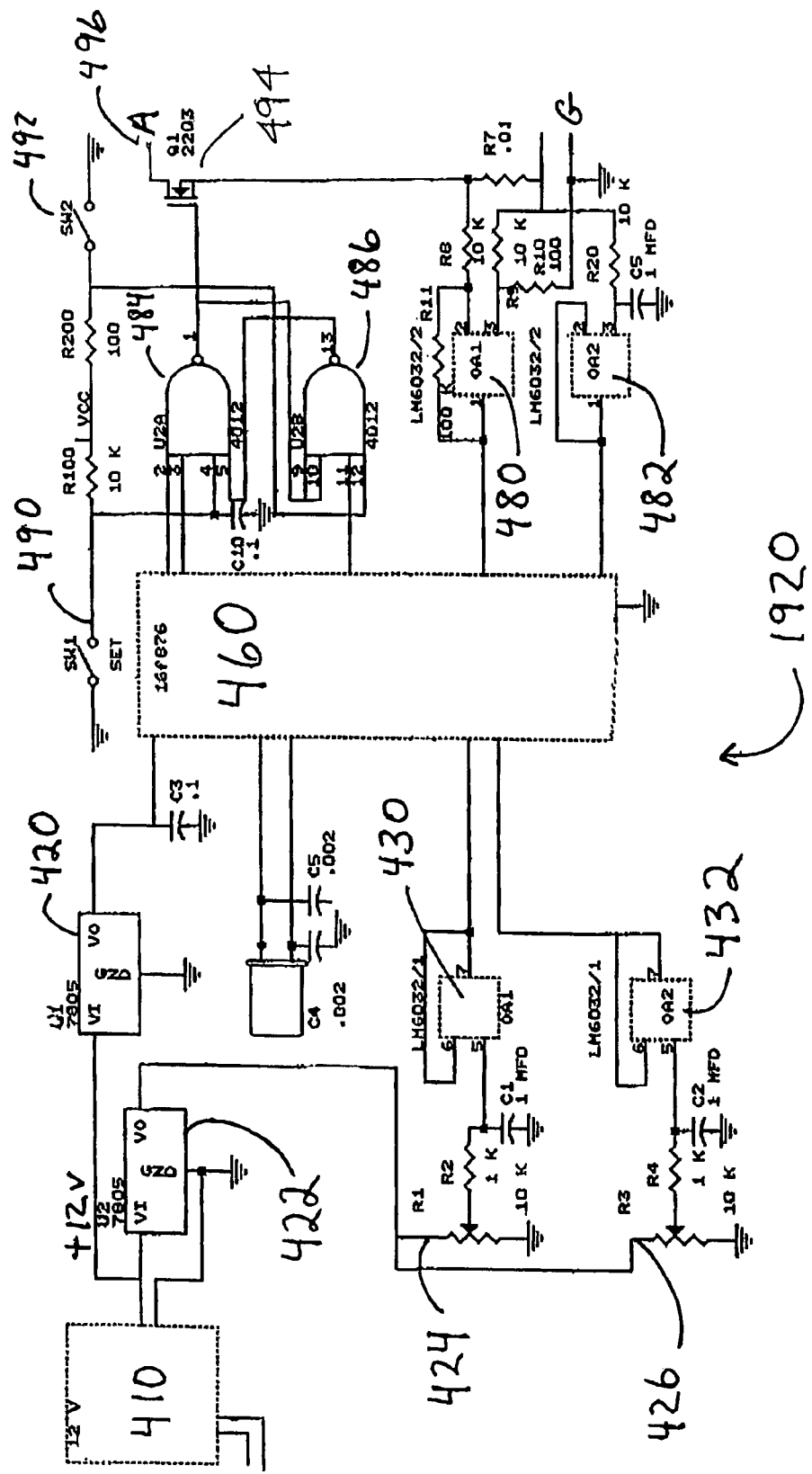
FIG. 4 is a schematic diagram of one version of a controller (that uses a microprocessor) for controlling a power supply for providing appropriate varying DC to the apparatus of the invention.

Another embodiment for a control unit is shown in FIG. 4. Although not used yet this controller can be used to provide the voltage control to electrochemical cell 240. A twelve volt power supply 410 connected to external 115V AC provides ground and a 12V supply voltage. Voltage controller 420 (type 7805) provides output voltage control to microprocessor 16f.876. Voltage controller 422 (type 7805) provides a voltage signal for variable resistors 424 and 426. Voltage amplitude is adjusted at variable resistor 424 and voltage offset at variable resistor 426. Operational amplifier 430 provides the amplitude signal to the microprocessor. Operational amplifier 432 provides the offset signal to microprocessor 460. Operational amplifier 480, 482 (type LM6032) and processor 484, 486 (type 4012) provide waveform and frequency control. The units set and reset via switches 490 and 492 respectively. A transistor 494 (type 2203) provides power control. Signals to the external power supply 1330 are provided at output 496. The electrochemical cell is connected across points A and G.

In one series of tests, the frequencies used were 0.02, 0.5, 1, 2, 2.5, and 5 Hz. Under the conditions tested, no clear trends were observed with these variations and, hence the full range of frequencies was effective. Other tests used 60 Hz and 120 Hz, which were also found effective. Waveform appeared to have some impact on current efficiency but still minor. For the equipment used and the range of frequencies performed in the tests, it appears that for a given waveform with similar voltage characteristics, current efficiency increases with frequency. However, note that optimal current efficiency values depend on specific values of Vmax, waveform and current density used.

With the teachings of the present invention, a person skilled in the art will be able to perform routine statistically designed ferrate production rate and current efficiency optimization tests to identify the most efficient combination of power supply frequency, current density, and waveform, Vmax, and Vmin profile. Importantly, very good current efficiencies and selectivity have been demonstrated.

The observation is that ferrate(VI) formation only occurs during a narrow voltage range. The experiments indicate that it is most preferred that Vmin should never be zero or below (i.e., power forms not desired are alternating currents (AC), or AC superimposed on DC such that Vac>Vdc, to avoid product decomposition and passive film formation). The data for Vmin of about 1.7 volts suggest that reactions (4), (5), and (6), and probably (7) and (8), are always kept maintained reacting left to right by the preferred cell operating Vmin voltages, and are never completely stopped, or allowed to reverse by lowering the voltage below Vmin, and especially by lowering Vmin to less than 300 volts. Reactions 4 through 12 therefore correspond to the low level of electrolytic electrochemical change occurring at 1 min.

One means to refine the settings for Vmax and Vmin, regardless of waveform, and using the vDC high amperage power supply described, the procedure is to power up the cell within the above voltage, current density, and temperature ranges for any cell designs of the invention, is to then use the control circuit (FIG. 2) to adjust Vmax, DC offset voltage, and frequency to maximize the curve portions D and B (FIG. 1A).

Electrolyte Composition:

The electrolyte is typically an alkaline solution of a metal ion hydroxide or metal ion hydroxides, or the equivalent. Suitable hydroxides include, but are not limited to, NaOH alone or in combination with, KOH, LiOH, RbOH, CsOH, $Ba(OH)_2$, $Ca(OH)_2$, $Al(OH)_3$, $Ga(OH)_3$, $Cd(OH)_2$, $Sr(OH)_2$, $Zn(OH)_2$, $La(OH)^3$, or combinations thereof. The electrolyte can be a blend of these hydroxides, preferably NaOH, and/or LiOH without, or with, smaller amounts of the others. The molar concentration of NaOH is greater than 17%, typically greater than 20%, preferably about 8.4M (25%), and more preferably greater than 14 molar (40%), and most preferably greater than 40% but less than 53%. For those cases where only ferrate (VI) solution or sodium ferrate(VI) product is desired, only sodium hydroxide is needed as electrolyte. For other ferrate(VI) products, sodium hydroxide is blended with the appropriate metal ion hydroxide. For example, for direct production of potassium ferrate(VI), a blend of KOH and NaOH is used. KOH alone is effective only for producing low amounts of ferrate(VI) as rapid coating of the anode with $K_2FeO_4$ solid occurs. For $K_2FeO_4$ production, the molar ratio of KOH:NaOH is typically 0.40 or less, and preferably equal to or less than 0.25, but greater than 0.02. One preferred electrolyte includes about 40 to about 45 wt % NaOH and about 3 to about 6 wt % KOH. During continuous operation the KOH:NaOH ratios are maintained by addition of additional electrolyte, water, or concentrates. Removal of product removes some of the cation which is periodically replenished, normally by direct additions of concentrate hydroxide solution to the surge tank. Of course, in-line mixing additions also can be performed under automatic controls, and such make up addition methods are well known to those skilled in the art of process engineering. Electrolyte density, acid/base titration, AA analysis and/or ion chromatography of cations are all methods suitable for maintaining electrolyte viability and process control.

Ferrate(VI) Production Cell Design and Operation

Figure 5:
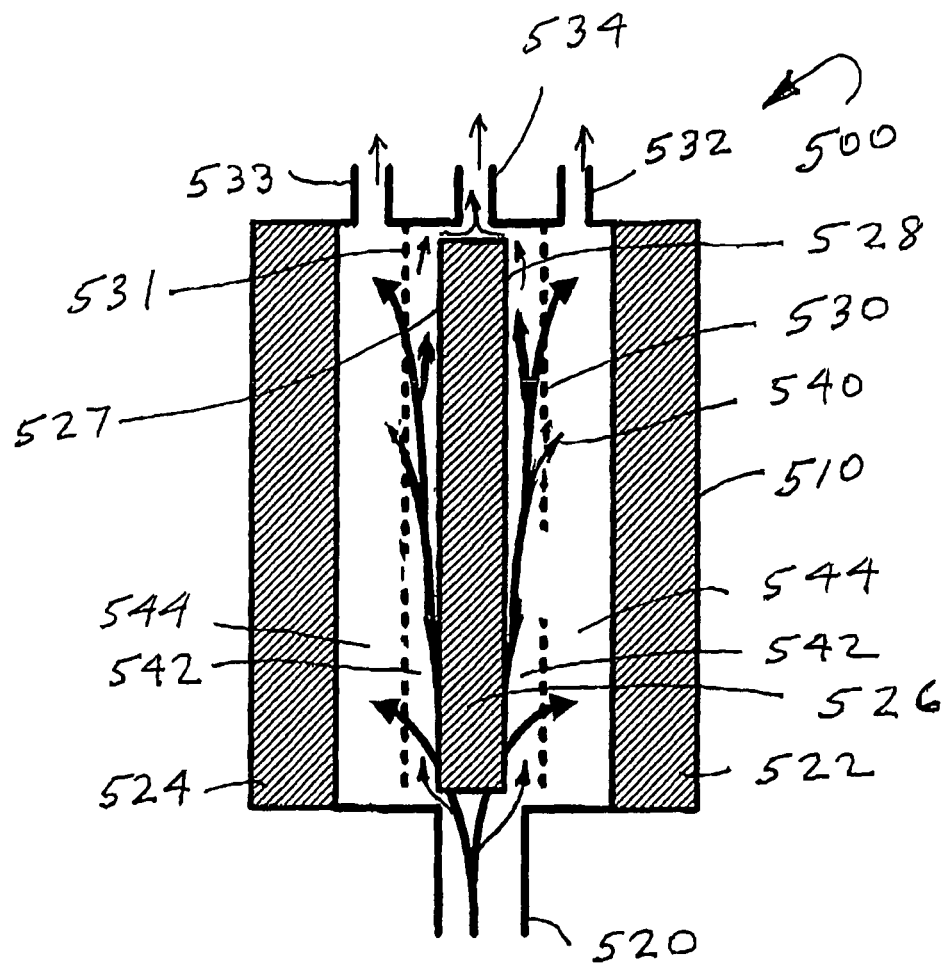
FIG. 5 is one embodiment of an electrochemical cell according to the present invention which illustrates electrolyte flow pattern around the electrodes, and replenishment pattern of electrolyte through the screen to the cathode.

FIG. 5 shows a typical two-compartment electrolytic vDC powered cell 500 according to the present invention. The cell 500 includes a housing 510. Within the housing is an anode 526 and two cathodes 522, 524. There are two optional (most preferred) screens 530, 531 located between the anode 526 and the cathodes 522, 524. There is preferably just one electrolyte inlet 520. There are preferably two types of electrolyte outlets 524, (anolyte), and 532, 533 (catholyte) for each anode/cathode pair. The electrolyte outlets may have a fluid controller not shown in this figure for controlling the flow of electrolyte out of the cell 500.

The housing 510 can be made of any suitable caustic and oxidant resistant and compatible materials, as is well known to those in the art. For example, metal or fiberglass reinforced plastic with a polypropylene plastic liner, concrete with a rubber liner, polyolefin (polyethylene, polypropylene, polyvinyl chloride, polyvinylidene difluoride, Viton®, Teflon®, etc.) or other materials could also be used, and combinations thereof.

The anode 526 is made of a material containing iron. Or, the electrolyte is formulated to carry iron or iron ion containing suspended particles or solution. Suitable anode materials include, but are not limited to, pure iron, cast iron, wrought iron, pig iron and steel. The anode can take any suitable configuration, including, but not limited to, solid plate (preferred), expanded metal mesh, wire mesh, woven metal cloth, wire, rod, or combinations thereof. Preferably, the anode is a flat plate of iron with minimal amounts of Mn preferably with <0.5% of Mn, and more preferably <0.1% Mn, and still more preferably <0.01% Mn, and most preferably <0.001% Mn (10 ppm) when the electrolyte contains the iron as particles or solution, then the anodes are selected to be non-dissolving, for example, DSA, Ti, Pt, Pd, Ir and graphite.

The cathode 522, 524 can be made of a variety of materials, including, but not limited to, nickel, titanium, platinum, tin, lead, cadmium, mercury, stainless steel, graphite, alloys thereof, or laminates thereof. By "laminate", it is meant one or more layers electroplated or pressed over a substrate, e.g., steel, iron, aluminum, copper, graphite, or plastic. The cathode can have any suitable shape, including, but not limited to, solid plate, expanded metal mesh, wire mesh, woven metal cloth, wire, rod, or combinations thereof. The cathode is most preferably made of nickel-plated steel, nickel-plated iron wires or expanded metal. A typical cathode would be an expanded metal mild steel, e.g., ST 37, plated with semi-bright nickel.

Optional screens 520, 531 are placed between the anode 526 and cathodes 522, 524 and are used to control the flow of electrolyte, the flow of which is schematically depicted by arrows 540. Preferably most of the flow stays in the vicinity of the two faces 527, 528 of anode 526 and away from cathodes 522, 524. The optional screens 530, 531 are used for flow control to enhance flow within the volume 542 anode side of the screen. Thus the majority of electrolyte flow will be close to the anode and will exit at outlet 534. Electrolyte near the cathodes 522, 524 in volume 544 on the cathode side of screens 530, 531 will exit via outlets 532, 533. Those skilled in the art will appreciate that the electrochemical cell shown in FIG. 5 can be operated so as to only have one cathode and one anode (e.g. right hand side of the figure, or to have a multiplicity of cathodes and anodes as discussed later herein. In addition the apparatus of FIG. 5 can have the anodes and cathodes switched so that the cell 500 now has one cathode in the center and an anode to the left and an anode to the right.

The ratio of the surface area of the anode to the surface area of the cathode, A/C area, is generally at least about three to five, although it can be more or less, if desired, including 1:1 or even 0.9:1.0, which allows a slight overreach of the area of the cathode over the anode to provide electric field uniformity at the anode surface. More preferred is an A/C area value of 3/1, even more preferred is an A/C area ratio of <1. The advantage of high A/C surface area ratio is that access by ferrate(VI), contained in the electrolyte, to the cathode surface is reduced relative to lower A/C ratios. This effect is most desirable from a current efficiency enhancement perspective and it was determined that magnetic, black, dendritic crystalline particles are produced efficiently at the cathode during cell operation if the enclosed described design and operating precautions are not met and ferrate(VI) is allowed access to the cathode. These magnetic particles are believed to be the magnetite type, $Fe_3O_4$, and are believed to be formed from electrolytic reduction of ferrate(VI) at the cathode, by chemistry equivalent to the following half reaction

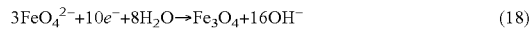

$$3FeO_4^{2-}+10e^-+8H_2O \rightarrow Fe_3O_4+16OH^- \quad (18)$$

As this reaction requires the negatively charged ferrate(VI) ion to diffuse to the negatively charged surface of the cathode, after being produced at the anode, it was possible to invent internal cell construction and fluid flow designs to limit this side reaction. Note that the primary cathodic electrolytic reaction products, OH⁻ and $H_2$ (gas) (Reaction 19) are not so diffusion limited as large amounts of water always exist at the cathode, and the cathode is most preferably constructed of materials with low hydrogen over potentials (nickel and the like). Note that the H2 (gas) bubble formation at the cathode desirably helps limit access of ferrate(VI) ion to the cathode surface.

$$2H_2O+2e^- \rightarrow H_2(g)+2OH^- \quad (19)$$

Hence, the optimal A/C ratio value is set by the lowest of the maximum cathode surface electrical current density possible or the maximum anode current density possible.

The cell can optionally include a screen 30. The screen can be made of any material which is not rapidly attacked by caustics or oxidizers. A suitable material is plastic, including, but not limited to, polyolefins, such as polypropylene, fluoropolymers, and polyvinyl chloride. The screen will typically have a mesh size of at least about 1 mm or less (U.S. sieve mesh) and preferably 0.1 mm or less, but greater than 0.01 micron.

In one preferred embodiment, FIG. 5, there is typically one electrolyte inlet 520 per anode. In other embodiments, there could be more than one electrolyte inlet. For example, there could be two electrolyte inlets on opposite sides of the cell to provide a uniform distribution of electrolyte to the cell. Other arrangements could also be used, if desired. In a preferred embodiment, a large number of cells are arranged in parallel "cell stack" in which the electrolyte is fed to a flow distributor beneath the anodes and the flow is distributed as per FIG. 5 on all electrodes, and where cathodes terminate the ends of the stack.

The electrolyte flows in though the electrolyte inlet 520, divides and flows around the anode 526, and out through the electrolyte outlets 421, 533, 534. The screen 530 helps to restrict the flow of electrolyte to the anode side and hence this stream is referred to as anolyte. Substantially more electrolyte flows past the anode 526 than flows past the cathode 522. The ratio of the amount of electrolyte flowing past the anode to the amount of electrolyte flowing past the cathode is typically at least 60:40, preferably at least about 80:20, more preferably about 90:10, and most preferably about 95:5 or greater. This ratio could also be 100:0 (no catholyte flow) but this ratio is not preferred. The amount of the electrolyte flowing past the anode and cathode can be controlled by a fluid controller. Suitable fluid controllers include, but are not limited to, one or more valves FIG. 13, 1350, or flow restrictions, or weirs in one or both of the electrolyte outlets. When such flow splitting is performed, it is preferred that the catholyte not be recombined with the anolyte until the surge tank, FIG. 16, 1670.

Figure 6B:
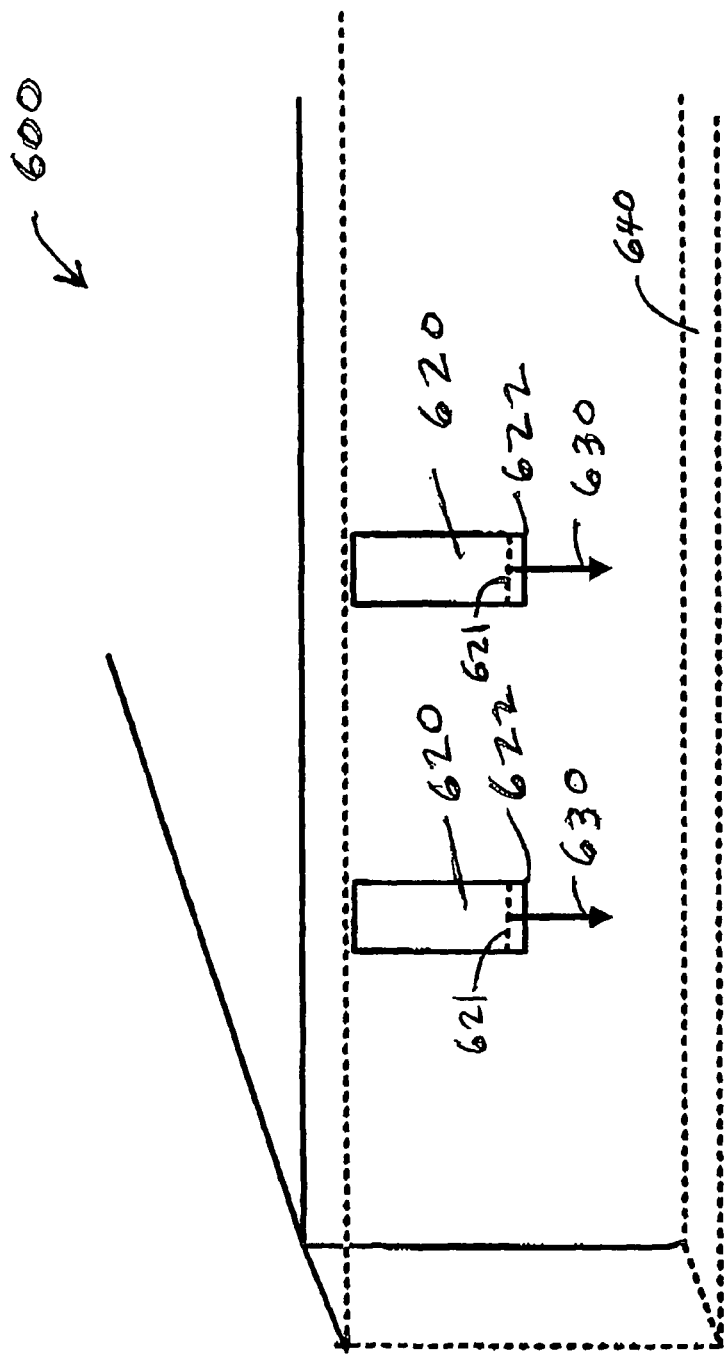

Scaleable Ferrate(VI) Production Cell:

FIGS. 6a and 6b show opposite sides of another embodiment of a scaleable and readily constructed electrochemical cell of the invention 600. The electrolyte outlet 610 for the catholyte is shown in FIG. 6a, while FIG. 6b shows the electrolyte outlet 620 for the anode. Top of the liquid level 621 for cell 600 is shown in both FIGS. 6a & b. The weir 622 for the anolyte electrolyte outlet is higher than the weir 612 for the catholyte electrolyte outlet 610. Therefore, the catholyte compartment will be assured of sufficient electrolyte to remain full if there is liquid present or flow exiting over the anolyte weirs 622. More electrolyte would tend to flow out of catholyte outlet 612 than 662, except the trough 650 collecting the combined flows 640 from 612 contains a second adjustable weir, or valve, or other constriction (1350 in FIG. 13), that is adjusted such that weirs 612 are kept flooded, forcing the catholyte exit liquid level control 622 to control the flows from 620 to in fact control the flow over weirs 612. As the flow 630 exiting from weirs 622 are not restricted as it exits the cell, most of the electrolyte flow via associated trough 640 and is forced to exit very reliably (simple gravity overflow) via weirs 622. Such design can be easily scaled to enormous production scales, e.g., hundreds and even thousands of gallons per minute with rugged and reliable design, excellent control, and very low cost, without the need for complex and costly electronic controls, valves or pumps. Other fluid controllers can optionally be used, as are well known in the art.

Figure 8:
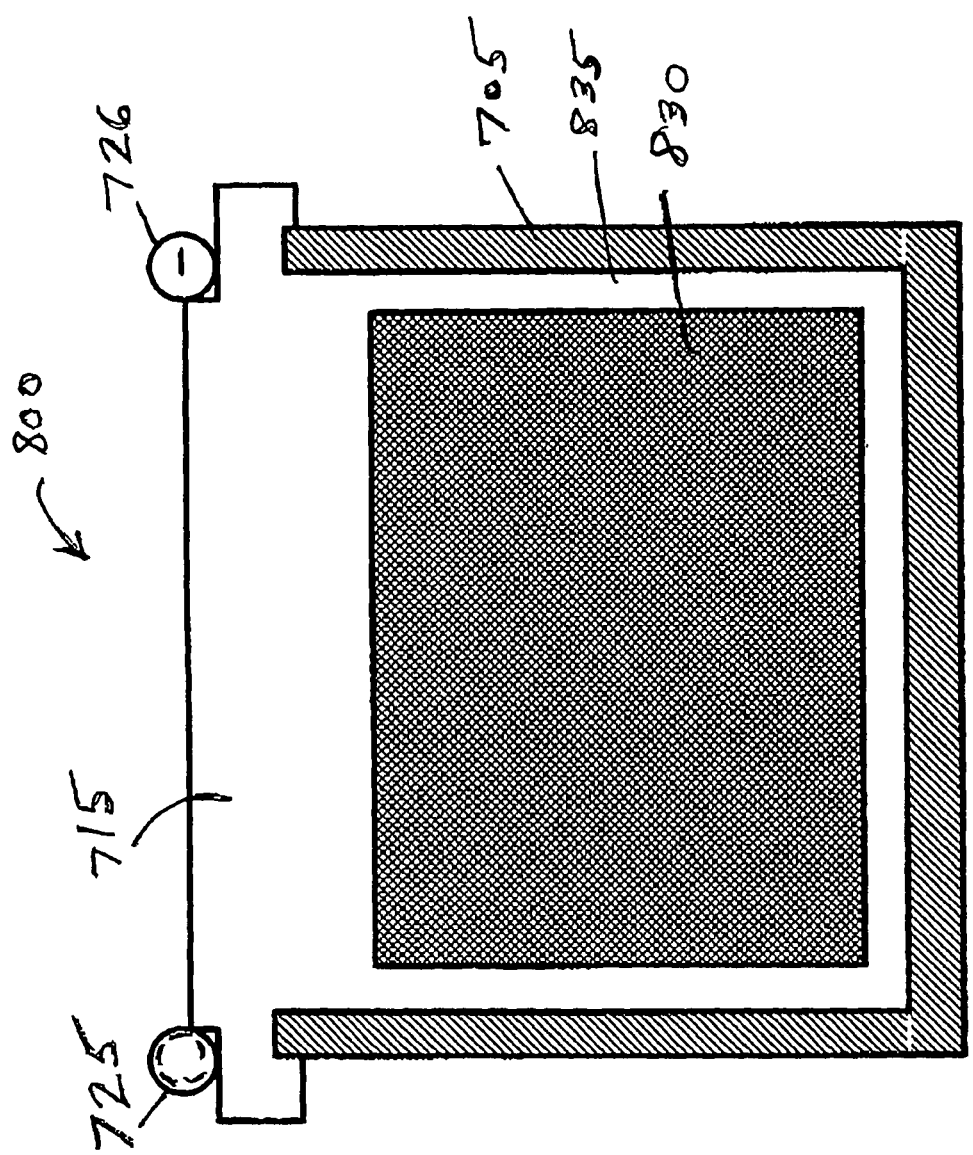
FIG. 8 is a cutaway side view of one embodiment of an electrochemical cell showing a typical screen framed in the spacer. In some embodiments the screen is not present, only its support spacer.

FIGS. 7 and 8 show end-view portions of a typical electrolytic cell 700 of the invention. The cell 700 includes tank having a wall 705. The tank contains electrolyte 707. There is an anode 710 mounted between the tank walls 705 with close but not touching clearance. The anode 710 is connected to an electrically connecting crossbar 715 by electrically conducting hangers 720. The crossbar 715 can be made of copper, iron, stainless steel, carbon, nickel, nickel-plated, Mn steel, nickel-plated iron, and the like. The hangers 720 can be made of the same choice of conductors and covered with a masking agent, such as plater's tape or wax, so that the hangers do not contact or dissolve in the electrolyte during use. There can be an optional self positioning locator notch 722 on each end of the crossbar 715. The locator notches 722 help to position the crossbar 715 on the tank wall 705 by gravity. There is a positively charged bus bar 725 in contact with the crossbar 715. The bus bar 725 connects the anodes to the source of electrical current. The bus bar 725 is preferably made of a conductive material such as copper, aluminum, iron and the like. A cathode arrangement is similar to FIG. 7 with the bus bar 725 supplying power on the opposite side (dotted circle). A screen 830 surrounded by a non-conducting, preferably plastic, frame 835 is shown in FIG. 8. The screen porosity being selected is preferably smaller than most of the $H_2$ gas bubbles formed in the catholyte. At the approximate screen mesh size 18 (1 mm), or larger (smaller hole size), selected such that the agitation provided by $H_2$ gassing at the cathode is noticeably reduced in agitation of the liquid adjacent the anode, and preferably reduces anolyte agitation significantly by $H_2$ gassing, and most preferably having essentially no transference of $H_2$ gassing from near the cathode to near the anode. The degree to which such agitation is occurring can be monitored quantitatively for process control as it is in proportion to the amount of dendritic magnetic particles produced at the cathode per amount of ferrate(VI) produced. The amount of gases which exit with the separate electrolytes (catholyte and anolyte) most preferred is essentially no gas following the anolyte, while substantial gas volume follows the catholyte stream.

Figure 9:
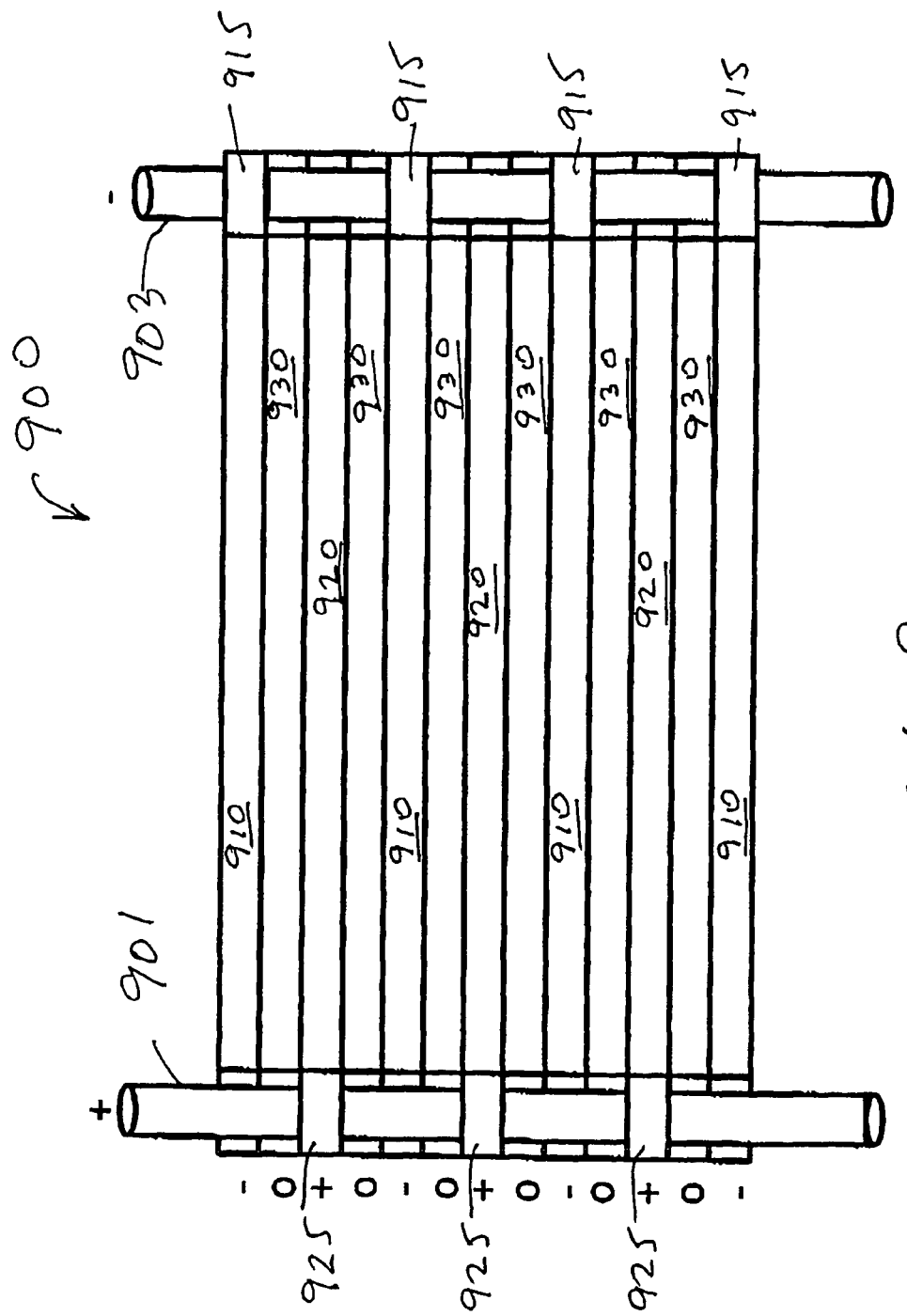
FIG. 9 is a top view of a typical layout for anode/spacer/cathode combinations. Spacer optionally holds a screen (not shown).

Referring to FIG. 9, this figure illustrates a top view for one possible anode/spacer/cathode combination 900. An anode buss bar 901 is shown on the left and a cathode buss bar 903 is shown on the right. The view shows four cathode ends 910, three anode ends 920, and six spacers (that may contain optional screens). The ends of the cathode have conducting members 915 that extend and lie over the top of the cathode buss bar 903 to obtain power. Likewise, the anode ends have conducting members 925 that extend over the anode buss bar 901 to obtain power. In this way, the weight of the cathodes 910 and cathodes 920 help provide good electrical contact with the buss bars 901, 903. In addition, the cathodes 910 and anodes 920 can easily be lifted out for replacement or maintenance.

FIG. 9 shows a top view of a typical layout of an electrochemical cell according to the present invention. Anodes 710 and cathodes 712 are separated by screens 711. An anode bus bar 725 connects anodes to 710, and a cathode bus bar 726 connects cathodes 712.

Figure 10:
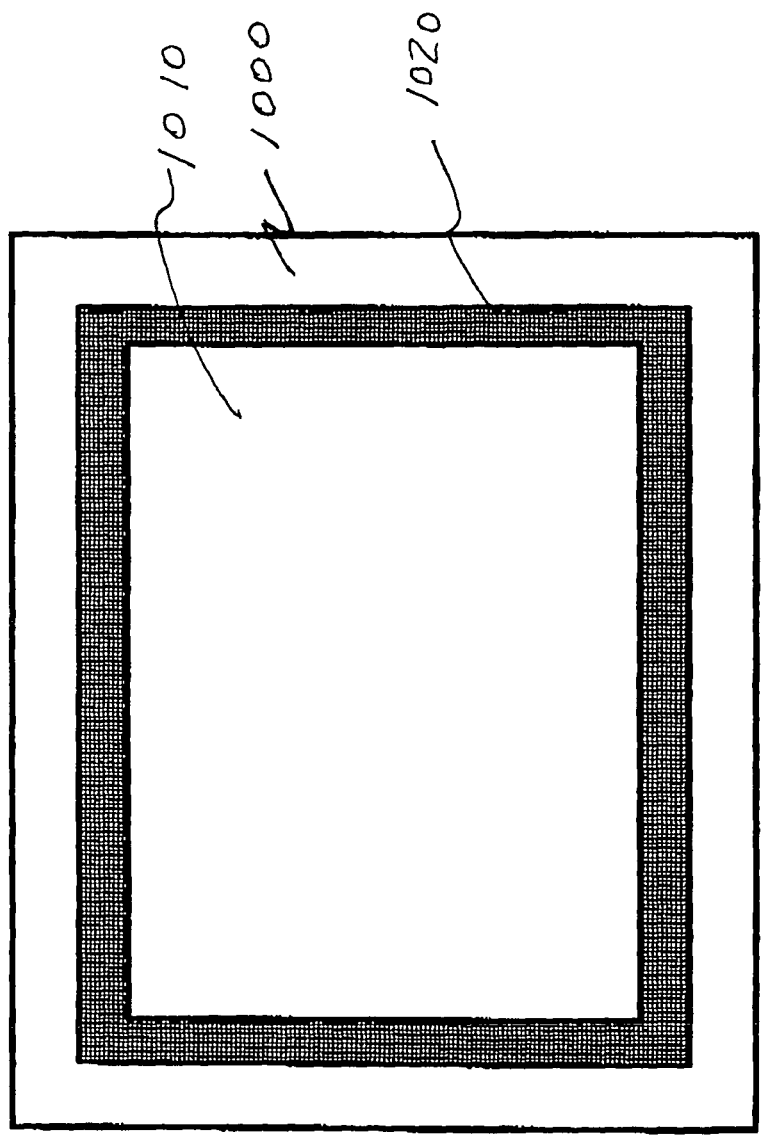
FIG. 10 is a face view of a typical anode/spacer/cathode arrangement showing their relative sizes and positioning, according to one aspect of the invention.
Figure 11:
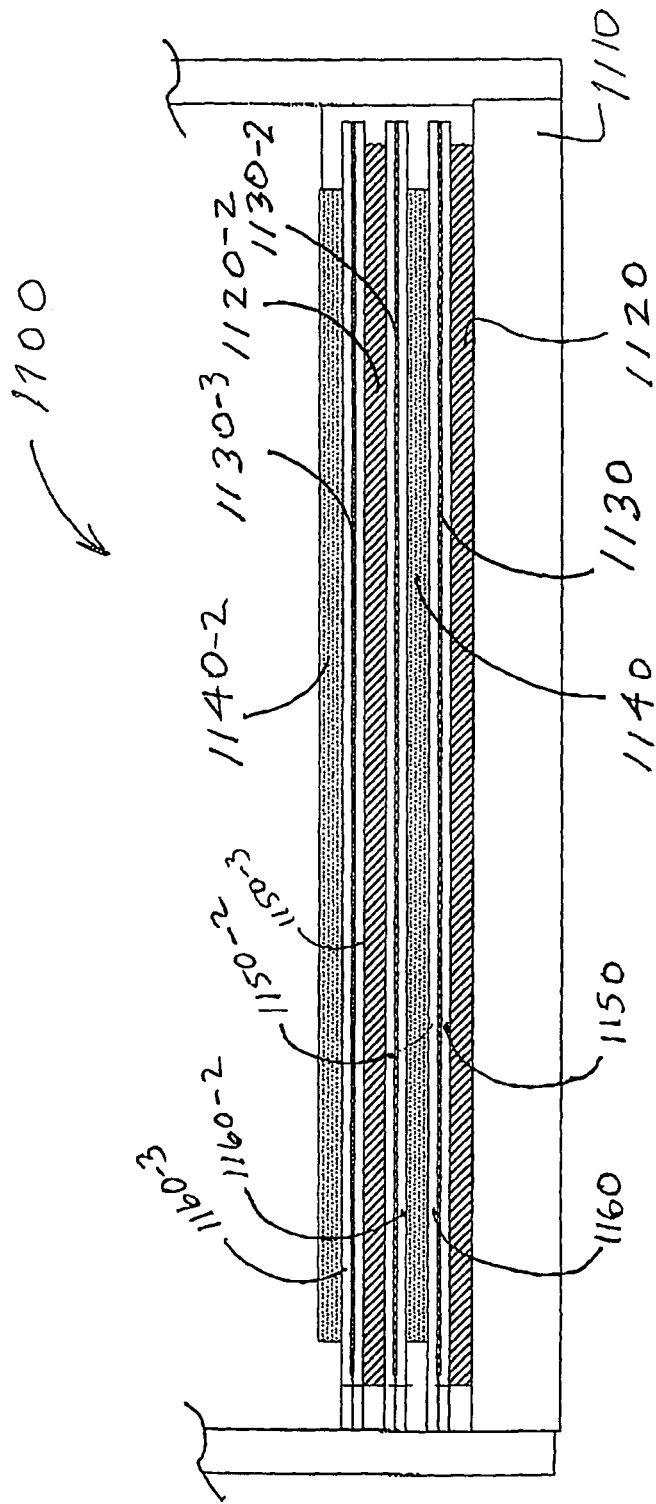
FIG. 11 is a side view of a typical anode, cathode, and screen layout according to yet another aspect of the invention. It illustrates an end view of anodes slightly shorter than cathodes to achieve better electrical field distribution.

The preferred relative sizes of the anode, cathode, and screen in one embodiment are shown in FIG. 10. The area of the cathode is at least as large as the anode, and preferably slightly larger, by 1-10% than the anode with some cathode extending beyond the anode on all sides. The screen, with frame, being approximately as large as the electrode compartment, does not need to be not tight fitting. FIG. 11 shows examples of different size electrode combinations for a cell stack of the invention. Referring to FIG. 11, some of the parts for a multi-cell electrochemical cell, 1100, are shown as a side view of the cell stack. Housing 1110, encloses a stack consisting of a first cathode, an electrolyte (catholyte) compartment, 1150, followed by a first optional and preferred screen, 1130, followed by a second electrolyte, (anolyte) compartment, 1160, followed by an first anode; this first cell followed by a second cell formed in the reversed order of components to that just listed, an analyte compartment, 1162: a second screen 1130-2, a second catholyte compartment 1150-2, a second cathode, 1120-2 and so one. In this view the cathodes are approximately the same length as the screens and the anodes are slightly shorter than the cathodes. However, other sizes and interspatial distance combinations are possible.

Figure 12A:
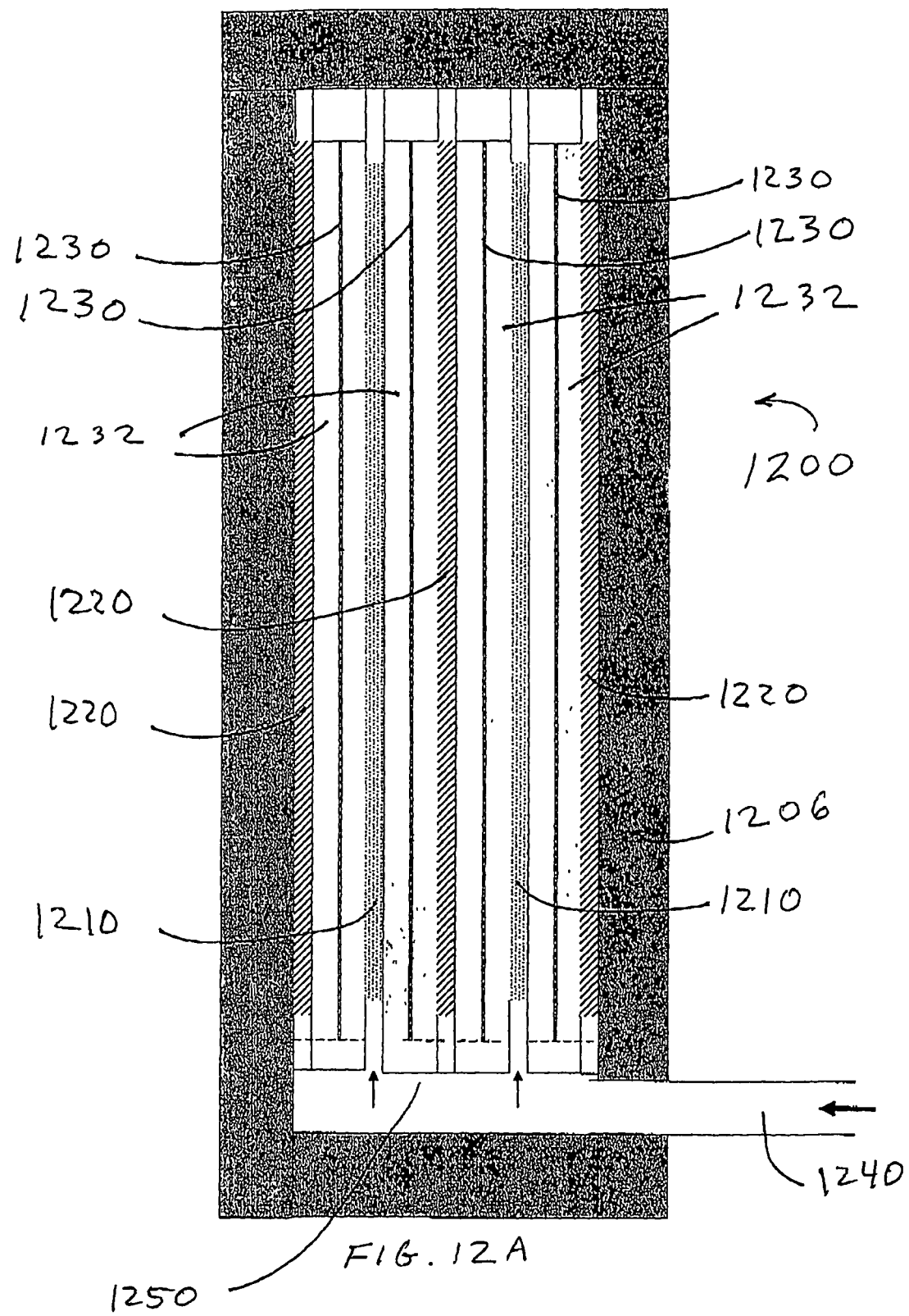
FIG. 12A is a side view of a typical anode, cathode, and screen layout according to another embodiment of the invention.

Referring now to FIG. 12A, the figure shows an edge on view of cell stack 1600 according to another embodiment of the invention that includes a housing 1206, two anodes 1210, three cathodes 1220, and four screens 1230 in frames 1232 between each electrode pair. One inlet 1240 and distributor plate 1250 is shown supplying electrolyte to the anode compartments but not the catholyte compartments. The anodes 1210 are slightly shorter than the cathodes 1220. Both sides of the anodes are utilized for ferrate(VI) production in this arrangement. With this information, it is clear that cell stacks containing many more cells than the four shown here are possible by repeating this pattern many times, even 100-200 cells stacks are possible.

Figure 12B:
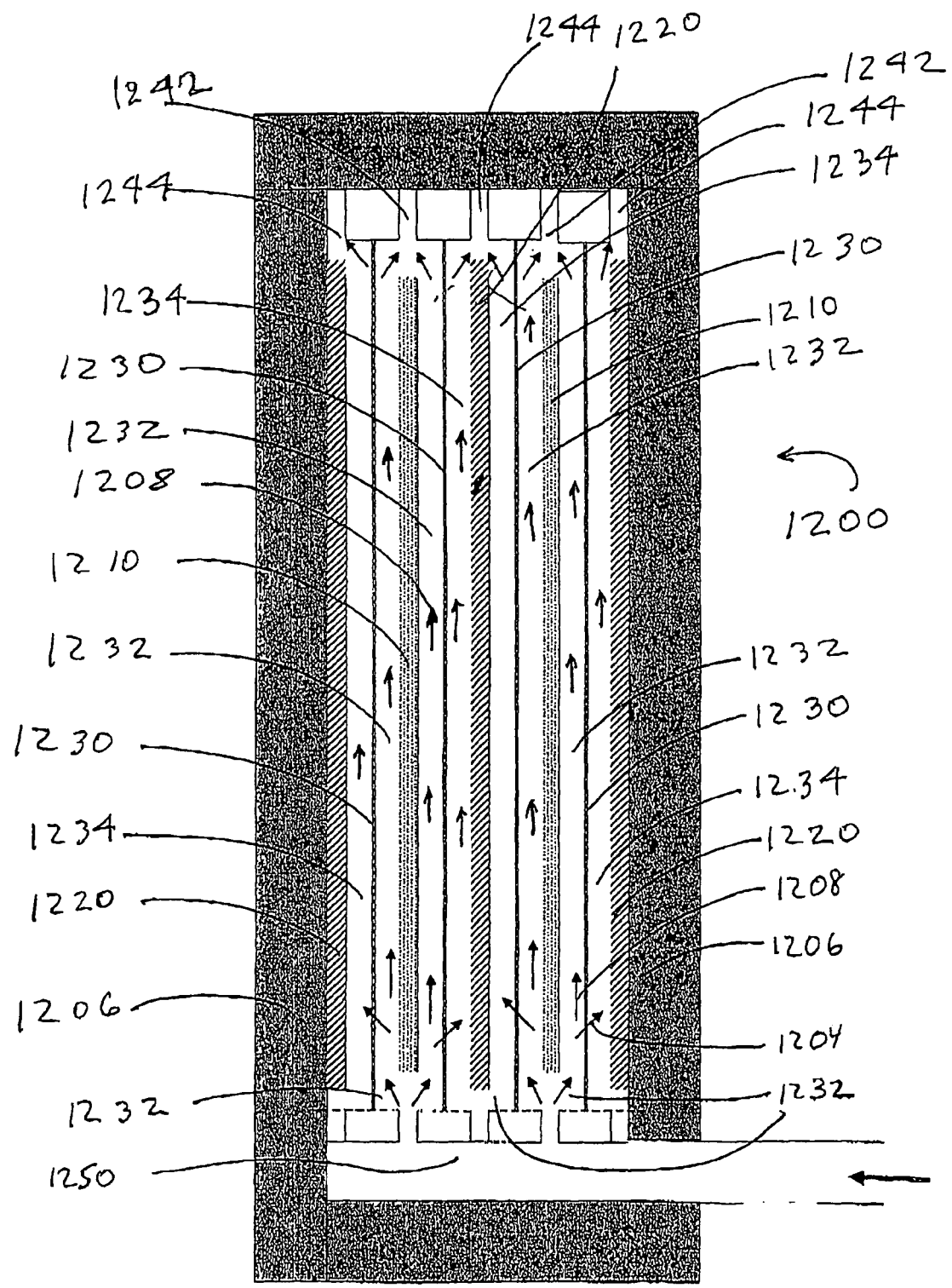
FIG. 12B illustrates a center cutaway view of the apparatus of FIG. 12A

FIG. 12B is a center cutaway view of the same cell stack as in FIG. 12A. This view illustrates the flow of electrolyte through the cells. Arrows 1208 generally show flow of electrolyte through the anode compartments 1232 and some arrows 1204 show electrolyte flow to the cathode compartment 1234. Typically, electrolyte flow will be into the anode compartment and then be divided from there between anode and cathode compartments. However, in some embodiments electrolyte will initially flow into both the anode 1232 and cathode 1234 compartments. Electrolyte eventually makes its way to two anode port areas 1242 and three cathode port areas 1244.

Figure 12C:
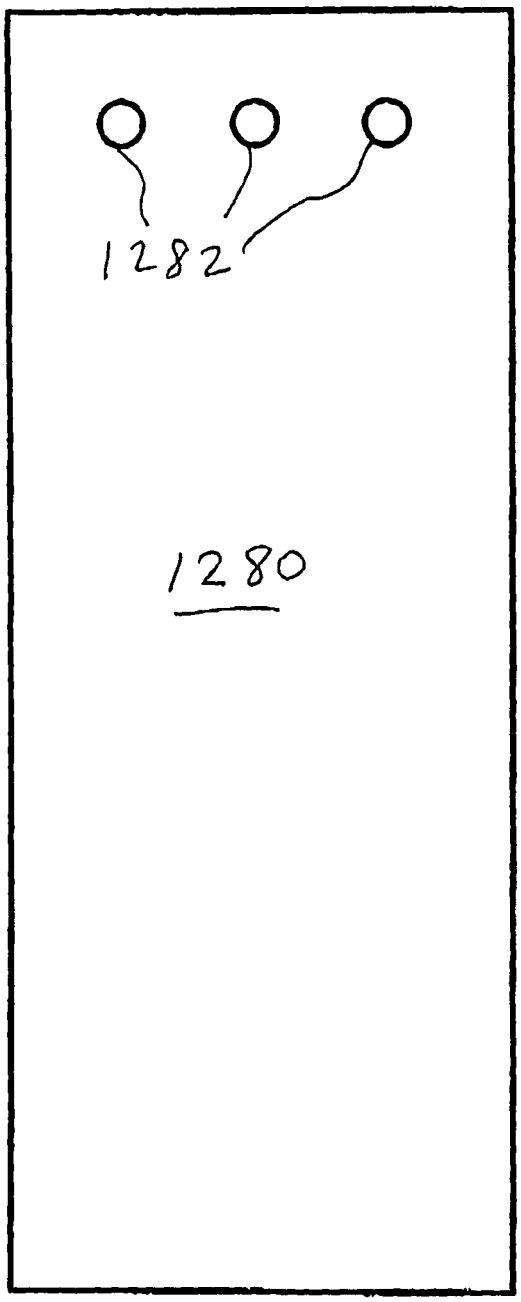
FIG. 12C illustrates the catholyte exit cell end panel with ports for catholyte over flow.
Figure 12D:
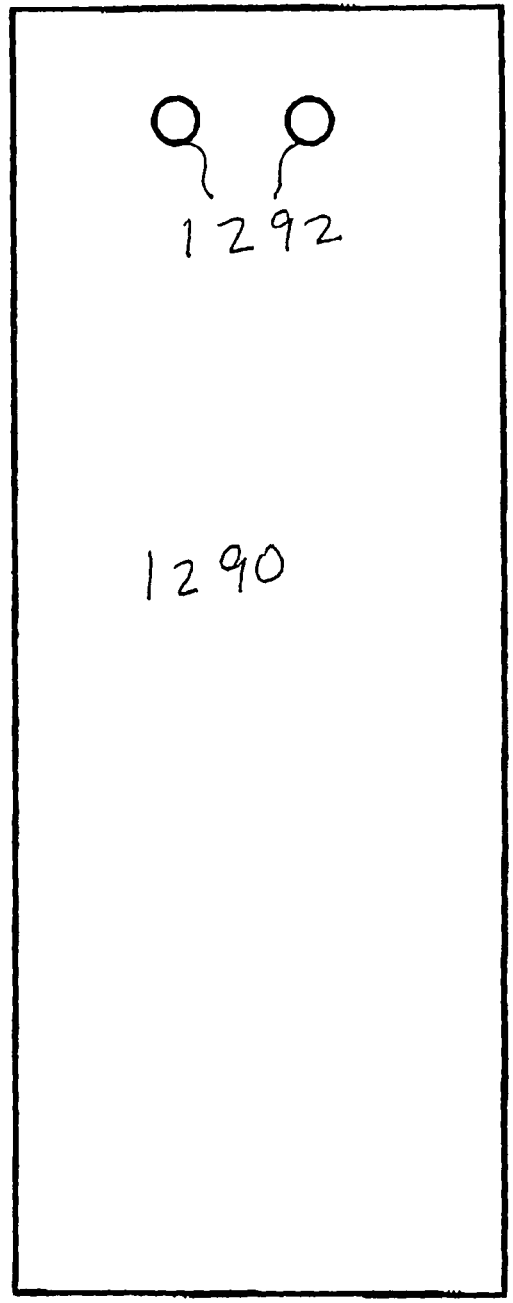
FIG. 12D illustrates the anolyte exit cell end panel with ports for anolyte over flow.

Referring now to FIGS. 12C and 12D that show catholyte exit cell end panel 1280 and the anolyte exit cell end panel 1290, respectively. Catholyte flows out from catholyte port areas 1244 through catholyte ports 1282. Similarly, anolyte flows out from anolyte port areas 1242 through anolyte ports 1292.

Figure 13:
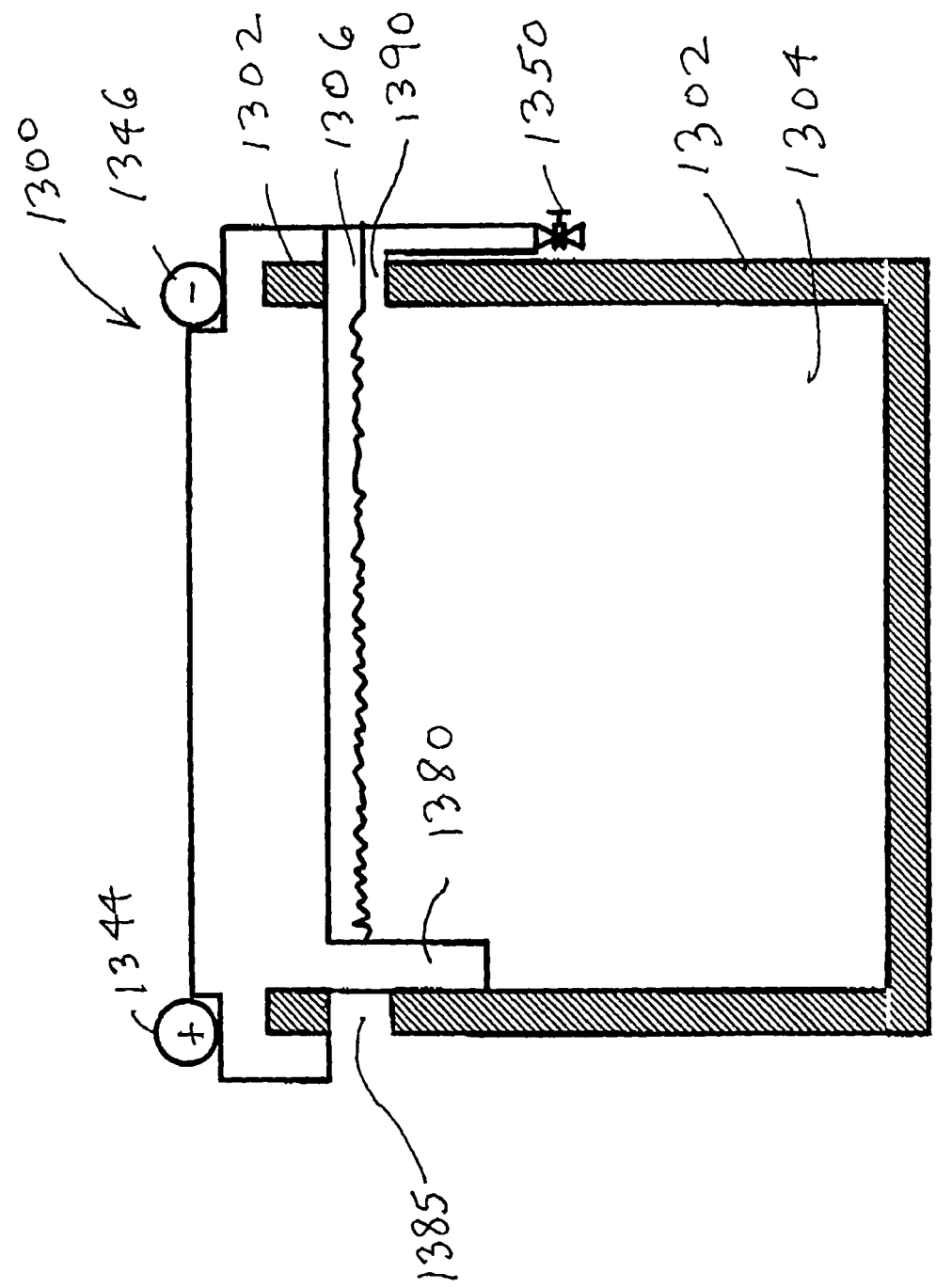
FIG. 13 is a side view of an "L" shaped flow deflector spacers.

Referring now to FIG. 13, this figure is a side view of "L" shaped flow deflector spacers useful with the invention. The figure shows a housing 1302 containing electrolyte 1304. The deflector spacer 1300 fits over the housing 1302 and allows electrolyte 1304 to selectively exit at port 1306 A valve 1350 (or other flow control device) can be used to further regulate flow of the electrolyte 1304. In this view±buss bars 1344 and 1346 are only shown to indicate their relative position.

FIG. 13 shows an L-shaped flow deflector spacer 1300 located between the electrodes and screens. The optional flow deflector spacer 1300 has an extension portion 1380 that can be used to close off the electrolyte outlet 1385 on one side of the tank, while allowing electrolyte to flow out of electrolyte outlet 1390 on the opposite side of the tank. FIG. 13 also illustrates an example of the catholyte exit flow restrictor 1350, in this case a simple valve. The spacers 1300, prepared from polypropylene, for example, can be placed between the cathode 1220 and the screen 830 and between the screen 830 and the anode 1210, where the flow limiting deflector side of the "L" is positioned in an alternating pattern as described above.

Referring now to FIG. 14A, this figure depicts a cutaway side view of a typical electrode stack 1400 for one embodiment of the invention. The unit comprises a housing 1402 containing electrolyte 1404. A first cathode 1410 id placed along the housing and may have additional insulation (not shown) between it and the housing. Next to the housing is an optional screen 1414 followed by an anode 1418 and another optional screen 1422. Spacers 1411, 1415 and 1419 are used to separate the cathode screen and anode, from each other by a selected distance. As indicated by arrow 1430 the rest of the space within the housing 1402 is taken up by a plurality electrodes (and optional screens if used) having the repeating pattern indicated. The last electrode on the right is a cathode 1410. A flow distributor 1450 for electrolyte 1451 is located near or at the bottom of the housing. Electrolyte 1404 enters at pipe 1455 that enters the housing at port 1453. Electrolyte is distributed by flow holes 1460 and typically flows up as shown by arrows 1461 so as to pass between the electrodes above them.

Figure 14B:
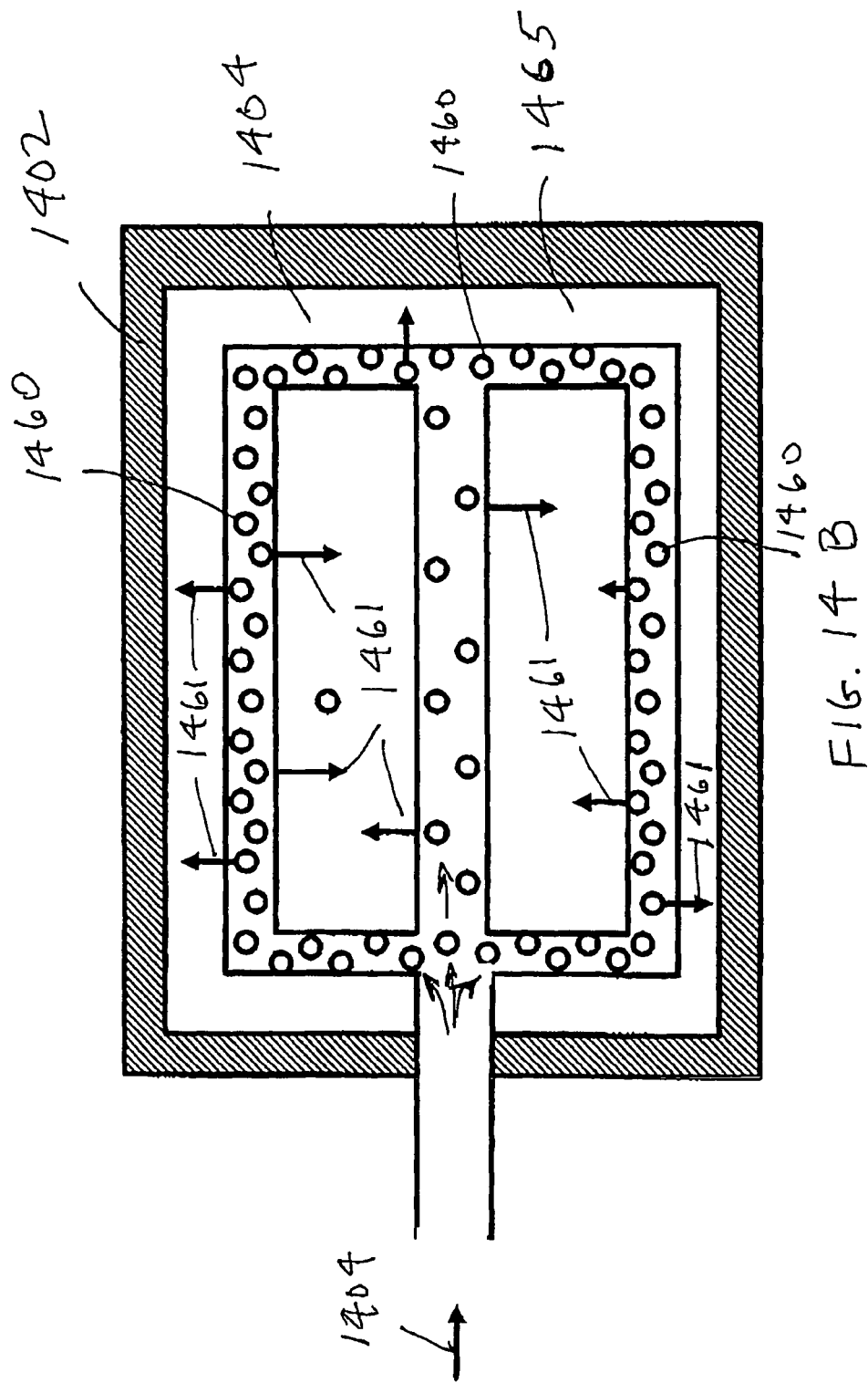
FIG. 14B is a tip view of the bottom of the tank showing electrolyte feed to the tank.

FIG. 14B is a top view of the apparatus 1400 shown in FIG. 14A with the electrodes (and optional screens) removed. Within housing 1402 is electrolyte 1404 and flow distributor 1450. Electrolyte enters the distributor 1450 at pipe a455 flows through the distributor and exits at various flow holes to spread throughout the chamber 1465 within the housing as indicated by arrows 1461.

Figure 15:
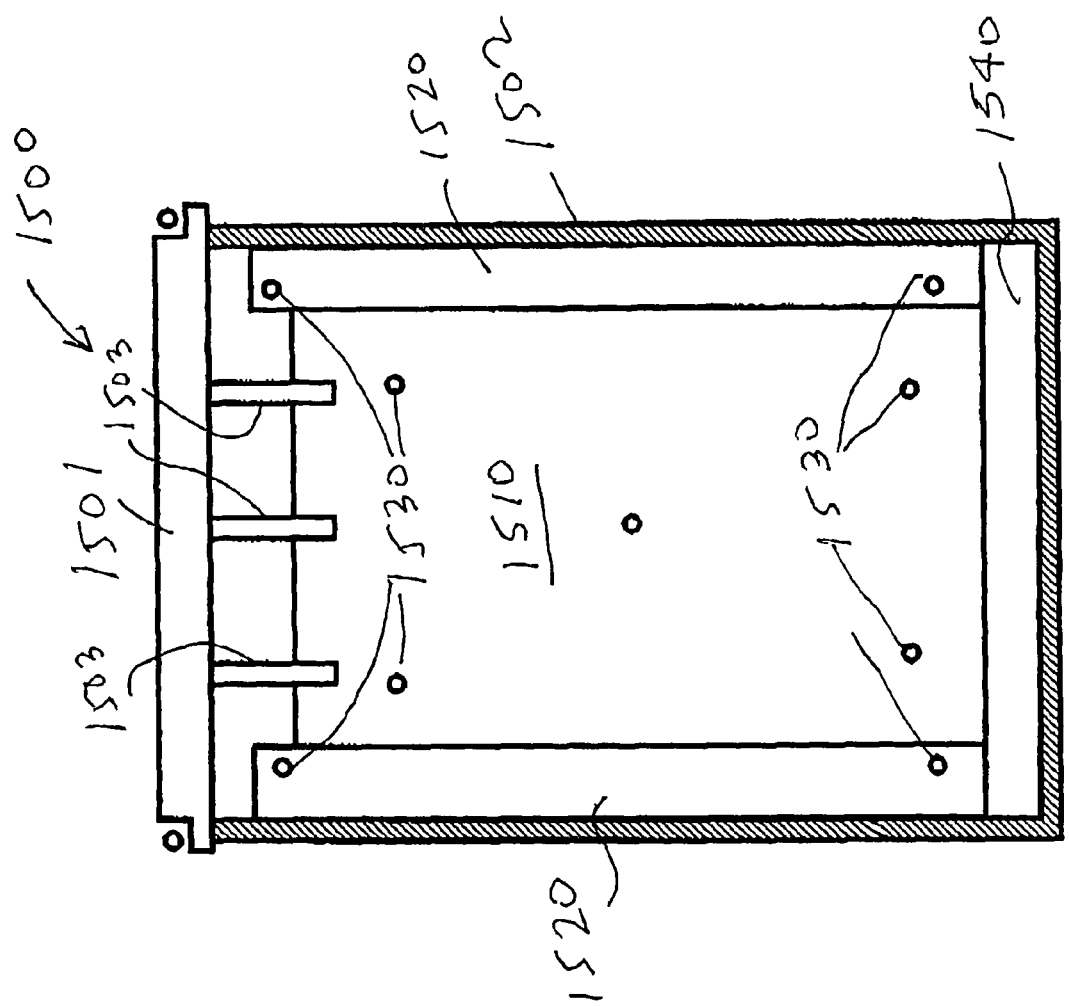
FIG. 15 is schematic showing electrode side and button spacers.

Referring to FIG. 15, this figure illustrates a typical electrode having side and bottom spacers. The cutaway view shows a housing containing an electrode assembly 1500. The assembly 1500 consists of a support having hangers from which the electrode 1510 is suspended. The electrode 1510 is depicted with side spacers 1520 that block electrolyte flow as needed but allow removal of the electrode from the housing 1502. Button spacers 1530 are used to space the electrode from other electrodes or from optional screens between electrodes. The bottom of the electrode is typically open and although electrolyte 1540 flow up between the electrodes.

There can be optional side spacers 1520, 1530 on either the anode or, preferably, the cathode as shown in FIG. 15. The functions of the side spacers are several. First, they prevent the hanging electrodes from swinging into each other and shorting out; second, they allow the gap between the electrodes to be controlled to very high precision, and hence the electric field uniformity between all adjacent areas of the electrodes, thus providing uniform anode dissolution rate across the anode surface. Third, the electrode side spacers allow the cell stack to be assembled quickly using simple clamping tools, rather than having to deal with complex and slow-to-operate machined side grooves in the cell housing walls. The side spacers 1520, 1530 can be made of a material which is not rapidly attacked by caustics or oxidizers, such as plastics (thermosets and thermoplastics) and rubbers. Suitable plastics include, but are not limited to, polyolefins, such as polypropylene, fluoropolymers, and polyvinyl chloride.

Figure 16:
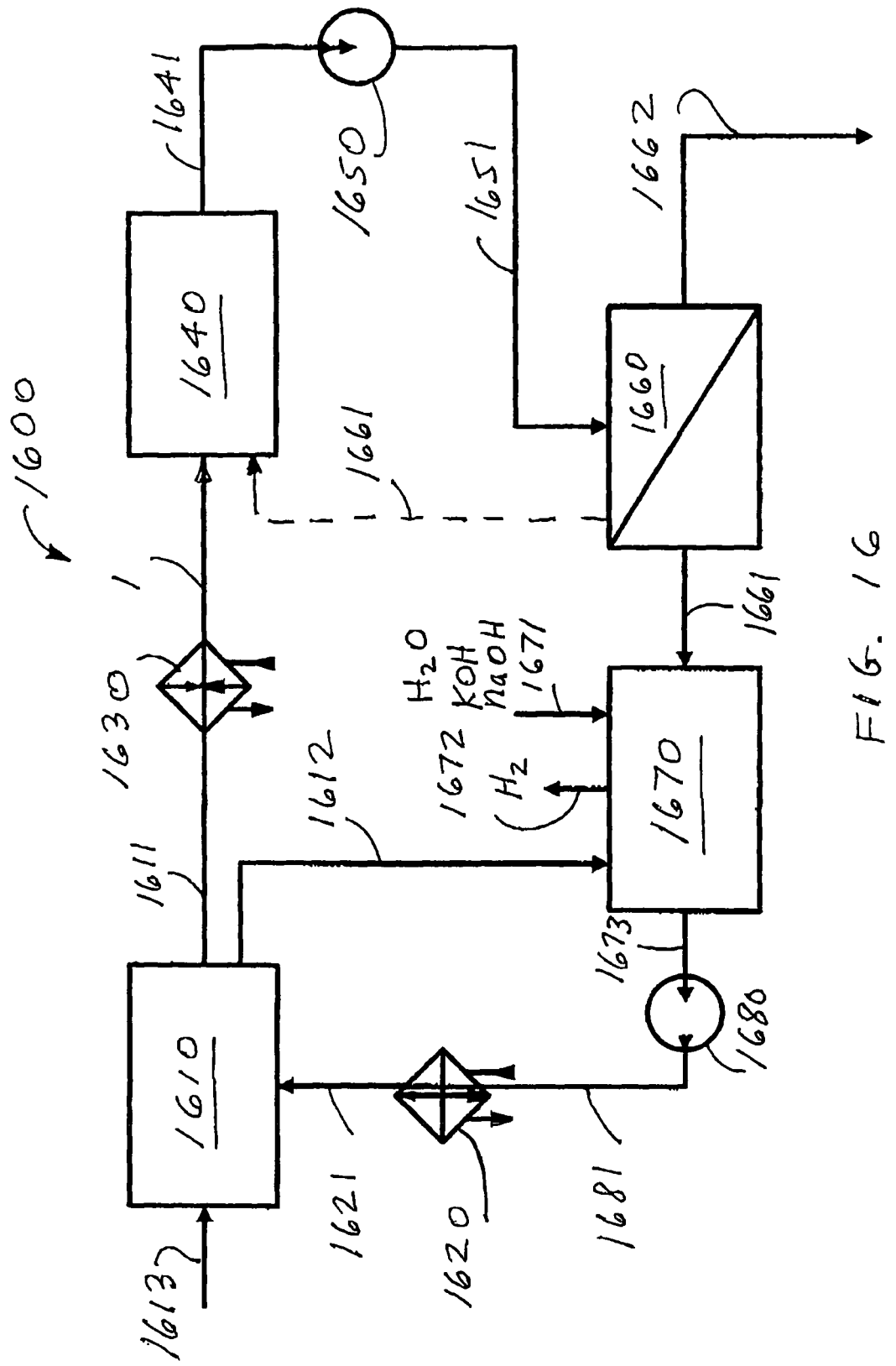
FIG. 16 is a schematic diagram of a laboratory apparatus typical of the invention.

FIG. 16 is a schematic diagram of apparatus, 1600, according to the present invention which can be used for the continuous production of ferrate(VI). The apparatus included an electrochemical cell, 1610. The cell stack was operated at a number of anode and cathode arrangements: a) one anode and one cathode, b) two anodes, and two cathodes separated by an electrically insulated liquid cooling jacket between the cathodes. In both of these arrangements only one face of each electrode is active during cell operation. A better arrangement was c) one anode between two cathodes with no external cooling (FIG. 5), where both sides of the anode are active during operation. Preferably, the electrochemical cell included two anodes, and three cathodes with no cooling (FIGS. 12A and 12B). Note that not needing cooling indicates highly efficient electrochemical reaction yield as any electrical inefficiencies normally produce excessive heat. The anodes and cathodes were separated by polypropylene screens of various mesh sizes. Electrolyte was heated from a temperature of about 20-25° C. to about 40-45° C. by passing the electrolyte through a stainless steel coil submerged in a constant temperature water bath before entering the electrochemical cell, 1620. The anolyte was removed from the electrochemical cell, 1610, and cooled from about 40-45° C. to about 20-25° C. or to about 25-35° C., depending on cooling efficiency using a second heat exchanger, 1630. Cooling to 20-25° C. is preferred for highest yields (slower product decomposition rate). The anolyte was then sent to a crystallizer, 1640. The output of the crystallizer was pumped, 1660, to a solid/liquid separator, 1660, which was a 10μ filter or spiral wound porous filter, depending upon the test performed. The solid needle-shaped ferrate(VI) product was collected using this filter, or more often, by manually filtering the anolyte in portions during operation, each time returning the filtrate back to the crystallizer surge tank, 1640, via manual line, 1661. The solid product was collected, 1662. An alternate mode of operation, the filtrate was sent to another surge tank 1670, where makeup hydroxides and/or water were added as necessary via line 1671. The catholyte was sent from the electrochemical cell, 1610 to the surge tank, 1670, via line, 1620. The electrolyte was then recycled from the surge tank, 1670, back to the electrochemical cell 1610 via pump, 1680, through optional heat exchange, 1620. Power input to the cell is via line, 1613. This apparatus with separate and combined crystallizer/filtrate surge tanks was used for Examples One through Four.

The following examples are illustrative of the invention and are not meant to limit the scope of the invention in any way.

EXAMPLE 1

This example illustrates the use of batch filtration and the ferrate(VI) production apparatus, 1600 (See FIG. 16).

Four runs were made. Ferrate(VI) crystals were periodically harvested during each run using a batch filtration process (evacuated loosely covered Büchner funnel/filtration flask open to the room air pressure). In this mode of operation valve 266 by-pass line was open (10μ filter valve out) and valve 267 was opened only long enough to gather the sample. A known amount of electrolyte (normally 1 to 2 gallons) was withdrawn from the crystallization tank via valve 267 and vacuum filtered manually to obtain a cake containing potassium ferrate(VI) micro-fiber crystals with adsorbed electrolyte (a solution of water, NaOH, and KOH), and any Fe-containing by-products, especially ferric hydroxide or a magnetic chunky black crystalline product consistent with magnetite. The filtrate was recycled back to the cell. Although this was only a batch or semi-continuous separation operation, it was sufficiently continuous on the time scale of the process to be effective in keeping the ferrate(VI) production rate and efficiency high and preventing ferrate reduction at the cathode, or by bimolecular decomposition reaction interaction, or by some other means. By keeping the potassium ferrate(VI) concentration low, the reaction leading to solid ferrate(VI) salt is still achieved while limiting the reduction of dissolved ferrate(VI) ions to other undesired iron species.

It was found that a sudden rise in current efficiency Ieff at 2750-2800 minutes in the above described test can be attributed to the use of a lower total electrolyte volume/anode area test.

External, batch centrifuging of the electrolyte samples provided a simple method of removing the desired product from the electrolyte without significantly changing its chemical and physical properties and, more importantly, without the need of any post-processing as is required with filtration (i.e., leaching and re-crystallization of the ferrate from the wound filter media). Also, it should be noted that with an external batch filtration process, the ferrate concentration in the electrolyte builds up and comes into repeated contact with the cathode, resulting in reduction decomposition giving loss of product and therefore lower Ieff values than in continuous process.

EXAMPLE 2

This example illustrates the use of a continuous centrifuge for recovery of ferrate product crystals.

Figure 17:
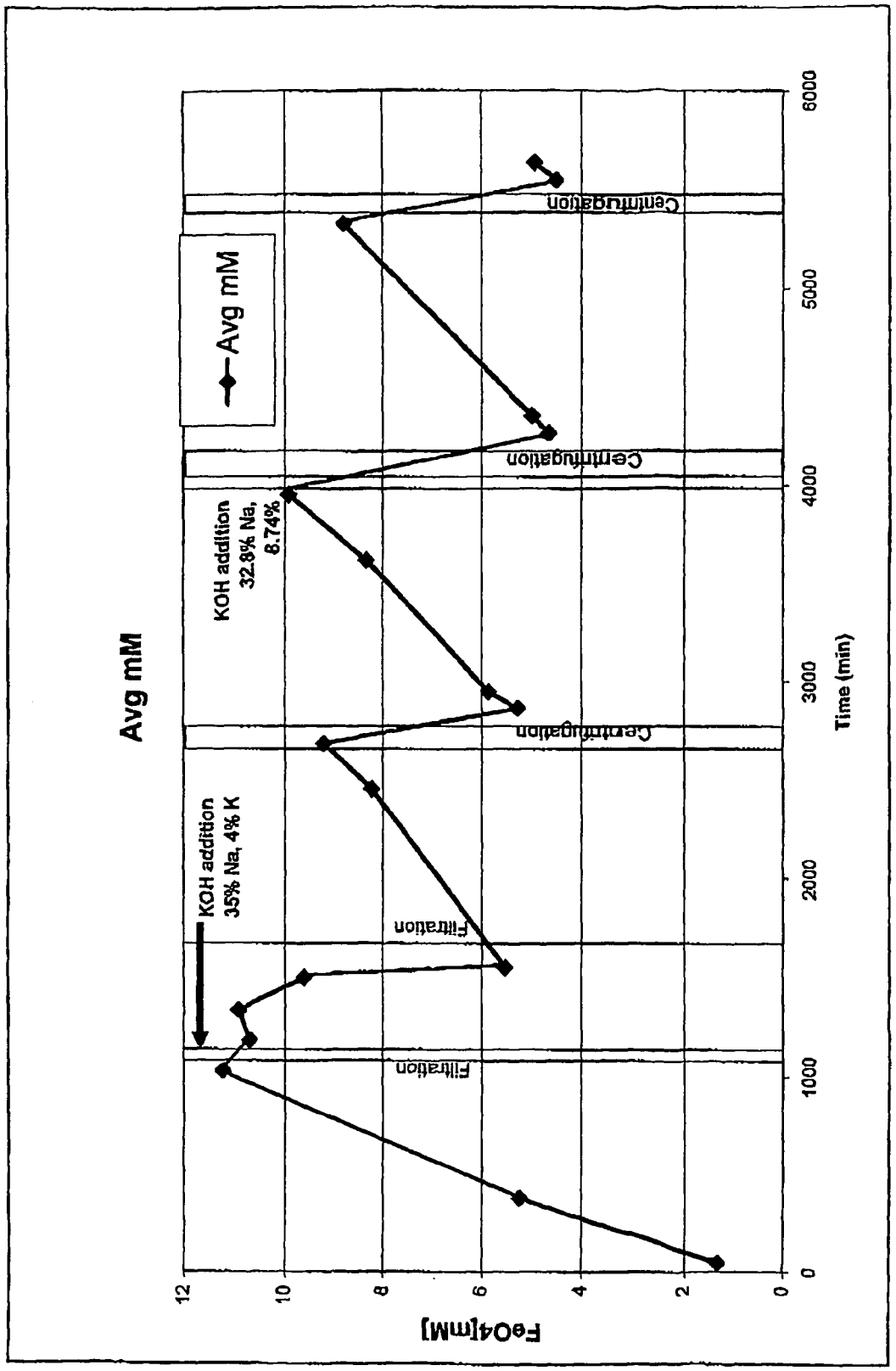
FIG. 17 is a graph depicting the production of ferrate where the ferrate (VI) concentration is on the left vertical scale in mM and the time in minutes is on the horizontal scale. Open squares represent measurements at the 785 nm peak and pone triangles represent measurements at the 505 nm peak.

As Example 1 demonstrated, removal of ferrate(VI) salt helps to achieve high production rates. (FIG. 18 proves this relationship most conclusively.) Therefore, an in-line centrifuge was tested for continuous crystalline $K_2FeO_4$ product removal. The in-line separation with a centrifuge was very effective in removing ferrate(VI) crystals from the electrolyte, as seen in FIG. 17. As observed in tests according to the invention, crystallization occurs at ferrate concentrations above about 4 mM at this wt. % KOH concentration and at about 25° C. After each centrifuging procedure, the concentration was decreased to this level, verifying this solubility. The solubility was also verified by absence of particulates in the centrifugate by optical microscopy (OM). This observation indicates the successful and essentially complete recovery of ferrate solids from solution. The product that resulted was typically about 5 wt % ferrate(VI) and physically behaved as a pourable, but very thick material. After the product was pressed at 110 psi, which removed additional electrolyte from the fine fiber cake, the $K_2FeO_4$ content increased to 20 wt. % or more. The solubility of potassium ferrate in the electrolyte at these conditions was measured as 4-5 mM (filtrate and centrifugate supernatant concentration) with a temperature variation of ±5° C.

EXAMPLE 3

Example 3a

Fully filtered 1.5 v-12 volt, from 1 A-400 A total current, DC power (no apparent ripple) and commercially available 6 @ Hz AC line power are by far the most readily available electrical power sources. Hence these power sources were evaluated for ferrate (VI) production in batch and continuous-flow electrolyte cells. In both cases both power types were found to either produce no ferrate (VI) at all, or initially a faint amount, followed by no additive ferrate, as evidenced by the lack of formation of a purple, or any, color to the electrolyte. Hence high concentrations of ferrate, and hence high ferrate production rates, did not seem possible by this route.

Example 3b

Using the cells described above but powered by low-cost and available rectified by unfiltered DC power, nominal 20 Hz, as is available from automobile battery charges, it was discovered that large amounts of ferrate(VI) are formed rapidly in both batch and flow-through electrolyte cell configurations. Using an oscilloscope, it was determined that such power sources do not have a current reversal (AC) component.

Example 3c

By coupling an AC transformer with a rectified and filtered DC power source (up to 55 A and 30 volts), it was determined that any current reversal (AC component) was a detriment to ferrate (VI) productions by formations of nonferrate (VI) soluble species and particulates.

Example 3d

Hence, based on the results of Example 3a, 3b, and 3c, it was determined that the required power supply for ferrate (VI) production needs to be variable DC (vDC) only at about the minimum of 20-22 A/[see preferable anode batch data]_$cm^2$.

This example shows that the power source type is critically important to high ferrate production rates per unit area of anode. In addition to this increased production rate for large-scale commercial production, continuous flow-through cell operation is most preferred. The following examples illustrate how this combination was accomplished while avoiding the decomposition and side chemical reactions characteristic of such energetic materials as is ferrate (VI).

FIG. 17 illustrates the continuous production of ferrate(VI) for a long period. The ferrate(VI) accumulated to about 11.2 mM prior to $Na_2FeO_4$ crystallization. KOH was then added to induce $K_2FeO_4$ crystallization, which produced a thicker microcrystalline fiber but with a lower aspect ratio, about 10-20. In this run, the ferrate(VI) was allowed to accumulate significantly between harvests, giving the concentration profits a saw toothed shape with run time. The fact that the slope of the saw tooth was about the same filter/growth cycle indicates a stable process operation for over 5500 min. Both centrifugations and filtration were found to be effective and efficient for separation of product from the electrolyte. Importantly, the steady and repeatable level of performance indicates that the electrolyte is stable and is reliably recycled using the conditions of the invention. That the ferrate(VI) concentration dropped to nearly the same value after each filtration, suggests that the solubility of ferrate at these process conditions is about 4.5-5.5 mM.

This example illustrates the power supply variable DC waveform and wave properties required for continuous, high ferrate(VI) production rate cell operations. In this first test, a modified sine wave was used. In nearly all cases, the top portion of the waveform was found to be chopped, or flattened. This voltage is defined herein as Vmax. While not wishing to be bound by theory, this observation is interpreted to be due to reaching the Fe(0)→Fe(VI) oxidation potential, thereby effectively reducing internal resistance (increased electron flow by chemical reaction). The oxidation of Fe(0) to Fe(VI) occurs at the higher voltage as evidenced by purple color formation. By modifying the waveform in this manner to force the voltage to remain at this high value for a significant part of the cycle, but also reducing the voltage periodically to provide the required variable DC, the production of Fe(VI) may be maximized. This variable DC effect was observed during tests according to the invention.

A modified square wave was also tested. This waveform, though applied square, did not remain so across the cell at the highest frequencies because the amplifier was not capable of the necessary fast response time due to the amperage required. The voltage sweep time from the minimum to the maximum voltage was therefore substantial, resulting in a waveform more resembling a sine wave chopped on the top and bottom. In addition, the Vmax→Vmin slew shape appeared to consist of two steps, the first an apparent chemical potential generated within the cell, and the second, a change in the Vanion setting. These two waveforms, and a saw-toothed waveform, allowed testing the effects of Vmin duty cycle. In this manner, it was determined that a modified square waveform resulted in higher current efficiencies for ferrate(VI) production, i.e., the Vmin duty cycle needs to be approximately long enough to allow the observed "decay" in voltage due to a second, not electrochemical, redox (oxidation-reduction) reaction. Not wishing to be bound by theory, it is apparent that this critical second reaction phase (the first being dissolution of anode at Vmax), corresponds to disproportionation of reactive intermediates of iron, forming more ferrate(VI), which is soluble and so diffused away from the surface, this thinning the oxide film there, preventing the buildup of an electrically resistive passivating film, which otherwise prevents ferrate (VI) production.

EXAMPLE 4

This example studied the effect of KOH concentration and addition time.

During tests of the invention, it was observed that stable potassium ferrate(VI) salt crystals can be produced directly during ferrate(VI) production and obtained in good yield using a blend of NaOH and KOH as electrolyte. However, it was also found that high KOH concentration causes a dramatic reduction in cell current efficiency compared to NaOH alone. Therefore, there is an optimal KOH concentration effective concentration range. Preferably, KOH is added after electrolysis was begun to initiate strong ferrate(VI) production on power up.

After startup, an initially high current efficiency was found to decrease over time. In most of the screening test runs, the current efficiency began dropping before the KOH was added, indicating that the ferrate(VI) production rate was hindered by some parameter other than $K^+$ concentration. The screening testing also revealed that isolated sodium ferrate(VI) salt is possible and that it is unstable benefiting substantially from anhydrous refrigerated storage conditions, or should be used within days of production. It is also so reactive that the leach/recrystallization procedure to convert it to $K_2FeO_4$ proceeds with high yield loss. A build up in ferrate(VI) concentration in NaOH solution will lead to decomposition and lower current efficiencies.

The KOH concentration was varied during these tests utilizing 2, 4, and 8 wt % KOH in the electrolyte.

EXAMPLE 5

Screening Testing: Experimental Data Summary

Four runs were carried out with a similar cell configuration; polyvinylidene fluoride (PVDF) construction using one iron anode sandwiched between two nickel cathodes providing a total of 866 $cm^2$ of anode surface area. No Nafion membrane was used. No screen flow divider (see below) was used, but the flow baffles were, allowing low cell voltage and the removal of the second (cathodic) electrolyte feed (FIG. 19) stream and associated plumbing, tank, and pump (FIG. 16). A single electrolyte solution also simplifies the process. This solution was pumped at about 1.5-1.8 gpm through the cell, where it contacted both sides of the iron anode in a parallel flow pattern. A flow distributor in the base of the cell provided uniform flow rate to both sides of the anode. Dual power contacts helped provide uniform (top and bottom) electrical current to all the electrodes. To avoid over dilution of electrolyte, the experiments were begun by pumping about 10 L of 45 wt % NaOH solution through the system for approximately 30 min. The cell was then operated for a known period, approximately 1000 min. before adding appropriate amounts of KOH solution. This allowed sufficient time for sodium ferrate(VI), $Na_2FeO_4$ of $H_2O$ crystals, to form. The period, until KOH addition, was reduced substantially later, which avoids $Na_2FeO_4$ crystallization and goes directly to $K_2FeO_4$ product. The resulting electrolyte volume was between 14-18 L with NaOH concentration of about 32 wt % and KOH concentration of 2, 4, or 8 wt %. Filtration was performed by tapping a volume of electrolyte (normally 1 gallon) from the crystallization tank discharge valve and performing a 1 atm. vacuum Buchner funnel filtration.

During this run, an in-line centrifuge (contrafuge) was tested successfully for high-yielding solids separation at continuous conditions (FIG. 20). When centrifuging, a peristaltic pump was used to transfer electrolyte from the crystallization tank to the centrifuge at a flow rate of 100 mL/min. The centrifuge was operated at various spin speeds over the whole range available to the device (6000-10,000 rpm). Separation was excellent over this entire range. Therefore, the product (and by-product magnetite crystals and "sea urchins" product crystals) can be recovered easily by centrifugation. It is estimated that even $1/100$ these speeds, i.e. 60 to 100 rpm could be effective, but $1/60^{th}$ this speed (600 to 1000 rpm) would be preferred, especially at large scale. For example, after 1 hr. of centrifuging, the separation process was stopped, and the product examined. The product from the centrifuge was typically about 5 wt % ferrate. This was increased to about 20 wt % by pressure filtering the cake at 100-130 psi, thereby making a solid wafer "tablet". Such tablets were easily handled and compact, yet still readily dissolved in water and, hence, represents an excellent commercializable product form to use for water treatment or other uses. Throughout the test, ferrate (VI) concentration in solution was determined by the UV-Vis test described below.

The experimental conditions and initial current efficiencies for the tests are included in Table 1. In each test, the waveform was altered over a limited range to determine any effect on ferrate(VI) production.

Although the waveform was varied during each experiment, the waveform and voltage characteristics listed here are the initial settings only and are valid for the listed current efficiencies. These are not optimized parameter values.

TABLE 1

Experimental Conditions and Results for Four Tests

| Run 1 | Run | Waveform | Freq (Hz) | Vmax (V) | Vmin (V) | Initial Current Efficiency (%) |
|---|---|---|---|---|---|---|
| | 1 | Square | 1.0 | 3.40 | 1.60 | 10.8 |
| | 2 | Sine | 1.0 | 3.00 | 1.32 | 9.2 |

TABLE 1-continued

Experimental Conditions and Results for Four Tests

| Run 1 | Run | Waveform | Freq (Hz) | Vmax (V) | Vmin (V) | Initial Current Efficiency (%) |
|---|---|---|---|---|---|---|
| | 3 | Sine (flat top) | 2.0 | 3.08 | 1.72 | 10.0 |
| | 4 | Sine (flat top) | 2.5 | 2.88 | 1.72 | 13.4 |

The ferrate concentrations measured during this test are presented in Table 1. The initial current efficiency was about 10% in NaOH solution. Although the Vmax was altered at 375 min. run time from 3.40 V to 3.00 V, this change did not result in any noticeable change in ferrate production rate, indicating that the same production rate is possible at lower power. It was then determined that the voltage could be reduced even further, to about 2.7 volts. It should be remembered that absolute voltage values are a function of cell design, temperature, electrolyte conductivity, and anode-cathode spacing.

Run 2

This test utilized four different waveforms as described in Table 2. The addition of KOH to the system was done in conjunction with the change in waveform from a sine (single point Vmax) to a sine with flat top.

TABLE 2

Waveforms Used in the Run 2 Tests

| Wave | Time On Stream (min) | Waveform Description |
|---|---|---|
| 1 | 0-1161 | 1 Hz sine, Vmin = 1.32 V, Vmax = 3 V, Imax = 54 A, I min = 0.5 A |
| 2 | 1161-2885 | 2 Hz sine with flat top 220 ms, Imax = 54 A, I min = 14 A |
| 3 | 2885-3850 | 2 Hz square with flat top 240 ms, 20 ms slew up and down, Imax = 51 A, Imin = 3 A |
| 4 | 3850-6792 | 2 Hz square with flat top 400 ms, 100 ms slew up and down combined, Imax = 55 A, I min = 33 A |

It is known that in some large industrial scale electrochemical process, for example, persulfate or hydrogen peroxide, the ratio of anolyte volume to anode surface area is a key design parameter. Therefore, the effect of electrolyte volume was examined. During the last filtering step (about 6650 min on stream), the electrolyte was decreased from 17 L to 19 L. This decrease in volume resulted in an increase in both production rate and current efficiency by about six fold.

It was also observed that decreasing the electrolyte volume by 17 L to 9 L immediately resulted in a substantial increase in ferrate(VI) concentration. This observation suggests that decreasing the ratio of the volume of electrolyte/anode area (Velect/Aanode) decreases ferrate(VI) production, all else remaining the same.

These tests were qualitative in nature and do not provide optimized % KOH, % NaOH, or K/Na ratio levels. It is well known in the art that such optimization is determined using systematic, preferably statistically designed, tests so that these parameters are optimized (set points and control windows) in conjunction with the other process parameters, including continuous product removal, by-product prevention, heating/cooling effects, and the like.

Run 3

During this test, separation of solids was performed by frequent filtration only; the centrifuge was not used. The waveforms used in this test are described in Table 3. A sine wave with a flat top was used throughout most of this test.

TABLE 3

Waveforms Used for Run

| Time on Stream (min) | Waveform Description |
|---|---|
| 0-47 | 2 Hz sine wave, unmodified, Vmax = 3.08 V, Vmin = 1.72 V, Imax = 45 A, I min = 8 A |
| 47-922 | 2 Hz sine wave, modified with flat top (170 ms) at 50 A, Vmax = 3.08 V, Vmin = 1.72 V, Imax = 50 A, I min = 8 A |
| 922-1819 | 2.5 Hz sine wave, modified with flat top (160 ms) at 48.5 A, Vmax = 2.88 V Vmin = 1.76 V Imax = 48.5 A I min = 13.5 A |
| 1819-2385 | 1 Hz square with 500 ms top at V = 3.08 V, Imax = 50 A, Vmin = 1.72 V, I min = 1.5 A, 80 ms bottom trough |

FIG. 21 summarizes the test results using the described cell of the invention with periodic centrifugation or filtering for the four wave forms, voltages, current, and frequency combinations of Table 3. The plot provides the ferrate(VI) concentration in mM versus run time over about 7000 minutes, or about 30 times longer than reported in the prior art. All waveforms were found effective for ferrate(VI) production. The 1 Hz wave form produces ferrate(VI) at a faster rate than the 2 and 2.5 Hz settings. This advantage was attributed to the extended $t_3$ value at the 1 Hz setting versus the 2 and 2.5 Hz setting. Note that the sharp rise during the first 1000 min is typical and represents the startup condition in which ferrate (VI) concentration builds to supersaturation and then forms microcrystals, in this case at about 900 min into the run. Once microcrystalline product forms, as indicated from periodic optical microscopy of the electrolyte, then solid/liquid separation operations were performed at the indicated times. The total ferrate(VI) in solution and in suspension drops as expected due to this product harvesting. The maximum ferrate(VI) concentration reached before crystallization occurred was 9 mM, and this is reduced to about 1.8 mM with frequent filtering. Hence 1.8 mM is the approximate solubility of $K_2FeO_4$ at production process conditions.

Run 4

This run used 1.92 wt % KOH which was added 80 min. after start-up. At this time, the waveform was also changed from a sine wave to a sine wave with a flat top. Table 4 describes the waveforms used for this run.

TABLE 4

Waveforms Used in Run 4

| Run Time (min) | Waveform Description |
|---|---|
| 0-75 | sine wave, 2.5 Hz I min = 3 A, Imax = 33 A, Vmax = 2.32 V, Vmin = 1.48 V |
| 75-3440 | sine wave 2.5 Hz, with flat top 120 ms, duty cycle sine shaped bottom, I min = 12 A, Imax = 47 A, Vmax = 2.88 V, Vmin = 1.72 V |
| 3441-4211 | sine wave 5 Hz, with flat top 100 ms, sine shaped bottom, I min = 12.5 A, Imax = 17.5 A, Vmax = 2.44 V, Vmin = 1.80 V |

For most of the run, a sine wave with a flat top was used. This data was interpreted to indicate that continuous product removal helps to prevent product reduction to by-products in the cell when the electrolyte is recirculated. This result was later confirmed by additional testing. Near the end of the test run, the frequency of the wave was increased, and the current was decreased. The lower current being supplied to the cell resulted in a lower ferrate production rate. This result verified earlier results that indicated that ferrate production rate is proportional to current if other parameters are held constant (at least at this general current density).

The concentration of ferrate(VI) in solution versus time in minutes is presented in FIG. 22. As seen in this figure, the concentration reached high levels during the initial stage of the run, even after KOH (to about 2 wt %) had been added. All of the various separation processes (centrifuge, filtration, pressure filtration) used in this run worked well in removing the solid ferrate from the electrolyte. After 1500 min on stream, the filtration and centrifuging resulted in nearly complete removal of solids as indicated by the resulting ferrate concentration of about 4 mM in the electrolyte at these conditions. This residual is near the saturation point for ferrate (VI) in the NaOH/KOH electrolyte. However, the sharp increases in ferrate(VI) concentration and rate at the beginning and middle of the run indicated that a continuous solids separation process should be employed to avoid losing the product at the cathode. Frequent separations resulted in good agreement between the 505 and 785 nm spectral peaks in the UV-VIS spectra of the ferrate samples (using the procedure is described elsewhere in this application), indicating a high purity of Fe(VI) in the samples as ferrate(VI) ion and low levels of by-products (magnetite and FeOOH colloids).

FIG. 22 illustrates that KOH can be added early in the operation of the ferrate(VI) production of the invention, hence not making $Na_2FeO_4$ crystals first, for example as was done for the data of FIG. 17. This data again shows stable, long term operation, to over 4000 min, of the process of the invention. The ducal lines of the plot provide ferrate(VI) analysis results for the two diagnostic visible wavelengths for ferrate(VI) (see example 9). Hence the closeness of the curves indicates that approximately pure, by-product free ferrate (VI) was produced over the entire run, with only moderate indications of particulate impurities present after running the periods without product filtrations.

FIG. 23 demonstrates long term, stable and continuous ferrate(VI) product production using a cell of the invention where sodium ferrate(VI), $Na_2FeO_4$, product needles are made, and where potassium ferrate(VI), $K_2FeO_4$, product needles are made. As previously described, the closeness of the two lines indicates high ferrate(VI) product purity. As most filtrates show a similar concentration (the minimum values in these plots) of about 6 mM, this is concluded to be the solubility of potassium ferrate(VI) in the electrolyte at these experimental conditions. This data illustrates that potassium ferrate(VI) product is effectively crystallized at low KOH concentrations and at high KOH/NaOH ratios. This data further illustrates that high ferrate(VI) concentrations, in this case about 17-18 mM, are possible with the process.

EXAMPLE 6

This example was used to validate the findings of previous examples. The results from previous tests indicated that following modifications and parameters were likely to improve electrical current efficiency, product purity, and continuous operation.
1. Decreased electrolyte volume/anode surface area ratio. This parameter was adjusted using two methods. First, a second iron anode was installed in a cell, increasing the total surface area from 866 $cm^2$ to 1732 $cm^2$. Secondly, the total volume of electrolyte in the crystallizer/surge tank was decreased.
2. Waveform. A waveform with both a flat top and bottom was employed (square wave). The duty cycle of the square wave was adjusted to allow sufficient time for Vmin to stabilize, indicating completed secondary reactions, then reset to Vmax. A possible mechanism for this secondary reaction effect is that the tailing out and flattening of the waveform at Vmin limits the buildup of passivating film thickness, critical to continuous production, and perhaps reaction intermediates formed at the higher voltage.
3. KOH addition point. KOH was introduced a short time after electrolysis is began. Also, the effect of low KOH concentration was to be verified.
4. Screen. A thin open polypropylene screen (not a membrane) was used to separate the anode and cathode compartments. The exiting electrolytes were kept apart, and an almost closed valve was added to the exiting catholyte line to reduce flow across the cathode. This was done to minimize/prevent hydrogen from the cathode from contacting the ferrate(VI) produced in the anodic compartment, and to limit $FeO_4^=$ access to the cathode. By limiting the cathodic reduction of ferrate(VI) in the system, the overall yield should increase.
5. Reduced lower current density. Current density was reduced by increasing (doubling) the anode surface area in the electrolytic cell. Current density could be decreased further by reducing the total current through the cell, but this option was not tried here in order to keep ferrate(VI) production rate as high a possible. Literature data indicates that current yield reaches a maximum around 3-4 $mA/cm^2$ for short run times. The tests according to the invention were typically run around 57 $mA/cm^2$ (with one experiment at about 20 $mA/cm^2$), where literature data indicates a low in current yield. The actual good production rates of this invention may suggest that the short-run current densities from the literature are not preferred. Instead, maximum current per cell volume is preferred, so long as the current density used is still on the linear current vs. ferrate production rate curve.
6. Temperature Control. Literature data indicates that higher temperature (about 40-50° C.) results in increased current efficiencies, approximately three times greater than those obtained at 20° C. However, previous work and the same literature indicate that ferrate(VI) decomposes at these elevated temperatures, resulting in a high total iron to iron (VI) ratio. As a result, most of the previous experimental work was done at 25° C. Here, the electrolyte was heated to as close to 50° C. as the equipment allowed before entering the cell, and then immediately cooled back down to as close to 20° C. as the equipment would allow on exiting. The idea was to maximize Fe(VI) production rate while limiting ferrate(VI) decomposition, and to facilitate crystallization yield. These objectives were met (see below).

The tests were performed using a modified cell configuration, alternating two iron anodes placed between three nickel cathodes. A polypropylene plastic screen was placed between the anodes and cathodes to inhibit contact between ferrate and the cathodes or $H_2$ gas bubbles. In the novel design, a single electrolyte solution was pumped through the system and contacted both the anodes and cathodes. As the analyte and catholyte liquid levels are equal, and the analyte is free to exit, while the catholyte exit flow is restricted by the exit valve, substantially more electrolyte flow passes over the anode from the cathode. This flow difference is readily observed at cell startup, where the purple color of ferrate is observed for some time in the analyte before it appears in the catholyte. This flow differential decreases ferrate contact with the cathode proportionately and, therefore, ferrate losses by this route.

The experiments were begun by pumping 10.8 L of 43 wt % NaOH solution through the system for approximately 60 min., while the cell is energized, before adding appropriate amounts of KOH solution. The resulting electrolyte volume was 11.0 L. Throughout the test run, the NaOH concentration was 42-45 wt % and the KOH concentration was 0.8-1.3 wt %. The values can be verified by density, acid/base titration, and the AA analyses.

The electrolyte was heated to 43° C. before entering the electrolyzer and cooled to 37° C. in the surge tank. Although the ideal temperatures would be 50° C. and 20° C., respectively, these values were not attainable with the plastic heat exchange tubing for cooling. The plastic tubing was used to avoid ferrate(VI) attack on the steel, resulting in contamination/destabilization. Stainless steel (alloy 316) worked well for heating, while 304 stainless steel was corroded, if used for the cooling heat exchanger. As ferrate and caustic is always in the electrolyte at both sites, and cooling is more stabilizing than heating with respect to materials' resistance to oxidizers and caustic. It is concluded that 316 and greater SS is compatible with the ferrate processes of the invention, while 304 SS and lower is not. Therefore, the use of stainless steel was demonstrated to be viable in continuous ferrate(VI) production on arterials of construction. Stainless steel of 316 and higher can be used for various parts of the equipment including, but not limited to, heat exchanger tubing, electrolyte fluid piping, and solid/liquid separation hardware (sieves, filters, centrifuges, crystallizers, tankage, hydrocyclones, and the like). Suitable stainless steels include 316 stainless steel, as well as higher alloys of stainless steel and nickel. 304 stainless steel is not suitable for these applications because it is attacked and corroded by the ferrate-containing electrolyte. Such corrosion also leads to manganese contamination of the ferrate product, as stainless steels contain >0.3% Mn.

An in-line hydrocyclone was used to continuously separate solids from the electrolyte. The use of the hydrocyclone required a larger volume of electrolyte. Therefore, additional electrolyte was added to the system at 390 minutes, bringing the total volume to 17.8 L. The in-line centrifuge was run continuously to remove solids from the electrolyte stream. The resulting centrifugate was about 1% solids, as needed to separate the product from the electrolyte so that the electrolyte could immediately recycled. The 1% slurry was filtered off line to produce a high percent active product. The filtrate was added back to the process as viable electrolyte. It was later discovered that the cyclone was plugged with solids, indicating rapid and good solid/liquid separation was occurring. As too much product was being held back, it is well known in the art that this blockage would be prevented by weir height reduction to allow the slurry to exit the unit without excessive caking. Such weir size determination is within the skill of the art.

With the hydrocyclone off line, filtration was performed by tapping 2-4 L volume of electrolyte from the pump exit line and performing a vacuum filtration similar to Run 1 of Example 5, but as continuously as possible. The product from the filtration step was typically an excellent 9 wt % potassium ferrate(VI). Earlier pressure filtration tests indicated that the percent active product was readily increased to >20% by this means. The retention of the electrolyte by the product is believed to be due to the high surface area of needle-like micro crystals, which are squeezed when under pressure (e.g., compression), which reduces inter-crystal void volume, which rids the crystals of a proportionate amount of the viscous electrolyte. Because such crystals often "spring back," the liquid needs to be removed while the crystals are still under pressure, i.e., in a compressed state. This effect helps produce a high percent active product, >10% and often >20%. With optimization of pressure filtration, it is believed that this value could be raised to 30 to 70% and even higher if larger crystals could be formed by crystallizer optimization.).

The electrolyte volume was decreased to 9.2 L at 1654 min to validate the observation made in earlier tests that low electrolyte volume results in an increased current efficiency. Throughout the run, ferrate(VI) concentration in solution was determined by UV-VIS as described below.

The waveform used in this experiment was a square wave of 1 Hz. The maximum and minimum voltages were 2.20 and 1.26V, and the maximum and minimum current were 56 and 0.4 A, respectively. The power level was about 123 watts, which is desirably low. The waveform was captured with an oscilloscope. Although the waveform of the power supply was a square wave, as noted previously, tailing was observed during the down sweep, but little on the up sweep. This approximately exponential voltage drop from Vmax→Vmin is interpreted by us as an indication that some oxidation/reduction ("redox") chemical change is occurring during the down sweep, i.e., that the cell is behaving as an electrochemical cell during this Vmax→Vmin transition period and as an electrolytic cell during the Vmax plateau region. While not wishing to be bound by theory, this result is tentatively interpreted to be an indication that the oxide film might be reacting (thinning) in the downward sweep by equilibration to produce soluble Fe forms (e.g., Fe(V), Fe(VI), or Fe(II)). This chemistry would thin the oxide layer and prevent its thickening (this is a critical feature of the invention, as layer thickening would lead to passivation). The resulting cell current density was 32 mA/cm$^2$ at Vmax, i.e., for greater than the optimal values indicated by the short tests described in the literature.

Using these settings for the process parameters, the current efficiency and production rate were observed to increase substantially over previous trials, even after the startup period. In addition, the current efficiency was essentially constant. From the total amount of ferrate(VI) produced, which is shown in FIG. 17, the production rate during this entire 4500 min. experiment was calculated as an excellent 64.1 g/day (0.14 lb/day). Previous tests had high current efficiencies at startup, but not this high. Therefore, the combination of waveform, cell configuration, continuous product removal, temperature control, low electrolyte volume, and low wt % KOH, used simultaneously in the present test, resulted in this high current efficiency (at least about 28%) that was sustained throughout the run. This level behavior indicates that these parameters were under control and that the parameters needed to control current efficiency and the entire process was being controlled over long production times.

FIG. 18 clearly illustrates the value of continuous harvesting of ferrate(VI) product when operating the cell of the invention. Although the process exhibited a high degree of robustness by repeatedly operating overnight unattended, the net ferrate(VI) production rate was found to be far better during periods where continuous harvesting was performed. Specifically potassium ferrate(VI) production rates of 108 mg/min, 77.3 mg/min, 81.1 mg/min and 60.7 mg/min $K_2FeO_4$ were produced on each of four consecutive days. This data again illustrates the viability of a long continuous operation.

The fluctuations in the isolated ferrate product (FIG. 18) during the run provide critical additional information. In particular, during overnight operations where solids separation was not performed, the amount of ferrate produced decreased. However, for example, from 2500-3000 minutes, when filtration was performed at a high frequency, the ferrate production values (slope over this time interval) were quite stable (81.1 mg isolated $K_2FeO_4$/min), indicating the importance of solids separation in production yield and, therefore, since the power was constant, current efficiency. This is further evidenced where the 785 and 505 nm UV/VIS peaks for the electrolyte samples are compared. Any deviation between these two measurements indicates the presence of unwanted iron by-products. Mid-way through the run, when filtration was performed frequently and the electrolyte volume was low, the agreement between the two measurements was good, which indicates a low concentration of other iron species.

After the process was shut down, the cell was disassembled, and the electrodes were examined. An amount of black material, apparently dendritic magnetite, had accumulated loosely on the bottom portions of the cathodes. In previous experiments, a thin layer of dendritic material was observed on the cathodes after shutdown, with a concurrent amount of material flowing in the electrolyte solution. In this run, the dendritic material was not observed in the solution and appeared to be limited to being trapped in the cathode compartments, because of the slow flow rate in the cathodic compartment relative to the anodic compartment made possible by the valve in the catholyte exit line and the presence of the screens in the cell. The presence of this material on the cathodes provides evidence that magnetite is formed in the cathode from ferrate(VI). This observation validates the strategy of preventing ferrate species from entering the cathode compartment and the value of using the slow catholyte flow/screen technique to control its formation. It was found that these solids could be removed from the cathodic compartment by periodically opening the catholyte valve for a short time to increase catholyte flow rate to flush the magnetite to the filter. The magnetite can be separated as a co-product.

The effectiveness of the hydrocyclone indicates that using centrifugation in a batch or continuous mode is effective for product recovery from the electrolyte, even at low G, centrifugal, force, for separating ferrate(VI) crystals from the electrolyte rapidly and completely, while simultaneously regenerating the electrolyte for recycle. Batch filtration of the centrifuge cake or slurry for continuous processing was used to isolate a high percent active product, up to >20%. The results show that the centrifuge and hydrocyclone were extremely effective in removing ferrate solids from the electrolyte. This continuous removal of ferrate(VI) solids from the system helps to prevent the decomposition of product caused by recirculating it to the catholyte and forming reduced iron species (magnetite and ferric oxyhydroxide colloid). These by-products could also be removed from the electrolyte by occasional filtration if needed, but preferably, as their formation represents ferrate production yield loss, their formation is to be avoided.

The results of the ferrate production rate enhancements confirmed that the cell efficiency increased when the total electrolyte volume was decreased, indicating the electrolyte volume/anode area should be controlled. This result was later verified further.

When the power supply waveform was changed to a flat Vmin, versus a single-point Vmin (sine wave to square wave), the electrical current efficiency (% Ieff or CE) increased markedly. This efficiency improvement was verified during additional testing as well. Using a waveform with a flat top and bottom resulted in good current efficiencies. These results were interpreted mechanistically as indicating that Vmax builds ferrate(VI) and oxide film from the iron metal, while Vmin depletes the oxide film by forming ferrate(VI), and perhaps ferrate(V), thereby preventing the buildup of a passivating layer of oxide (which is produced too fast when a non-variable DC current is used). The testing also suggested that good ferrate production rates could be obtained with low (2 wt %) KOH concentration.

EXAMPLE 7

The findings described above from Example 6 were incorporated into this test. The objective was to validate the findings from the earlier runs and to demonstrate that high ferrate production rates and current efficiency can be obtained and held during a continuous run. The parameters included low electrolyte volume/anode area, continuous solids separation (by centrifugation or filtration), decreased current density (by doubling anode surface area), separation of anode and cathode compartments using a screen instead of a membrane, and use of a square waveform (i.e. Vmax and Vmin both flat), and low wt % KOH.

These adjustments resulted in high current efficiency that was sustained throughout the entire run. The efficiency was at least 28% up to about 62% over 4438 minutes (>3 days) at 2.20V. These current efficiencies represent an economically viable process. For example, further improvement in the current efficiency may be obtained by 24/7 solids separation (using an in-line continuous centrifuge hydrocyclone, or filter that is sized for the production cell), lower crystallizer temperature and optimized current density.

Another important finding is that metals, such as nickel and stainless steel can be used at certain points in the process (cathode, piping, filter, internals, centrifuge internals, hydrocyclone internals, and heat exchanger elements, etc.) without apparent detriment to the stability or contamination of the ferrate(VI) product. Also, the amount of magnetite produced was found to be a very low level using the new design for the cell internals.

Flow distributors optionally may be used in the anolyte and/or catholyte compartments. Flow distributors force better contact between reaction intermediates in solution, namely Fe(IV), Fe(V), and Fe(II)(OH)$_4^{2-}$, and the anode to produce Fe(VI). Optimization testing is needed to determine whether flow distributors improve or reduce ferrate production rates and efficiencies.

The screens used to separate the anode and cathode should allow electrolyte and water to pass but retard the mass flow of iron species and hydrogen gas from transferring between the anode and cathode compartments. A membrane is not desirable because of the increased electrochemical resistance resulting in much greater power consumption; rather, the screen barrier should be based on macro-scale size exclusion, and opposing flow dynamics, to prevent the H$_2$ gas bubbles from migrating to the cathode compartment and an additional catholyte stream may be used to further inhibit the reduction of ferrate by hydrogen.

Optimization of the temperature controls to obtain the desired temperature of about 50° C. into the cell and about 20° C. throughout the remainder of the system will further increase current efficiency and crystallization. As continuous, or semi-continuous, solids separation operation is preferred, and an optimized solid/liquid separation operation is most preferred, for the production of ferrate is preferred over a labor-intensive batch filtration. The tests indicate that continuous solids removal helps to increase current efficiency, inhibits by-product formation, and/or decomposition of Fe(VI). (see FIG. 17).

A process schematic for one embodiment of the invention is shown in FIG. 19. The electrochemical cell, 1900, includes 3 cathodes, 1902, and 2 anodes, 1904. Screens, 1906, separate the cathodes, 1902, from the anodes, 1904. The use of screens to separate the cathodic, 1903, and anodic, 1905, compartments may involve the use of a single electrolyte, or separate anolyte and catholyte solutions, with the corresponding piping and pumps. Using separate electrolytes (anolyte and catholyte) can result, and normally does result, in at least some intermixing of the two fluids. The anolyte can be sent to an optional finishing cell, 1912, for additional reaction. An in-line, continuous centrifuge or other solids/liquid separation device, 1930, and an optional filter, 1935, can be included for continuous separation of solids from the anolyte or combined electrolyte stream. Preferably, the apparatus also includes a means for cooling the anolyte or combined electrolyte entering and/or exiting the cell, heat exchangers, 1916 and 1914, respectively, one or more valves for controlling fluid flow rates, 1920 and 1922, in FIG. 19.

Product is recovered as cake of slurry, 1931. Clarified electrolyte is pumped via, 1932, through two-way value through optional polishing filter, 1935, then through another two-way valve, 1936, through flow controller, 1922, through flow meter 1937, then through heat exchanger, 1916, then through two-way valve, 1938, to either sample part, 1939 or returns to the cell 1910 anolyte compartment, 1905. Although FIG. 19 only shows electrolyte feed flow to the two anolyte blocks in the diagram, all four actually receive anolyte as cell of the electrodes are suspended in the centers of their respective compartments. Internal fluid channels separately interconnect all anolyte and catholyte compartments for uniform distribution of electrolyte to all electrodes.

The apparatus of FIG. 19 also includes by-pass hardware consisting of line, 1941, and valves, 1943 and 1945. This by-pass is used when product isolation is not being performed or when cleaning the apparatus. The apparatus of FIG. 19 also has the capability to optionally circulate the catholyte separately from the anolyte. When this feature is used, the catholyte exits cell, 1910, and flows through a dedicated compartment of heat exchanger, 1912, to the catholyte surge tank, 1951. The catholyte then is transferred by an air pressure diaphragm pump, 1954, back through the heat exchanger, 1956, then sent back to the catholyte compartments, 1903, of the cell, 1910. Variable DC power supply, 1960, provides the adjustable power to cell, 1910, electrodes as required for ferrate(VI) production via lead, 1961, to the cathode, 1902, and lead, 1963, to the two anodes, 1904.

A preferred embodiment, 2000, of the process of the invention is shown in FIG. 20. An electrolyte is heated to about 40-45° C. using heat exchanger 2001 before entering the electrochemical cell, 2002. The anolyte leaving the electrochemical cell, 2003 optionally may be sent to a finishing cell, 2005, if desired to increase product yield and stability. Valves 2004 and 2006 control by-pass of the optional finishing cell. The anolyte is cooled to a temperature of about 20-25° C. using heat exchanger 2007 and sent to a crystallizer 2009. The crystallizer, 2009, may be of any suitable design [Perry's Chemical and Engineering Handbook, Sixth Ed. D. W. Green, Ed., McGraw-Hill pub. (New York, N.Y.), 1984, pp 19-77 to 19-85], including a simple tank, a tank with internal baffling, a tank with internal mixing, a tank with internal temperature gradients, a tank with internal temperature gradients controlled by heating elements and/or heat exchangers, a means for introducing seed crystals, a tank fitted with external and/or internal recirculation, etc., and any combination of these, as is obvious to those skilled in the art of crystal growth of solids from aqueous solutions. The value of control over crystallization is that it allows the product to be produced, and it allows the product to be produced with controlled morphology (particle shape), and it allows the product to be produced with controlled particle size. Although micro-crystalline particles, such as fine needles, are desirable for example for fast dissolution and battery applications, coarse large crystals of low surface area or unit weight are most desirable for lowest production for large-scale commodity-priced operations such as waste water treatment, potable water production and the like. Level control, 2010, controls valve 2011, which allows pump 2013 to remove slurry from crystallizer 2009, and send it through flow control 2015 through sample port valve 2017 at a rate appropriate for centrifuge 2019.

After exiting the crystallizer 2009, the anolyte enters a batch, semicontinuous or continuous centrifuge or hydrocyclone, 2019. The ferrate solid cake or slurry is sent to a filter press 2021, to remove additional electrolyte. Any liquid-solid separation device is sufficient for product isolation.

Pressurized filtration is preferred though gravity filtration with at least a slight vacuum is effective. Pressurized filtrations are of several types, either the fluid slurry is pressurized, or the filter cake is pressurized, or both. Most preferred is that both the slurry and the cake are pressurized. Although high pressures, e.g. 10,000-35,000 psig are effective, lower pressures are most preferred, e.g. 1 psig to several hundred psig. Many pressurized filtration means are well known in the art.

The ferrate cake, 2023 can undergo additional processing, such as pelletizing, briquetting, tableting, extrusion, etc. 2025 if desired. The $K_2FeO_4$ or other ferrate(VI) salt depending on electrolyte composition. The product is removed at 2027. The electrolyte exits the centrifuge 2031 and is sent to the electrolyte surge tank 2030 with similar and optional recycle electrolyte streams from other points in the process such as pressure filtrate 2033 and pelletizer liquids 2035. The electrolyte recycle is optional and most preferred.

Electrolyte recycle from the liquid-solid separation device(s) is preferred since the chemical consumption per unit weight of ferrate product is thus reduced and in the amount proportional to the amount of fluid recycled. Although it is desirable to discard small amounts of theses fluids periodically or continuously to purge the process of accumulating impurities, such removal is also accomplished by removal of product which simultaneously removes a thin layer of electrolyte on each product particle collected.

Makeup electrolyte, for example NaOH, 2036, and KOH, 2037, can be added to the surge tank via valve 2040 as needed.

The catholyte exiting the electrochemical cell 2050 is preferably but optionally sent to a gas/liquid separator 2055 via valve 2057, and then to the surge tank 2030. Valve 2057, or other suitable means, for example valves, weirs, etc., to control the flow rate of catholyte 2052 flow rate from cell 2002, serves to minimize the flow of electrolyte to the valve 2057 and internal divider screens (see FIG. 5 and others) work in concert to control electrolyte flow across the cathode. Valve 2057 performs this control directly by restricting the exiting catholyte flow rate. The internal screen (see FIG. 5 and others) contributes to this flow control by preventing $H_2$ gassing agitation from the cathode to cause turbulence in the anolyte compartment. Besides, or in addition to, valve 2057, weirs can be inserted into the exiting anolyte and/or catholyte flow lines to control the electrolyte flow rate exiting as catholyte versus that exiting as anolyte.

Contents from the surge tank, 2030, are sent to the cell, 2002 via valve 2041, controlled by level control 2042, using pump 2043, through the "by pass line", 2046, through valve 2047, through flow control valve 2049, through two-way valve 2051 and sample valve 2053, through heat exchanger 2001, to cell 2002.

As needed, valves 2045 are switched to transfer at least a portion of the electrolyte from the surge tank 2030 from the normal "Filter By-Pass" condition to a filter 2061 to remove impurities, 2063 if needed. For example, ferric hydroxide colloids are removed from the electrolyte in this manner.

The humid hydrogen gas, 2065, separated by gas separator, 2055, is of high purity and can e released air free as so can be captured as a co-product or vented. During periods where product recovery is not occurring, for example, during startup or maintenance of solid/liquid separator three-way valve, 2018, may be opened to allow by-pass of electrolyte via the line 2071 to three-way valve 2051. Controlled variable DC power is provided via power supply, 2073, (see FIG. 2).

The following test procedures are useful for determining the proper operation of the apparatus in the production of ferrate(VI) and of solid ferrate(VI) products.

EXAMPLE 8

The undivided ferrate(VI) production cell apparatus of Example 7 was operated further using an in-line filter that was loaded with a spiral wound filter of polypropylene continuous fiber production and rated for 10 microns porosity (Serfilco, Ltd. Code No. 15U10U). Other filters of corrosion resistant fibers are also acceptable as are other porosities due to the self-stacking nature of the microfibers ferrate(VI) product for uniquely formed by the invention. These micro fibers are new and have aspect ratios of 5, usually 10 or greater, and most usually 20 or greater, and normally about 25-35. Crystal lengths can extend to 100 microns. Thicker and longer crystals would be prepared using seeding, recirculation and properly placed temperature gradients as is known in the art. This filter provides continuous solid potassium ferrate(VI) product recovery as described previously.

The solid product was harvested by replacing the filter unit periodically every one-half, daily, or every other day for the 866 $cm^2$ anode area cell previously described operating at 53 A. The thick filter element spiral wound construction allows substantial loadings of product and prevented filter blinding. In addition, it was determined that the filter cake also retained a high porosity such that very little pressure drop occurred across the filter, even when fully loaded with product solids. Two runs were made of about 22,000 min (15 days), and one run of more than 14,000 min (about 10 days). The runs ultimately resulted in complete consumption of the anode, and hence were taken completely to the normal maintenance stopping point for such continuous operations. It is well known to those in the art that for such systems, longer on-line times can be designed into the operation by using thicker anodes, larger cells, more plates per cell per unit of amperage, etc.

The filled filter cartridges, packed with sodium ferrate(VI) or potassium ferrate(VI) crystals, (depending upon electrolyte formulation, as described above), are viable ferrate products as they are readily used by inserting into an in-line filter housing of the same size or multiple-element sized, and then water circulated through the filter unit. The water dissolves the ferrate(VI) salt and carries it to the point of one of the ferrate(VI), for example for surface cleaning, water purification, etc. Note that this ferrate(VI) loaded filter units are readily packaged and stored for later use.

The product was harvested from the filled filter, so that it can be used directly or converted to other ferrate(VI) products, using the following procedure.

Filter Leach Method for Weight Determination of Ferrate(VI) Salts Accumulated on Teflon and Spiral Wound Polypropylene Cylindrical Filters. Also Useful as a Solid Product Isolation Process.

This method is useful for determinations of the amount of ferrate (VI) solid produced where solid sodium and/or potassium ferrate (VI) crystalline product is removed by filters. An inline filter is used for removing ferrate(VI) solid from electrolyte flow streams is performed to determine the amount of ferrate (VI) available for isolation, or by another solids/liquid separation method. Also, a total iron assay can also be determined, therewith allowing a total mass and energy balance to be constructed around the overall electrolytic Fe(VI) production process.

Table 6 shows the centrifuged salt composition as chemical species averages.

TABLE 6

| | |
|---|---|
| Wt. % Water | 43.04% |
| Wt. % NaOH | 41.56% |
| Wt. % $K_2FeO_4$ | 7.69% |
| Wt. % Fe"(III)" | 4.86% |
| Wt. % $CO_3^-$ | 0.74% |
| Total | 97.89% |

In this section, the ability of both centrifuges to remove water, sodium and potassium hydroxides is analyzed. As mentioned herein, batch centrifugation was tested to see how ferrate(VI) would behave under these conditions. Two to three liters of electrolyte were removed at one time, centrifuged at 2500 RPM in a 6×1 L centrifuge for 20 minutes. The solids were then collected by decanting the supernatant and then spun sown again in a small 4×50 mL centrifuge for 30 minutes, further increasing the weight percentage if ferrate. There is a plot showing the percent solids in each of the centrifuged 1 L bottles containing electrolyte and the concentration of ferrate(VI) in the solids.

Table 6 shows the increase in weight percent ferrate(VI) after the second spin down in the 50 mL centrifuge.

Once a filter has been successfully loaded with ferrate (VI) solid product, remove it from the system and allow to drain for several minutes to remove any excess electrolyte, under $N_2$, or $CO_2$-free dry air atmosphere. Place any collected liquids back into the surge tank of the process as recycled viable electrolyte.

1. Make up 3-4 L of 6M KOH and cool to about 4.0° C. The final volume is not important as long as the leaching unit has enough liquid so the pump does not caveat. Record the exact final volume of 6M KOH used. For a continuous product isolation process, the amount of 6M KOH used should be minimized to minimize costs.
2. Load the filter into leaching unit and pass 6M KOH thorough it for 5 minutes. The KOH solution can be once through, or preferably recirculated to minimize fluid volumes handled.
3. If the objective is to assay for amount of product recovered by the filter, immediately analyze leachate for Fe(VI) using procedure described above. Dilution may be necessary to reduce absorbance values (A505 and A785) to the 0.2-1.2 range. For product production, the leachate is sent to recrystallization where for potassium ferrate(VI) product, $K_2FeO_4$, KOH is added to about 48-52 Wt % KOH (see enclosed product production procedure). Sodium, lithium, and blends thereof are similarly prepared.
4. For the purpose of ferrate(VI) production rate analysis, back calculate the total amount of ferrate(VI) in grams by multiplying concentration by total leach volume and molecular weight of ferrate(VI). Some values are given for reference in Table 5.

TABLE 5

| Fe(VI) salt type | MW |
|---|---|
| Sodium | 165.822 |
| Potassium | 198.039 |
| $FeO_4^{2-}$ only | 119.843 |

EXAMPLE 9

Determination of Ferrate(VI) Ion Concentration in Aqueous Sodium and Potassium Hydroxides by UV-VIS Spectrophotometric Analysis The determination of Fe(VI) as $FeO_4^{2-}$ ion is an important quantitative analysis for keeping the ferrate(VI) production cells in proper operating condition and at high current efficiencies. It is also important for determining the active ferrate (VI) content of product filter cakes and solid products. If the analytical samples are not handled properly, or the associated UV/VIS spectrum is not interpreted correctly, "false high" errors as high as 300% or more in the ferrate(VI) production rate are possible. For example, the presence of ferrate(III) hydroxide colloids or magnetite crystalline particulates ($Fe_3O_4$) strongly scatter UV/VIS light in the spectrophotometer, and so would be erroneously interpreted as being additional ferrate(VI) if certain precautions are not taken as described below.

Interference-Free Ferrate(VI) Analysis
Procedure:
1. Set up a scanning UV-VIS instrument capable of scanning the region of 450 to 850 nm.
2. Select the appropriate quartz or glass optical cell. If the concentration is thought to be higher than 0.01 M, it is recommended that a 1.0 mm cell be used. For concentrations below 0.01 M, a 1.00 cm cell is appropriate.
3. Check the set of quartz cells, blank and sample, to ensure they match precisely and exactly within the range of wavelengths by scanning high purity deionized (HPDI) water in the cells. Run the baseline for the 450-850 nm region with the blank cell holding HPDI water.
4. Dilute the electrolyte sample between 3-10 times using 32-34% NaOH. This concentration of NaOH is critical as less results in rapid ferrate(VI) decomposition, and more causes problems of incomplete dissolution of ferrate(VI). If necessary, check that the ferrate(VI) microcrystalline fibers are dissolved by observing the diluted sample with an optical microscope. Mix well. The sample should have a bubble-free, clear purple color with no visible particles floating in solution. Ensure that the total sample volume is at least 2.5 ml for the 1.000 cm cell and 1.0 ml for the 0.100 cm cell.
5. Scan the spectrum of the diluted sample at the above specified wavelength region and save the recorded spectrum to file. The 785 nm peak and 505 nm peaks need to have values within 0.100 and 1.200 absorbance units. If not, re-dilute another sample with a different dilution factor that corresponds to higher or lower absorbance values depending on the initial results.
6. The spectrum must look like FIG. 24. If peak shape does not match precisely, then see troubleshooting section below before proceeding to resolve. Referring now to FIG. 24, this figure is a graph showing the absorbance as a function of wavelength ($\lambda$) of ferrate(VI) spectra. Note that at "A" there should be a steady decrease in absorbance at wavelengths below the "B" peak of about 505 nm. Note also that at about 570 nm there is a small peak integrated with the 505 nm peak. At "D" it is important that this section should not be flat, it should have a nice concave type shape such as the one shown in FIG. 24. A smaller peak is noted at about 785 nm. Also it is important that the curve beyond the 785 nm peak at about "E" should not be flat.
7. Use Beer's Law, $A=\epsilon*b*c$, to calculate ferrate (VI) ion concentration. Use the 505 nm absorbance value (A505) with $\epsilon=1103$ $M^{-1}$ $cm^{-1}$ as the molar absorbtivity ($\epsilon$) value, use cell width in cm for path length (b), and then concentration (c) will be in molarity (M). Do the same for 785 nm with a "$\epsilon$" value of 379 $M^{-1}$ $cm^{-1}$. Multiply the result by the dilution factor. If the resulting concentrations determined at the two wavelengths do not match to within 0.0005M or 0.5 mM, see troubleshooting section since a disagreement indicates that contaminants from interferences are present making the determined apparent ferrate(VI) ion concentration invalid and erroneously high.

Troubleshooting Guide for Ferrate(VI) Analysis Method
1. Make sure that the sample is mixed well enough, that the quartz cell and the detector are clean, and that the sample does not have a lot of micro bubbles trapped in solution. If bubbles are present, tap the micro bubbles to the top or let settle for one minute before running the analysis. The cell needs to appear crystal clear when viewed.
2. A cause for spectral impurity of the diluted sample may be that the ferrate is decomposing during analysis (i.e. there is a rust color in cell after analysis). If not sure, set the UV-VIS to real time recording at single wavelength monitoring at either 785 nm or 505 nm. Re-dilute another sample with 32-34% NaOH, mix well, and place it into the UV-VIS spectrophotometer. If the absorbance values are changing faster than 0.003 every minute, it will be necessary to extrapolate the absorbance value back to time zero using the single wavelength function (Use the 505 nm wavelength for this procedure). Sodium ferrate(VI) unstabilized solid cake analyses are most prone to this drifting phenomenon, perhaps due to the presence of reactive intermediates (see text).

This drift in absorbance value with time can also indicate that something is wrong with the condition of the ferrate production cell, and it should be checked immediately, especially if the $A_{505}$ values are changing fast (0.001 every few seconds).
3. If ferrate(VI) ion concentration values determined at the two wavelengths still differ after the above steps are taken, then there is iron containing particulate and/or colloidal species contaminating the sample. Centrifuge the diluted sample, for example for three (3) minutes at maximum speed (3000 rpm). Use a transfer pipette to remove the top clear layer of electrolyte, making sure not to shake or otherwise stir the solids back into solution.
4. If none of the previous steps resolve the wavelength discrepancy, filter the diluted electrolyte with a compatible (e.g. polypropylene, polysulfone and other nonreactive filter materials) syringe filter with 5 um porosity or less before performing the spectrophotometric analysis.
5. If the dual wavelength technique still gives significantly different apparent ferrate(VI) concentrations, then something is seriously wrong either with the running condition of the electrolyzer, or the electrolyte has been contaminated and needs to be replaced. Hence, in this event, cell shutdown, cleaning and rebuilding is prescribed.

EXAMPLE 10

Determination of Total Iron Concentration by UV-VIS Analysis

The UV-VIS method for total iron determination is a fast and low cost analysis method. The method was verified by commercial inductively coupled argon plasma mass spectrophotometric (ICP-MS) analysis. With care, this analysis is accurate to within ±1%.

Procedure
1. Set up a UV-VIS spectrophotometer, capable of a wavelength scan, to scan between 200-500 nm.
2. Using a 1.000 cm quartz cell set, test blank and sample cells with HPDI water, to make sure they match exactly and precisely between the range of wavelengths. Test the baseline with the blank cell using HPDI water.
3. Dilute the sample with reagent grade 6 N HCl by a factor of 50-100×. The solution should turn a faint yellow color, and there should be no particulate floating in the sample. Cap the sample to protect the instrument from HCl fumes.
4. Scan the sample between the specified wavelengths and save the data to disk. The spectrum should look like FIG. 25 except normally without the "UV Lamp Change" feature which is an artifact of the particular spectrophotometer used. This spectrum is that of tetrachloroferrate ion, $FeCl_4^-$.

Referring now to FIG. 25, this figure is a graph of total iron UV/visible absorption spectra with absorbance as a function of wavelength in nm. It is important to note the UV lamp cross over "A" at about 300 nm and the filter change "B" at about 380 nm artifact of the instrument, not part of the spectrum. Note the particular curve shape with a peak at about 360 nm.

5. Using the 358 nm absorbance value (A358), calculate the concentration of iron in parts per million (ppm) by dividing the $A_{358}$ by 0.0551 $ppm^{-1}$ and multiplying by the dilution factor. In order for the resulting value to be precise, the diluted concentration must read between 0.1 and 1.2 absorbance units. If the concentration is too high or low, then dilute another sample with different dilution factor that corresponds to higher or lower absorbance values depending on the initial results.

EXAMPLE 11

Ferrate(VI) Production Process Flow Diagram

Described below and shown in FIG. 20 is an embodiment showing a plant for producing ferrate(VI). The unit would be capable of operating continuously, only allowing for anode replacement and maintenance, using continuous solid product removal using any suitable solid-liquid separation hardware (by one or a combination of hydrocyclone, centrifuge, pressure filtration, "plate and frame" belt press, and the like filtration in FIG. 20). The invention process improves the efficiencies so that the ratio Fe (total)/Fe(VI) is decreased toward the ideal ratio of about 1/1 when operated with continuous or semi-continuous flow and filtration. Maintaining this parameter low maintains efficient ferrate(VI) production in proportion since the production of non Fe(VI) iron species are believed to involve Fe(VI) decomposition directly, or involve other oxidation states [e.g. Fe(IV), Fe(V), Fe(II) and Fe(0)] that give rise to Fe(III) products that suspend in the electrolyte as particulates and colloids. Hence preventing these post Fe(VI) production reaction provides an excellent means to increasing ferrate(VI) production yields and production electrical current efficiencies. This topic is discussed in more detail below.

Referring now to FIG. 15, the apparatus shown in this figure can be used to prepare ferrate(VI) according to the invention.

Bipolar Ferrate(VI) Production Cell

Bipolar electrochemical cells are known in the art to have advantages over mono polar cells in lower power consumption, and simplicity of construction, especially with respect to electrochemical "cell stacks", i.e. electrochemical cells containing more than one cell. Although normal cell construction requires power leads to each electrode, in bipolar cells the voltages are applied to each electrode via an electric field applied across the stack (FIG. 26). Such bipolar cell designs are useful with the invention. In this manner, dozens and even about 100 to 200 electrodes can be so energized using only two power leads, one to each end plate. Such end-stack power leads may physically be applied using one or more wires, but only about two are preferred, still far less than one or two per monopolar electrode.

Referring to FIG. 26, a typical bipolar cell useful with the invention will be enclosed by a housing, 2605, having ports as needed. Power is supplied via one or more anode connections, 2610, and one more cathode connection, 2620. A plurality of iron containing electrodes, 2630, are placed in spaced apart relationships, using non-conducting spacers described herein. Optionally, but preferably in one embodiment, a screen, 2640, is placed between each of the electrodes 2630. The screen typically has an open mesh (e.g. 1 mm holes or smaller) so that liquid flow is not impeded.

For ferrate(VI) production using the invention in a bipolar cell mode, it is preferred to include the screen, 2640, flow modifiers, described previously to prevent $FeO_4^=$ loss at the cathodes, and most preferred to include preferential electrolyte fluid flow path to the anode, providing electrolyte to the cathode via through-screen flow from the electrolyte entering the anode compartment, and even more preferred, including the restricted catholyte outlet flow rate control design. The electrodes so deployed can be of the same materials previously listed for the monopolar cell design, i.e. iron, or iron with a plate of nickel on one side, or of any other iron containing electrode material. Such ferrate(VI) production cells are powered with electronic circuits similar to the type already described except that the actual voltage applied across the cell stack is about the sum of the number of cells times Vmax. For example, for 100 plates at 2.7 volts each for Vmax, will require a total applied voltage of 270 volts. Such voltages are readily available commercially. Note that while it may be desirable to separate the heat space gas from above the anodes and cathodes, it is not required in that little or no $O_2$ gas is produced at the anode the cell of the invention, just ferrate(VI) and iron oxide film. Hence most $H_2$ (g) is the only gaseous product and this gas separates quickly into the head space. Being essentially pure $H_2$, it can be recovered and put to useful purpose. The ferrate(VI) product is not volatile and exits with the microcrystals helps further to prevent a reaction between the ferrate(VI) and $H_2$ produced.

While the forms of the invention herein disclosed constitute presently preferred embodiments, many others are possible given common knowledge to those skilled in the arts of chemical processing, electrochemical cell operation, solids-liquid separation and the like. It is not intended herein to mention all of the possible equivalent forms or ramifications of the invention. It is to be understood that the terms used herein are merely descriptive, rather than limiting, and that various changes may be made without departing from the spirit of the scope of the invention.

The invention claimed is:
1. A method for making ferrate(V) and/or ferrate(VI) comprising:
   providing an electrochemical cell comprising an iron-containing anode, a cathode, and an electrolyte solution, wherein the electrolyte solution comprises an alkaline solution of at least one hydroxide; and
   applying a continuously and automatically varied variable direct current voltage between the anode and the cathode to form the ferrate(V) and/or ferrate(VI), the variable direct current voltage varying between a maximum voltage (Vmax) and a minimum voltage, the minimum volt- age (Vmin) is greater than 0 and is a voltage to ensure that formation of an oxide film on a surface of the anode is depressed so that passivation of the anode is substantially avoided, wherein Vmin is high enough to maintain oxidizing conditions favorable for making the ferrate(V) and/or ferrate(VI) at the anode surface.

2. The method of claim 1 wherein the electrochemical cell has an electrolyte inlet and at least two electrolyte outlets.

3. The method of claim 2 further comprising controlling an amount of the electrolyte solution flowing out of the electrolyte outlets so that the flow rate of the electrolyte solution is substantially higher near the anode than near the cathode.

4. The method of claim 3 wherein the amount of the electrolyte solution flowing out of the electrolyte outlets is controlled by one or more valves in fluid communication with the electrolyte outlets.

5. The method of claim 3 wherein the amount of the electrolyte solution flowing out of the electrolyte outlets is controlled by one or more weirs in fluid communication with the electrolyte outlets, the weirs having different heights.

6. The method of claim 3 wherein the amount of the electrolyte solution flowing out of the electrolyte outlets is controlled by one or more flow restrictions in fluid communication with the electrolyte outlets.

7. The method of claim 1 wherein a ratio of a surface area of the anode to a surface area of the cathode is at least about 10.

8. The method of claim 1 wherein the electrolyte solution comprises NaOH, KOH, or a mixture thereof.

9. The method of claim 1 further comprising providing one or more screens between the anode and the cathode.

10. The method of claim 9, wherein the screen has a mesh size in the range of about 0.01 micron to about 1 mm.

11. The method of claim 9, wherein the screen has a mesh size in the range of about 0.01 micron to about 0.1 mm.

12. The method of claim 9, wherein the screen porosity is smaller than substantially all of the hydrogen gas bubbles formed at the cathode in a catholyte, wherein the catholyte is the electrolyte solution in the cathode department.

13. The method of claim 1 wherein the variable DC voltage is applied to obtain a voltage level where ferrate active film removal exceeds or equals to net active film formation rate for a selected time period, said time period selected to substantially inhibit the oxide film growth, and said voltage level occurs during the time when the Vmax is reduced.

14. The method of claim 1 wherein the voltage has a frequency of between about 0.01 and about 1000 Hz.

15. The method of claim 1 wherein a cell current (Icell) at the minimum voltage is less than 5% of an Icell at the maximum voltage, and the Icell is greater than 0.

16. The method of claim 1 further comprising continuously harvesting the ferrate(V) and/or ferrate(VI) from the electrolyte solution, wherein the resulting electrolyte solution contains substantially no ferrate(V) and/or ferrate(VI).

17. The method of claim 16, wherein some or all of the ferrate(V) and/or ferrate(VI) formed crystalize into solid forms.

18. The method of claim 16, wherein the effective temperature for the operation of the harvesting is in a range of about 10° C. to about 80° C.

19. The method of claim 16, wherein the effective temperature for the operation of the harvesting is in a range of about 15° C. to about 40° C.

20. The method of claim 1 further comprising recycling the resulting electrolyte solution to the electrochemical cell.

21. The method of claim 1, wherein the electrochemical cell is membraneless.

22. The method of claim 1 wherein the minimum voltage is a voltage that ensures the passivation of the anode is substantially avoided.

23. The method of claim 1 wherein the maximum voltage is a voltage that meets or exceeds a voltage needed to produce ferrate(V) and/or ferrate(VI).

24. The method of claim 1 wherein the electrolyte solution flows substantially faster past the anode than the cathode.

25. The method of claim 1 wherein a ratio of the rate of electrolyte solution flowing past the anode to the rate of the electrolyte solution flowing past the cathode is at least about 60:40.

26. The method of claim 1, wherein the rate of the electrolyte solution flowing past the anode to the rate of the electrolyte solution flowing past the cathode is at least about 70:30.

27. The method of claim 1, wherein the rate of the electrolyte solution flowing past the anode to the rate of the electrolyte solution flowing past the cathode is at least about 80:20.

28. The method of claim 1, wherein the rate of the electrolyte solution flowing past the anode to the rate of the electrolyte solution flowing past the cathode is at least about 90:10.

29. The method of claim 1, wherein the screen has a combined mesh opening area such to occupy at least 25% of the area between the anode and cathode surfaces, in which the open area consists of small openings, as is provided by a screen or the equivalent 30. The method of claim 1, further comprising a fluid controller in fluid communication with the electrolyte outlets to retard the exit flow of the electrolyte solution in the cathode compartment so that the flow rate of the electrolyte solution is substantially higher near the anode than near the cathode;
wherein the exit flow of the electrolyte solution in the cathode compartment is sufficiently high to enable the release of the hydrogen gas formed at the cathode along with the exiting electrolyte solution; and
wherein the difference between the electrolyte solution flow rates near the anode and near the cathode substantially reduces the diffusion of the ferrate(V) and/or ferrate(VI) product so as to minimize the reduction or loss of the ferrate(V) and/or ferrate(VI) near the cathode.

* * * * *

UNITED STATES PATENT AND TRADEMARK OFFICE
CERTIFICATE OF CORRECTION

PATENT NO.       : 8,449,756 B2
APPLICATION NO.  : 10/597106
DATED            : May 28, 2013
INVENTOR(S)      : Monzyk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2047 days.

Signed and Sealed this
Eighth Day of September, 2015

Michelle K. Lee
*Director of the United States Patent and Trademark Office*